US010059880B2

(12) United States Patent
Hirai

(10) Patent No.: US 10,059,880 B2
(45) **Date of Patent: *Aug. 28, 2018**

(54) POLYMERIZABLE LIQUID CRYSTAL COMPOSITION AND OPTICAL ANISOTROPIC FILM

(71) Applicants: JNC CORPORATION, Tokyo (JP); JNC PETROCHEMICAL CORPORATION, Tokyo (JP)

(72) Inventor: Yoshiharu Hirai, Ichihara (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 348 days.

This patent is subject to a terminal disclaimer.

(21) Appl. No.: 14/330,247

(22) Filed: Jul. 14, 2014

(65) Prior Publication Data

US 2015/0029446 A1 Jan. 29, 2015

(30) Foreign Application Priority Data

Jul. 29, 2013 (JP) ................................. 2013-156736
May 30, 2014 (JP) ................................. 2014-113192

(51) Int. Cl.
*G02F 1/1333* (2006.01)
*C09K 19/56* (2006.01)
(Continued)

(52) U.S. Cl.
CPC .......... *C09K 19/56* (2013.01); *C09K 19/2007* (2013.01); *C09K 19/32* (2013.01);
(Continued)

(58) Field of Classification Search
CPC ............... G02F 1/1333; G02F 1/13363; G02F 2001/133633; G02B 5/30; C09K 19/56;
(Continued)

(56) References Cited

U.S. PATENT DOCUMENTS 9,505,980 B2 * 11/2016 Hirai ...................... C09K 19/32
2006/0222784 A1 10/2006 Saigusa et al.

FOREIGN PATENT DOCUMENTS

JP 2001-055573 2/2001
JP 2006-307150 11/2006
(Continued)

*Primary Examiner* — Geraldina Visconti
(74) *Attorney, Agent, or Firm* — Greenblum & Bernstein, P.L.C.

(57) ABSTRACT

A subject is a polymerizable liquid crystal composition in which tilt alignment is easily developed and an optical anisotropic film obtained therefrom. A solution is a polymerizable liquid crystal composition containing one or more polymerizable liquid crystal compounds selected from compounds represented by formulas (1-1), (1-2) and (1-3), and a polymerizable liquid crystal compound represented by formula (2-1). In the following formula, for example, $Z^{11}$ and $Z^{12}$ are hydrogen; $W^1$ is independently hydrogen, fluorine or a methoxy; $W^2$ and $W^3$ are independently hydrogen or methyl; $X^1$ is independently a single bond or $-CH_2CH_2-$; and for example, $W^4$ is methyl; and $X^2$ is $-O-$; and m1, m2, n1 and n2 are 2 to 15. Moreover, $Z^{21}$ is hydrogen or methyl; $R^1$ is an alkyl ester-containing substituent; $W^5$ is hydrogen; $X^3$ is $-COO-$; $X^4$ is $-O-$, for example; and m3 is 2 to 15 and q1 is 0 to 2.

(1-1)

(1-2)

(a)

(1-3)

(Continued)

-continued

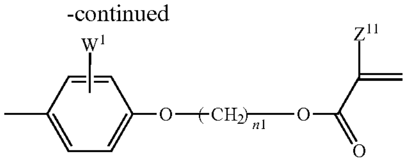

(2-1)

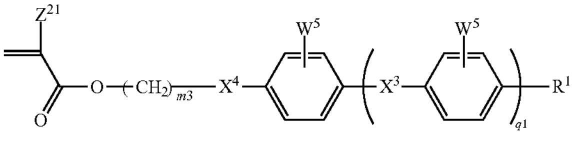

19 Claims, 1 Drawing Sheet

(51) Int. Cl.
*C09K 19/20* (2006.01)
*C09K 19/32* (2006.01)
*G02F 1/13363* (2006.01)
*G02B 5/30* (2006.01)
*C09K 19/04* (2006.01)

(52) U.S. Cl.
CPC ........... *G02B 5/30* (2013.01); *G02F 1/13363* (2013.01); *C09K 2019/0448* (2013.01); *C09K 2019/2078* (2013.01); *G02F 2001/133633* (2013.01)

(58) Field of Classification Search
CPC ................ C09K 19/2007; C09K 19/32; C09K 2019/0448; C09K 2019/2078
USPC ....................................... 252/299.62; 428/1.1
See application file for complete search history.

(56) References Cited

FOREIGN PATENT DOCUMENTS

| | | | | | | |
|---|---|---|---|---|---|---|
| JP | 2008-134530 | | | 6/2008 | | |
| JP | 2008-138142 | | | 6/2008 | | |
| JP | 2009-286885 | A | * | 12/2009 | ............. | C09K 19/38 |
| JP | 2012-177087 | A | * | 9/2012 | ............. | C09K 19/42 |

* cited by examiner

POLYMERIZABLE LIQUID CRYSTAL COMPOSITION AND OPTICAL ANISOTROPIC FILM

TECHNICAL FIELD

The present invention relates to a polymerizable liquid crystal composition and an optical anisotropic film obtained therefrom. The invention also relates to an optical compensation film using the optical anisotropic film, an optical device and a liquid crystal display apparatus.

BACKGROUND ART

A polymerizable liquid crystal compound having a liquid crystal phase yields an optical anisotropic film having a function such as optical compensation by polymerization because alignment of polymerizable liquid crystal molecules is immobilized by poylmerization. Various polymerizable liquid crystal compounds have been developed in order to utilize such a function of the optical anisotropic film, but a sufficient function is not satisfied by one polymerizable liquid crystal compound in some cases. Therefore, an attempt has been made in which a composition is prepared using several polymerizable liquid crystal compounds to allow polymerization of the composition.

In an alignment state of a liquid crystal material, showing a state of alignment such as homogeneous alignment (horizontal alignment), tilt alignment (tilted alignment), homeotropic alignment (vertical alignment) or twist alignment (twisted alignment) is occasionally described simply as “having homogeneous alignment,” “having tilt alignment,” “having homeotropic alignment,” “having twist alignment” or the like.

An optical anisotropic film having the tilt alignment can be applied to, for example, a viewing angle compensating plate in a twisted nematic (TN)) mode (see Patent literature No. 1).

In the applications described above, the liquid crystal material may be occasionally laminated on a support substrate such as a glass substrate or a plastic substrate. Examples of the material used as the plastic substrate include a polymer such as triacetyl cellulose (TAC), polycarbonate, polyethylene terephthalate (PET) and cycloolefin resins.

Specific examples of the polymerizable liquid crystal composition in which the liquid crystal material shows the tilt alignment include a polymerizable liquid crystal composition containing an acrylate derivative having a 9,9-dialkylfluorene skeleton as a main component (see Patent literature No. 2), and a polymerizable liquid crystal composition formed of a monofunctional compound having a bond in a polymerizable moiety in a center of a mesogen skeleton and a polymerizable compound having a bisphenol skeleton (see Patent literature No. 3). Moreover, as a method for controlling tilt alignment of a liquid crystal material, a proposal has been made for a method for manufacturing an optical anisotropic film in which the number of carbon atoms in a spacer group of a polymerizable liquid crystal compound is controlled (see Patent literature No. 4).

However, the polymerizable liquid crystal composition described above is difficult to develop a moderate tilt angle, or when a polymerizable liquid crystal compound in which the number of carbon atoms of the spacer group is changed is applied to the composition for the purpose of controlling the tilt alignment, an amount of intermediate raw material increases in a manufacturing step, thereby increasing manufacturing cost in some cases. Therefore, a desire has been expressed for a polymerizable liquid crystal composition having structure facilitating development of the tilt angle of the liquid crystal material in the tilt alignment and allowing manufacture at low cost.

CITATION LIST

Patent Literature

Patent literature No. 1: JP 2001-55573 A.

Patent literature No. 2: JP 2006-307150 A.

Patent literature No. 3: JP 2008-138142 A.

Patent literature No. 4: JP 2008-134530 A.

SUMMARY OF INVENTION

Technical Problem

An object of the invention is to provide a polymerizable liquid crystal composition having structure facilitating development of tilt alignment and facilitating manufacture of a polymerizable liquid crystal compound. Another object of the invention is to provide a liquid crystal layer composed of the polymerizable liquid crystal composition and having controlled tilt alignment, an optical anisotropic film obtained by polymerizing the polymerizable liquid crystal composition, and an optical compensation film using the optical anisotropic composition. A further object of the invention is to provide an image display apparatus such as a liquid crystal display apparatus and an organic electroluminescence display apparatus, including the optical compensation film.

Solution to Problem

The present inventors have found that development of tilt alignment of a liquid crystal material is facilitated upon utilizing one or more polymerizable liquid crystal compounds selected from compounds represented by formulas (1-1), (1-2) and (1-3), and a polymerizable liquid crystal compound represented by formula (2-1), in particular, a compound having specified structure represented by formula (2-1), and thus have completed the invention. The invention is presented in items 1 to 14 below.

Item 1. A polymerizable liquid crystal composition, containing component (A) being at least one compound selected from the group of compounds represented by each of formula (1-1), formula (1-2) and formula (1-3), and component (B) being at least one compound selected from the group of compounds represented by formula (2-1):

$R^1$ is an alkyl ester-containing substituent ($—R^d—COOR^c$, $—R^d—OCOR^c$ or $—R^d—CH{=}CH—COOR^c$; $R^c$ is straight-chain alkyl having 1 to 20 carbons; $R^d$ is a single bond or straight-chain alkylene having 1 to 10 carbons);

Formula 1

(1-1)

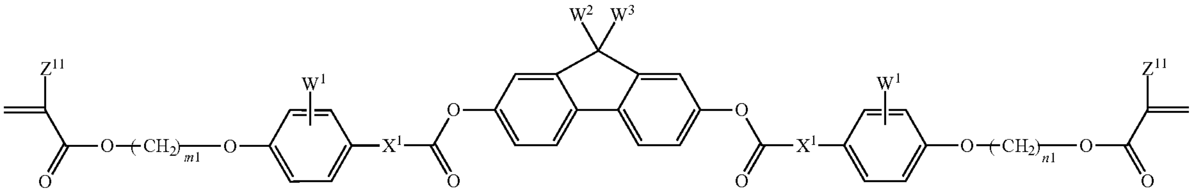

(1-2)

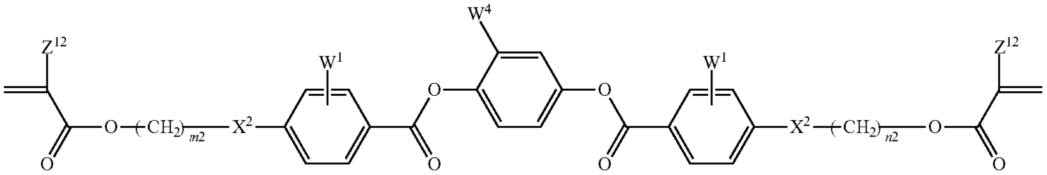

(a)

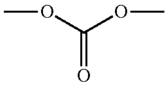

(1-3)

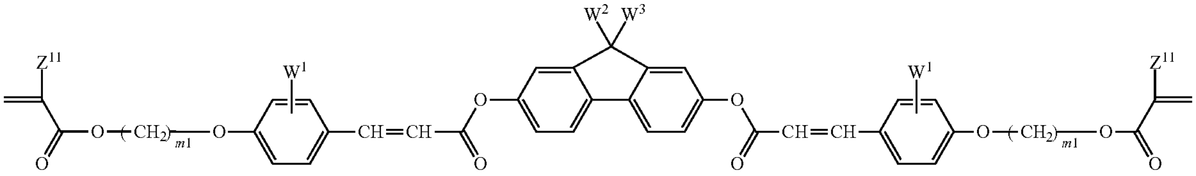

Here, $Z^{11}$ is independently hydrogen, fluorine, methyl or trifluoromethyl;

$W^1$ is independently hydrogen, fluorine or a methoxy;

$W^2$ and $W^3$ are independently hydrogen or methyl;

$X^1$ is independently a single bond or $—CH_2CH_2—$;

$Z^{12}$ is independently hydrogen, fluorine, methyl or trifluoromethyl;

$W^4$ is hydrogen, methyl, straight-chain alkyl having 1 to 7 carbons, branched alkyl having 1 to 7 carbons, alkoxycarbonyl ($—COOR^a$; $R^a$ is straight-chain alkyl having 1 to 7 carbons) or alkylcarbonyl ($—COR^b$; $R^b$ is straight-chain alkyl having 1 to 15 carbons);

$X^2$ is independently —O— or a group represented by formula (a); and m1, m2, n1 and n2 are independently an integer from 2 to 15.

Formula 2

(2-1)

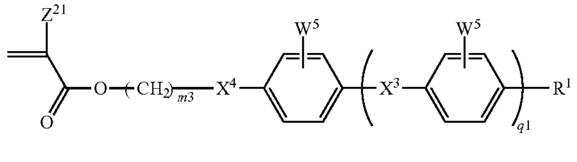

Here, $Z^{21}$ is hydrogen or methyl;

$W^5$ is independently hydrogen, fluorine or a methoxy;

$X^3$ is independently a single bond, —COO—, —OCO—, $—OCO—CH{=}CH—$, $—CH{=}CH—COO—$, $—OCO—CH_2CH_2—$ or $—CH_2CH_2—COO—$;

$X^4$ is a single bond, —O—, —COO—, —OCO—, formula (a), $—OCO—CH{=}CH—$, $—CH{=}CH—COO—$ or $—OCO—CH_2CH_2—$;

m3 is an integer from 2 to 15; and q1 is 0 to 2.

Item 2. The polymerizable liquid crystal composition according to item 1, wherein, in formula (1-1) to formula (1-3), $Z^{11}$ is independently hydrogen or methyl;

$W^1$ is independently hydrogen or fluorine;

$Z^{12}$ is independently hydrogen or methyl;

and in formula (2-1), $R^c$ in $R^1$ is straight-chain alkyl having 1 to 10 carbons;

$W^5$ is independently hydrogen or fluorine; and $X^4$ is a single bond, —O—, —COO—, —OCO—, formula (a), $—OCO—CH{=}CH—$ or $—CH{=}CH—COO—$.

Item 3. The polymerizable liquid crystal composition according to item 1, wherein, in formula (1-1) to formula (1-3), $Z^{11}$ is independently hydrogen or methyl;

$W^1$ is independently hydrogen or fluorine;

$W^2$ is hydrogen and $W^3$ is methyl;
$Z^{12}$ is independently hydrogen or methyl;
and in formula (2-1),
$R^c$ in $R^1$ is straight-chain alkyl having 1 to 10 carbons;
$W^5$ is independently hydrogen or fluorine; and
$X^4$ is a single bond, —O—, —COO—, —OCO—, formula (a), —OCO—CH═CH— or —CH═CH—COO—.

Item 4. The polymerizable liquid crystal composition according to item 1, wherein,
in formula (1-1) to formula (1-3),
$Z^{11}$ is independently hydrogen or methyl;
$W^1$ is independently hydrogen or fluorine;
$W^2$ and $W^3$ are methyl;
$Z^{12}$ is independently hydrogen or methyl;

Item 7. The polymerizable liquid crystal composition according to any one of items 1 to 6, further containing a surfactant.

Item 8. The polymerizable liquid crystal composition according to item 7, wherein the surfactant is one or more selected from polyalkyl acrylate, polyalkyl methacrylate, polyalkyl vinyl ether, polybutadiene, polyolefin and polyvinyl ether.

Item 9. The polymerizable liquid crystal composition according to any one of items 1 to 8, further containing component (F) being a compound selected from the group of compounds represented by each of formula (6-1) and formula (6-2).

Formula 3

(6-1)

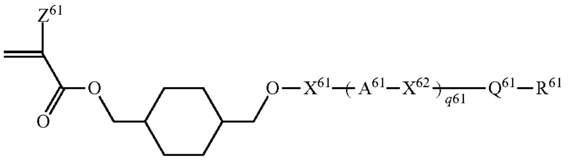

($R^{61}$-A)

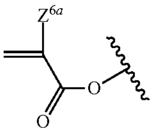

($R^{61}$-B)

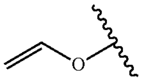

($R^{61}$-C)

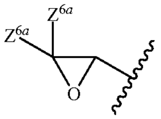

($R^{61}$-D)

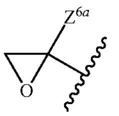

($R^{61}$-E)

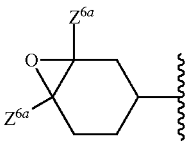

($R^{61}$-F)

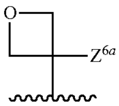

(6-2)

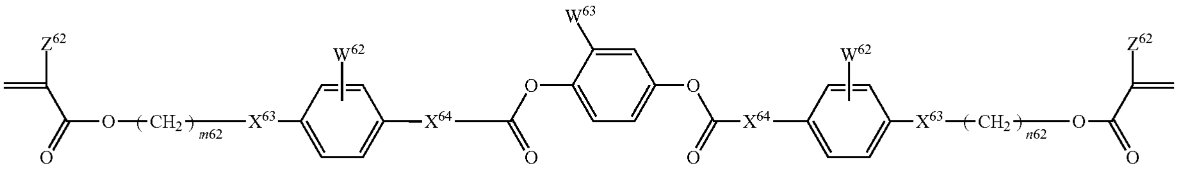

and in formula (2-1), $R^c$ in $R^1$ is straight-chain alkyl having 1 to 10 carbons;
$W^5$ is independently hydrogen or fluorine; and
$X^4$ is a single bond, —O—, —COO—, —OCO—, formula (a), —OCO—CH═CH— or —CH═CH—COO—.

Item 5. The polymerizable liquid crystal composition according to any one of items 1 to 4, wherein a ratio of component (A) is 10 to 97% by weight and a ratio of component (B) is 3 to 90% by weight, based on the total weight of component (A) and component (B).

Item 6. The polymerizable liquid crystal composition according to any one of items 1 to 4, wherein a ratio of component (A) is 15 to 85% by weight and a ratio of component (B) is 15 to 85% by weight, based on the total weight of component (A) and component (B).

In formula (6-1),
$R^{61}$ is a polymerizable group represented by any one of formulas ($R^{61}$-A) to ($R^{61}$—F), hydrogen, chlorine, fluorine, cyano, alkyl having 1 to 10 carbons, alkoxy having 1 to 10 carbons, trifluoromethyl or trifluoromethoxy;
$A^{61}$ is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl, one or non-adjacent two of —$CH_2$— in 1,4-cyclohexylene may be replaced by —O—, one or two of —CH═ in 1,4-phenylene may be replaced by —N═, and at least one of hydrogen in 1,4-phenylene may be replaced by halogen, cyano, alkyl having 1 to 5 carbons, alkoxy having 1 to 5 carbons or alkyl halide having 1 to 5 carbons;

$X^{61}$ is —CO—, —$COCH_2$—, —$CO(CH_2)_2$— or —COCH═CH—;

$X^{62}$ is independently a single bond or alkylene having 1 to 20 carbons, at least one of —$CH_2$— in the alkylene may be replaced by —O—, —CO—, —COO—, —OCO—, —CH═CH—, —CF═CF— or —C≡C—, and in the groups, at least one of hydrogen may be replaced by halogen;

$Q^{61}$ is a single bond or alkylene having 1 to 20 carbons, at least one of —$CH_2$— in the alkylene may be replaced by —O—, —CO—, —COO—, —OCO—, —OCOO— or —CH═CH—, and in the groups, at least one of hydrogen may be replaced by halogen;

q61 is an integer from 1 to 5;

$Z^{61}$ is hydrogen, halogen, alkyl having 1 to 5 carbons or alkyl halide having 1 to 5 carbons;

in formulas ($R^{61}$-A) to ($R^{61}$—F), $Z^{6a}$ is independently hydrogen, halogen, alkyl having 1 to 5 carbons or alkyl halide having 1 to 5 carbons; in formula (6-2), $Z^{62}$ is independently hydrogen, fluorine, methyl or trifluoromethyl;

$W^{62}$ is independently hydrogen, fluorine or a methoxy;

$X^{63}$ is independently —O— or a group represented by formula (a);

$X^{64}$ is independently —CH═CH— or —$CH_2CH_2$—;

$W^{63}$ is hydrogen, methyl, straight-chain alkyl having 1 to 7 carbons, branched alkyl having 1 to 7 carbons, alkoxycarbonyl (—$COOR^a$; $R^a$ is straight-chain alkyl having 1 to 7 carbons) or alkylcarbonyl (—$COR^b$; $R^b$ is straight-chain alkyl having 1 to 15 carbons); and m62 and n62 are independently an integer from 2 to 15.

Item 10. An optical anisotropic film having tilt alignment in an alignment state of a liquid crystal composition, obtained by curing the polymerizable liquid crystal composition according to items 1 to 9, that is coated on a surface treated alignment film.

Item 11. An optical compensation device, having the optical anisotropic film according to item 10.

Item 12. An optical device, having the optical anisotropic film according to item 10 and a polarizing plate.

Item 13. A liquid crystal display apparatus, having the optical compensation device according to item 11 on an internal plane or external plane of a liquid crystal cell.

Item 14. A liquid crystal display apparatus, having the optical device according to item 12 on an external plane of a liquid crystal cell.

Advantageous Effects of Invention

A polymerizable liquid crystal composition of the invention is used, thereby facilitating development of tilt alignment and allowing yielding of an optical anisotropic film having the tilt alignment of a polymerizable liquid crystal compound at low cost. The optical anisotropic film of the invention can be applied to various kinds of optical devices, and the optical devices can be applied to a display apparatus, in particular, a liquid crystal display apparatus.

DESCRIPTION OF EMBODIMENTS

Figure 1:
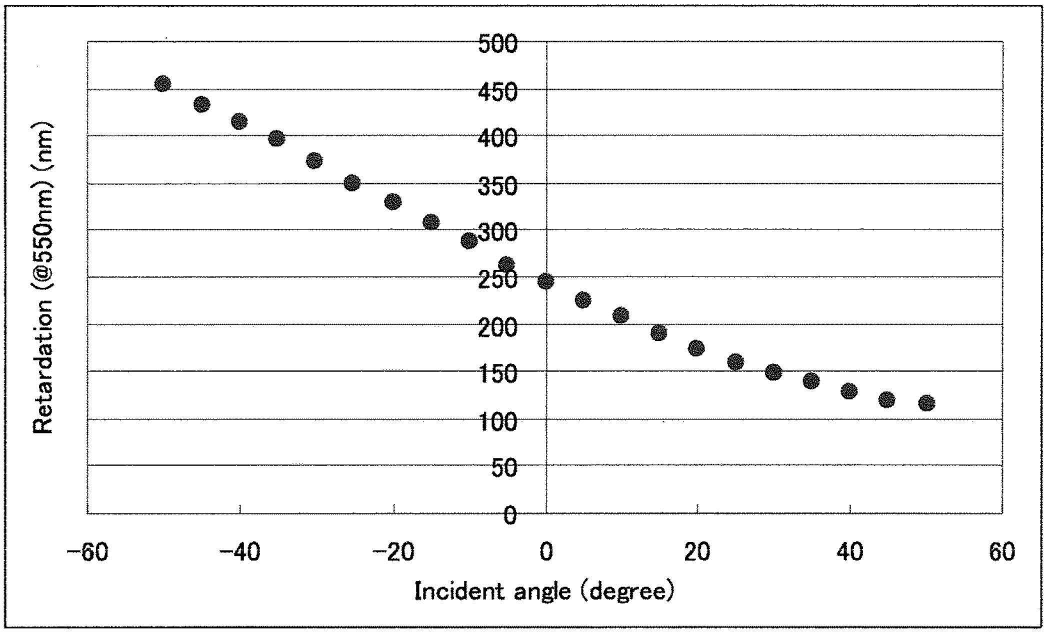
FIG. 1 is a diagram showing results of measurement of retardation of an optical anisotropic film showing tilt alignment.

Usage of terms herein is as described below. "Liquid crystal compound" is a generic term for a compound having a liquid crystal phase, and a compound having no liquid crystal phase but being useful as a component of a liquid crystal composition. The liquid crystal phase includes a nematic phase, a smectic phase and a cholesteric phase, and in many cases, means the nematic phase. Polymerizability means capability of a monomer polymerizing by means of light, heat, a catalyst or the like to give a polymer. A compound represented by formula (1-1) may be occasionally represented as compound (1-1). A same rule also applies to any other compound represented by any other formula. Then, (meth)acrylate represents one or both of acrylate and methacrylate. A substituent on a benzene ring in which a bonding hand is expressed, in a chemical formula, as not bonded with any one of carbon atoms constituting the benzene ring shows that a bonding position thereof is arbitrary.

In the invention, a polymerizable liquid crystal composition is described, for convenience, as a system without containing a solvent in order to facilitate clear expression of a ratio of the component. Further, a solution composed of the polymerizable liquid crystal composition and the solvent is expressed as the solution of the polymerizable liquid crystal composition. When the system contains the solvent, the solution of the polymerizable liquid crystal composition is prepared by dissolving each component of the polymerizable liquid crystal composition into the solvent.

Alignment in the liquid crystal compound is classified into "homogeneous (parallel)," "homeotropic (vertical)," "tilt (tilted)," "twist (twisted)" or the like based on magnitude of a tilt angle or the like. The tilt angle refers to an angle between an alignment state of the liquid crystal compound and a support substrate. "Homogeneous" means a state in which the alignment state is parallel to the substrate and aligned in one direction. Examples of the tilt angle in homogeneous alignment include approximately 0 degrees to approximately 5 degrees. "Homeotropic" means a state in which the alignment state is perpendicular to the substrate. Examples of the tilt angle in homeotropic alignment include approximately 85 degrees to approximately 90 degrees. "Tilt" means a state in which the alignment state further rises from parallel to perpendicular as the alignment state is further separated from the substrate. Examples of the tilt angle in tilt alignment include approximately 5 degrees to approximately 85 degrees. "Twist" means a state in which the alignment state is parallel to the substrate, but is twisted stepwise centering on a helical axis. Examples of the tilt angle in the twist alignment include approximately 0 degrees to approximately 5 degrees.

The composition of the invention contains at least one compound selected from the group of compounds represented by each of formula (1-1), formula (1-2) and formula (1-3) as component (A).

Formula 4

(1-1)

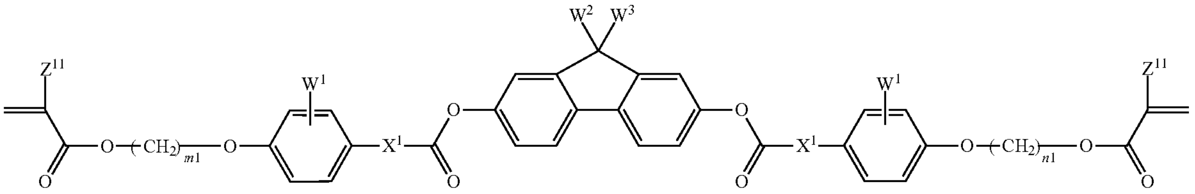

(1-2)

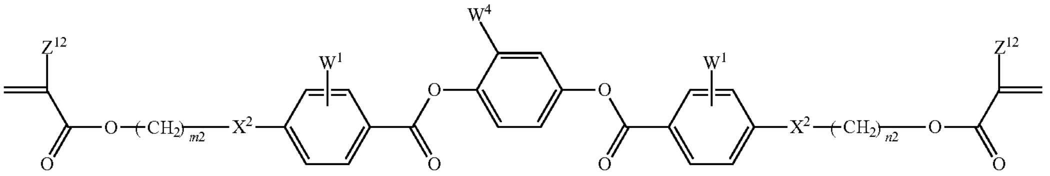

(a)

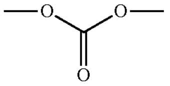

(1-3)

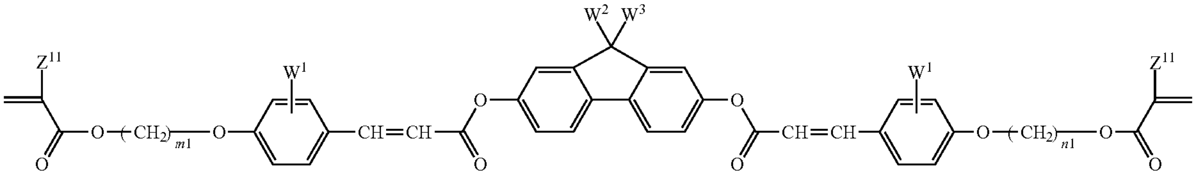

In formula (1-1), formula (1-2) and formula (1-3), $Z^{11}$ is independently hydrogen, fluorine, methyl or trifluoromethyl;

$W^1$ is independently hydrogen, fluorine or a methoxy;

$W^2$ and $W^3$ are independently hydrogen or methyl;

$X^1$ is independently a single bond or $—CH_2CH_2—$;

$Z^{12}$ is independently hydrogen, fluorine, methyl or trifluoromethyl;

$W^4$ is hydrogen, methyl, straight-chain alkyl having 1 to 7 carbons, branched alkyl having 1 to 7 carbons, alkoxy carbonyl ($—COOR^a$; $R^a$ is straight-chain alkyl having 1 to 7 carbons) or alkylcarbonyl ($—COR^b$; $R^b$ is straight-chain alkyl having 1 to 15 carbons);

$X^2$ is independently —O— or a group represented by formula (a); and m1, m2, n1 and n2 are independently an integer from 2 to 15, and preferably, an integer from 2 to 11.

The composition of the invention contains component (B) being at least one compound represented by formula (2-1)

Formula 5

(2-1)

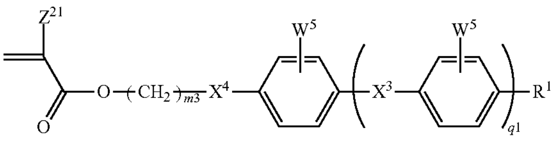

In formula (2-1), $Z^{21}$ is hydrogen or methyl;

$R^1$ is an alkyl ester-containing substituent ($—R^d—COOR^c$, $—R^d—OCOR^c$ or $—R^d—CH{=}CH—COOR^c$; $R^c$ is straight-chain alkyl having 1 to 20 carbons (preferably, 1 to 10, further preferably, 1 to 6); $R^d$ is a single bond or straight-chain alkylene having 1 to 10 carbons (preferably, 1 to 4, and further preferably, 1 to 2);

$W^5$ is independently hydrogen, fluorine or a methoxy;

$X^3$ is independently a single bond, —COO—, —OCO—, —OCO—CH═CH—, —CH═CH—COO—, $—OCO—CH_2CH_2—$ or $—CH_2CH_2—COO—$;

$X^4$ is a single bond, —O—, —COO—, —OCO—, formula (a), —OCO—CH═CH—, —CH═CH—COO— or $—OCO—CH_2CH_2—$;

m3 is an integer from 2 to 15, and preferably, an integer from 2 to 12; and q1 is 0 to 2.

Component (B) has alkyl ester as a terminal group, and thus is presumed to have strong interaction with a side of a substrate interface. Thus, development of the tilt alignment is considered to become easier by adding component (B).

Moreover, structure of component (A) is close to right-left symmetry and can utilize partial structure used in component (A), and therefore can be easily manufactured, thereby allowing obtaining of the polymerizable liquid crystal composition formed into the tilt alignment at low cost.

The composition of the invention may further contain component (C) being at least one compound selected from the group of compounds represented by each of formula (3-1), formula (3-2), formula (3-3), formula (3-4), formula (3-5) and formula (3-6). The tilt angle can be further easily increased by adding component (C).

Formula 6

(3-1)

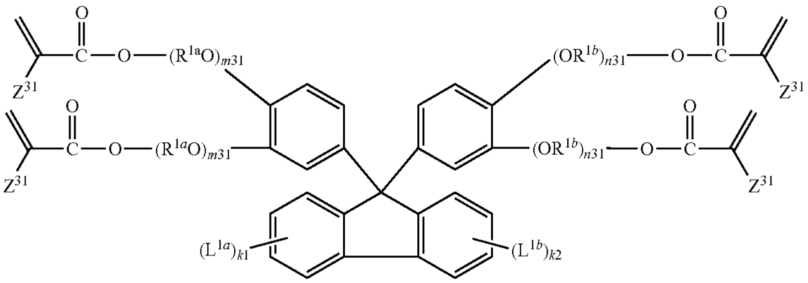

In formula (3-1), $L^{1a}$ and $L^{1b}$ are independently alkyl having 1 to 4 carbons. $R^{1a}$ and $R^{1b}$ are independently alkylene having 2 to 4 carbons, and preferably, alkylene having 2 carbons, namely, ethylene. $Z^{31}$ is independently hydrogen or methyl, and preferably, hydrogen. Then, k1 and k2 are independently an integer from 0 to 4, and preferably, 0. Further, m31 and n31 are independently an integer from 0 to 6, preferably, an integer from 1 to 4, and further preferably, 1.

Formula 7

(3-2)

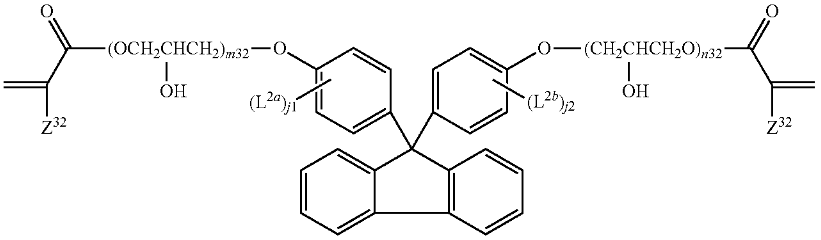

In formula (3-2), $Z^{32}$ is independently hydrogen or methyl, and preferably, hydrogen. Then, m32 and n32 are independently an integer from 1 to 3, and preferably, 1. $L^{2a}$ and $L^{2b}$ are independently alkyl having 1 to 6 carbons, phenyl or fluorine, preferably, methyl, phenyl or fluorine, and further preferably, methyl or phenyl. Then, j1 and j2 are independently an integer from 0 to 4, preferably, an integer from 0 to 2, and further preferably, 0.

Formula 8

(3-3)

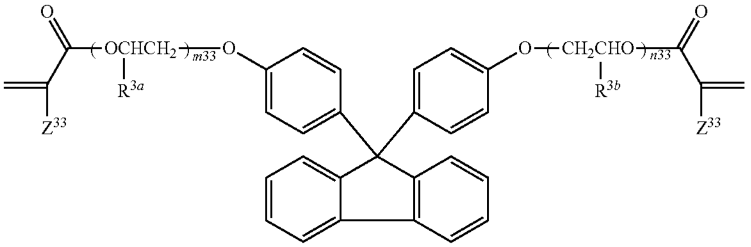

In formula (3-3), $Z^{33}$ is independently hydrogen or methyl, and preferably, hydrogen. $R^{3a}$ and $R^{3b}$ are independently hydrogen, methyl or ethyl, and preferably, hydrogen. Furthermore, m33 and n33 are independently an integer from 0 to 3, and preferably, an integer from 1 to 3.

Formula 9

(3-4)

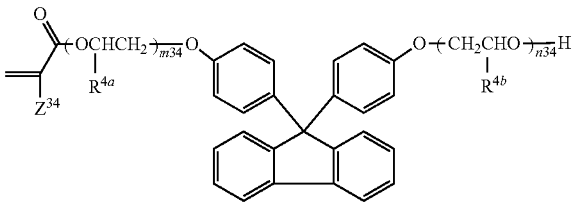

In formula (3-4), $Z^{34}$ is hydrogen or methyl, and preferably, hydrogen. $R^{4a}$ and $R^{4b}$ are independently hydrogen or alkyl having 1 to 6 carbons, and preferably, hydrogen. Then, m34 and n34 are independently an integer from 0 to 10, preferably, an integer from 0 to 5, and further preferably, an integer from 0 to 2.

Formula 10

(3-5)

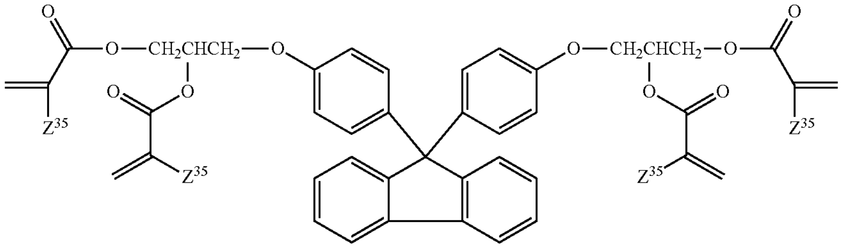

In formula (3-5), $Z^{35}$ is independently hydrogen or methyl, and preferably, hydrogen.

Formula 11

(3-6)

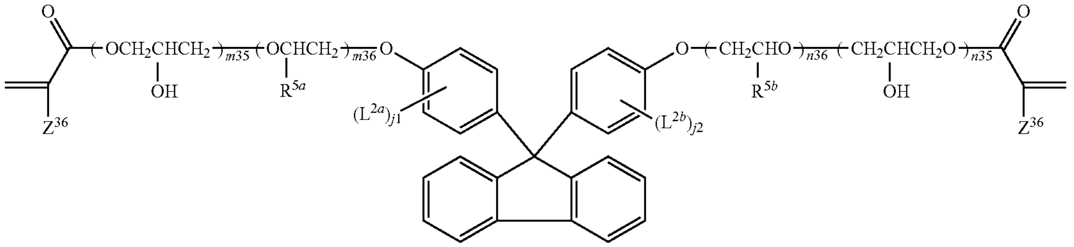

In formula (3-6), $Z^{36}$ is independently hydrogen or methyl, and preferably, hydrogen. $R^{5a}$ and $R^{5b}$ are independently hydrogen or alkyl having 1 to 6 carbons, and preferably, hydrogen. $L^{2a}$ and $L^{2b}$ are independently alkyl having 1 to 6 carbons, phenyl or fluorine, preferably, methyl, phenyl or fluorine, and further preferably, methyl or phenyl. Then, m35 and n35 are independently an integer from 1 to 3, and preferably, 1. Then, m36 and n36 are independently an integer from 1 to 3, and preferably, 1. Furthermore, j1 and j2 are independently an integer from 0 to 4, preferably, an integer from 0 to 2, and further preferably, 0.

Moreover, the composition of the invention may further contain component (D) being at least one compound selected from the group of compounds represented by each of formula (4-1) and formula (4-2).

Formula 12

(4-1)

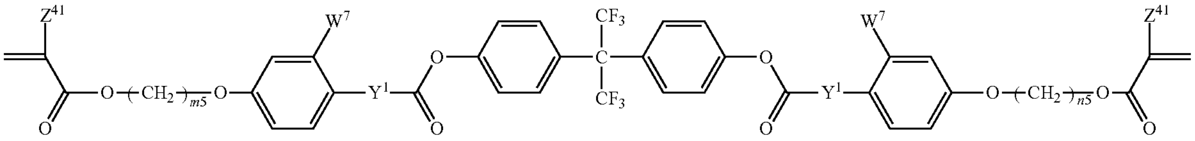

(4-2)

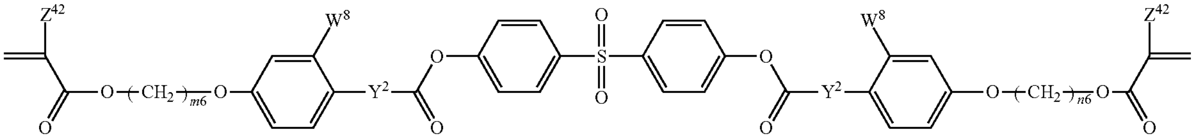

In formula (4-1) and formula (4-2), $Z^{41}$ and $Z^{42}$ are independently hydrogen or methyl. $Y^1$ and $Y^2$ are independently a single bond, $—(CH_2)_2—$ or $—CH{=}CH—$. $W^7$ and $W^8$ are independently hydrogen or fluorine. Then, m5, m6, n5 and n6 are independently an integer from 2 to 15, preferably, an integer from 2 to 10, further preferably, an integer from 2 to 8, and still further preferably, an integer from 4 to 6.

Moreover, the composition of the invention may further contain component (E) being at least one compound selected from the group of compounds represented by formula (5-1).

Formula 13

(5-1)

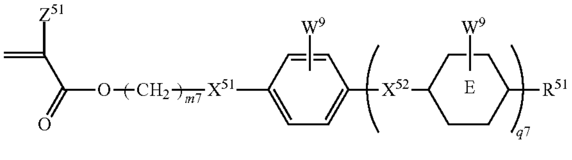

In formula (5-1), $Z^{51}$ is hydrogen or methyl;

$R^{51}$ is cyano, trifluoromethoxy, alkyl having 1 to 20 carbons or alkoxy having 1 to 20 carbons;

ring E represents a benzene ring or a cyclohexane ring;

$W^9$ is independently hydrogen, fluorine or a methoxy;

$X^{52}$ is independently a single bond, —COO—, —OCO—, $—OCO—CH{=}CH—$, $—CH{=}CH—COO—$, $—OCO—CH_2CH_2—$ or $—CH_2CH_2—COO—$; $X^{51}$ is a single bond, —O—, —COO—, —OCO—, formula (a), $—OCO—CH{=}CH—$, $—CH{=}CH—COO—$ or $—OCO—CH_2CH_2—$;

m7 is an integer from 2 to 15, and preferably, an integer from 2 to 12; and q7 is 0 to 2.

Moreover, the composition of the invention may further contain component (F) being at least one compound selected from the group of compounds represented by formula (6-1) and formula (6-2).

Formula 14

(6-1)

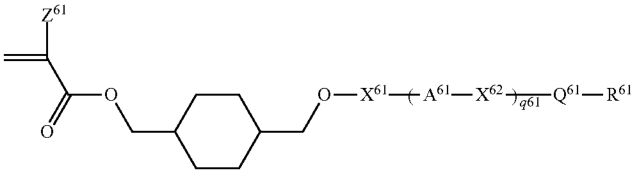

($R^{61}$-A)

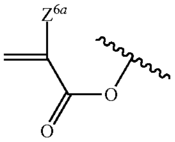

($R^{61}$-B)

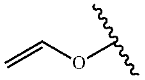

($R^{61}$-C)

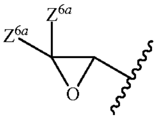

($R^{61}$-D)

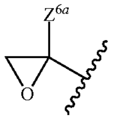

-continued (R$^{61}$-E)

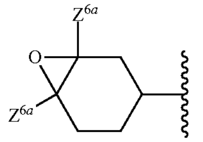

(R$^{61}$-F)

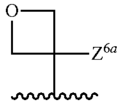

(6-2)

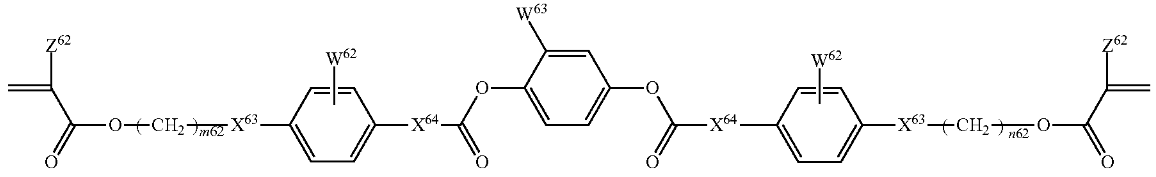

In formula (6-1), $R^{61}$ is a polymerizable group represented by any one of formulas ($R^{61}$-A) to ($R^{61}$—F), hydrogen, chlorine, fluorine, cyano, alkyl having 1 to 10 carbons, alkoxy having 1 to 10 carbons, trifluoromethyl or trifluoromethoxy;

$A^{61}$ is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl, one or non-adjacent two of —$CH_2$— in 1,4-cyclohexylene may be replaced by —O—, one or two of —CH═ in 1,4-phenylene may be replaced by —N═, and at least one of hydrogen in 1,4-phenylene may be replaced by halogen, cyano, alkyl having 1 to 5 carbons, alkoxy having 1 to 5 carbons or alkyl halide having 1 to 5 carbons;

$X^{61}$ is —CO—, —$COCH_2$—, —$CO(CH_2)_2$— or —COCH═CH—;

$X^{62}$ is independently a single bond or alkylene having 1 to 20 carbons, at least one of —$CH_2$— in the alkylene may be replaced by —O—, —CO—, —COO—, —OCO—, —CH═CH—, —CF═CF— or —C≡C—, and in the groups, at least one of hydrogen may be replaced by halogen;

$Q^{61}$ is a single bond or alkylene having 1 to 20 carbons, at least one of —$CH_2$— in the alkylene may be replaced by —O—, —CO—, —COO—, —OCO—, —OCOO— or —CH═CH—, and in the groups, at least one of hydrogen may be replaced by halogen;

q61 is an integer from 1 to 5; and $Z^{61}$ is hydrogen, halogen, alkyl having 1 to 5 carbons or alkyl halide having 1 to 5 carbons.

In formulas ($R^{61}$-A) to ($R^{61}$—F), $Z^{6a}$ is independently hydrogen, halogen, alkyl having 1 to 5 carbons or alkyl halide having 1 to 5 carbons.

In addition, in the invention, halogen refers to Group 17 elements, and specifically, fluorine, chlorine, bromine or iodine, and preferably, fluorine, chlorine or bromine.

In formula (6-2), $Z^{62}$ is independently hydrogen, fluorine, methyl or trifluoromethyl;

$W^{62}$ is independently hydrogen, fluorine or a methoxy;

$X^{63}$ is independently —O— or a group represented by formula (a);

$X^{64}$ is independently —CH═CH— or —$CH_2CH_2$—;

$W^{63}$ is hydrogen, methyl, straight-chain alkyl having 1 to 7 carbons, branched alkyl having 1 to 7 carbons, alkoxycarbonyl (—$COOR^a$; $R^a$ is straight-chain alkyl having 1 to 7 carbons) or alkylcarbonyl (—$COR^b$; $R^b$ is straight-chain alkyl having 1 to 15 carbons); and m62 and n62 are independently an integer from 2 to 15.

The polymerizable liquid crystal composition of the invention has the nematic phase at room temperature, and is subjected to the tilt alignment on a plastic substrate subjected to photo-alignment treatment or rubbing alignment treatment, or on an alignment film such as a polyimide film subjected to photo-alignment treatment or rubbing alignment treatment. If the composition of the invention contains a monofunctional component represented by formula (2-1) (namely, component (B)), the composition has stronger trend of the tilt alignment on the alignment film subjected to alignment treatment. Moreover, the composition of the invention is easily subjected to the tilt alignment also when the composition contains a bifunctional component (namely, component (A)) represented by formulas (1-1) to (1-3) in which a fluorene ring or benzene ring being center structure of a mesogen skeleton is asymmetrical.

The compounds used for the composition of the invention will be described.

The compounds represented by formula (1-1), formula (1-2) and formula (1-3) have two polymerizable groups. A polymer of the polymerizable liquid crystal compound can be formed into three-dimensional structure, and therefore the compound give a harder polymer in comparison with a compound having one polymerizable group. The compounds represented by formula (1-1), formula (1-2) and formula (1-3) exhibit the liquid crystal phase over a wide temperature range. Moreover, the compounds is easily subjected to the homogeneous alignment with regard to a trend of tilt angle development, and tends to be subjected to the tilt alignment when the fluorene ring or benzene ring being the center structure of the mesogen skeleton is asymmetrical, although a tilt angle depends on a state of an additive or a support substrate.

The compound represented by formula (2-1) has one polymerizable group. The compound represented by formula (2-1) has properties of increasing the tilt angle or properties of decreasing a melting point.

The compounds represented by formula (3-1) to formula (3-6) include no liquid crystal compounds. The compounds represented by formula (3-1) to formula (3-6) have fluorene structure and phenoxide structure in one molecule. Moreover, the compounds represented by formula (3-1) to formula (3-6) are effective in homeotropically aligning the liquid crystal compound. In the explanation below, formula (3) may be occasionally used as a generic term for the compounds represented by formula (3-1) to formula (3-6).

The compounds represented by formula (4-1) and formula (4-2) have a bisphenol skeleton and two polymerizable groups. A polymer of the polymerizable compounds can be formed into three-dimensional structure, and therefore the compounds give a harder polymer in comparison with the compound having one polymerizable group. The compounds represented by formula (4-1) and formula (4-2) do not always need to exhibit liquid crystallinity. Moreover, the compounds represented by formula (4-1) and formula (4-2) have property of decreasing the melting point of the polymerizable liquid crystal composition. If the compounds represented by formula (4-1) and formula (4-2) are simultaneously used with other polymerizable liquid crystal compounds, the resulting mixture tends to be easily subjected to the homeotropic alignment, although a tilt angle depends on the conditions for the support substrate, the additive or the like.

The compounds represented by formula (5-1), formula (6-1) and formula (6-2) may be simultaneously used in order to control birefringence (Δn) of the polymerizable liquid crystal composition. The compounds represented by formula (5-1) and formula (6-1) allow control of Δn to a low level, and the compound represented by formula (6-2) allows control of Δn to a high level, when a cinnamate bond is selected.

The composition of the invention may contain any other polymerizable compound (hereinafter, also referred to as "any other polymerizable compound") different from the compounds represented by formulas (1-1) to (1-3), formula (2-1), formula (3-1) to formula (3-6), formula (4-1), formula (4-2), formula (5-1), formula (6-1) and formula (6-2). The composition may further contain an additive such as a surfactant for forming a paint film having a uniform thickness, and for suppressing an alignment defect being a phenomenon in which directions of tilt angle rise of the polymerizable liquid crystal are different. The composition may also contain an additive such as a polymerization initiator and photosensitizer suitable for a polymerization reaction.

The composition may also contain an additive such as an ultraviolet light absorber, an antioxidant, a radical scavenger and a light stabilizer in order to improve polymer characteristics. The composition may also contain an organic solvent allowing sufficient dissolution of the polymerizable liquid crystal composition without damaging the support substrate. The organic solvent is useful for forming a paint film having a uniform thickness. Moreover, the composition may also contain a dichroic dye in order to provide the polymer (liquid crystal film) with polarization characteristics.

A ratio of each component in the composition of the invention will be described.

A preferred ratio of component (A) is approximately 10 to approximately 97% by weight based on the total weight of component (A) and component (B). A further preferred ratio is approximately 15 to approximately 85% by weight based thereon.

A preferred ratio of component (B) is approximately 3 to approximately 90% by weight based on the total weight of component (A) and component (B). A further preferred ratio is approximately 15 to approximately 85% by weight based thereon.

A preferred ratio when using component (C) is approximately 0.01 to approximately 0.20 in terms of a weight ratio based on the total weight of component (A) and component (B). A further preferred weight ratio is approximately 0.03 to approximately 0.15 based thereon.

A preferred ratio when using component (D) is approximately 0.01 to approximately 0.25 in terms of the weight ratio based on the total weight of component (A) and component (B). A further preferred ratio is approximately 0.03 to approximately 0.15 based thereon.

A preferred ratio when using component (E) is approximately 0.01 to approximately 1.00 in terms of the weight ration based on the total weight of component (A) and component (B). A further preferred ratio is approximately 0.03 to approximately 0.50 based thereon. In addition, when using a compound having a cyano group in a terminal group as component (E), a preferred ratio is approximately 0.03 to approximately 1.00 in terms of the weight ratio based on the total weight of component (A) and component (B) from a viewpoint of facilitating development of the tilt alignment.

A preferred ratio when using component (F) is approximately 0.01 to approximately 1.00 in terms of the weight ratio based on the total weight of component (A) and component (B). A further preferred ratio is approximately 0.03 to approximately 0.50 based thereon.

A preferred amount of addition when using any other polymerizable compound is approximately 0.01 to approximately 0.40, and a further preferred ratio is approximately 0.03 to approximately 0.25, in terms of the weight ratio based on the total weight of component (A) and component (B). When the additive such as the surfactant and the polymerization initiator is used, an amount used may be minimum amount for attaining the object.

A combination of each component in the composition of the invention will be described.

A preferred combination includes a combination of component (A) and component (B).

When controlling the tilt angle, a combination of component (A), component (B) and component (C);

a combination of component (A), component (B) and component (D); and a combination of component (A), component (B), component (C) and component (D) are preferred.

With regard to each combination, component (E), component (F) and any other polymerizable compound may be further combined.

Next, methods for synthesizing the compounds will be described. The compounds used in the invention can be synthesized by combining synthesis methods in organic chemistry described in Houben-Wyle, Methoden der Organischen Chemie (Georg-Thieme Verlag, Stuttgart), Organic Reactions (John Wily & Sons, Inc.), Organic Syntheses (John Wily & Sons, Inc.), Comprehensive Organic Synthesis (Pergamon Press), New Experimental Chemistry Course (Shin Jikken Kagaku Koza in Japanese) (Maruzen Co., Ltd.) or the like.

A method for synthesizing the compound represented by formula (1-1) is described in JP 2003-238491 A and JP 2006-307150 A. A method for synthesizing the compound represented by formula (1-2) is described in Makromol. Chem., 190, 3201-3215 (1998), WO 97/00600 A or the like. As for a method for synthesizing the compound represented by formula (1-3), a method described in U.S. Pat. No. 5,770,107 B or JP 2012-177087 A can be used as a reference.

In a method for introducing α-fluoroacryloyloxy ($CH_2$═CF—COO—), α-fluoroacrylic acid or α-fluoroacrylic acid chloride can also be used, but a method for acting α-fluoroacrylic acid fluoride ($CH_2$═CFCOOF) thereon is useful. A method for synthesizing α-fluoroacrylic acid fluoride is described in J. Org. Chem., 1989, 54, 5640, JP S60-158137 A, JP S61-85345 A or the like, and synthesis can be made in accordance with the methods. The compounds are used as a starting material, thereby allowing synthesis of the compounds represented by formula (1-1) and formula (1-2).

As methods for synthesizing the compounds represented by formula (2-1) and formula (5-1), synthesis can be made by the methods described in Macromolecules, 26, 6132-6134 (1993), Makromol. Chem., 183, 2311-2321 (1982), DE 19504224 B, WO 1997/00600 A, U.S. Pat. No. 4,952,334 B, U.S. Pat. No. 4,842,754 B or the like.

A method for synthesizing the compound represented by formula (3) is described in the literature below.

Formula (3-1): WO 2005/33061 A.

Formula (3-2) to formula (3-4): JP 2005-338550 A.

Formula (3-4): JP 2002-293762 A.

Formula (3-5): JP 2005-272485 A.

Precursor (epoxyacrylate precursor) of the compound of formula (3-6): JP 2002-348357 A.

A method for synthesizing the compounds represented by formula (4-1) and formula (4-2) is described in JP 2007-16213 A.

A method for synthesizing the compounds represented by formula (6-1) is described in JP 2011-246365 A. A method for synthesizing the compounds represented by formula (6-2) is described in U.S. Pat. No. 5,770,107 B.

Next, examples of component compounds are shown. Preferred examples of the compound represented by formula (1-1) are shown below.

Formula 15

(1-1-A)

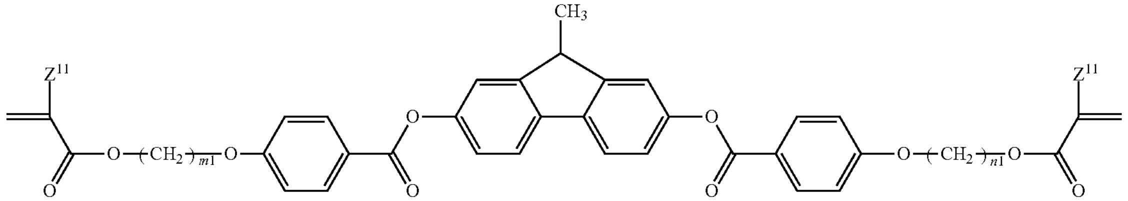

(1-1-B)

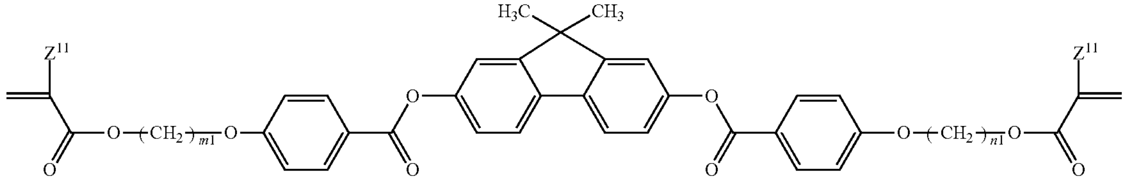

(1-1-C)

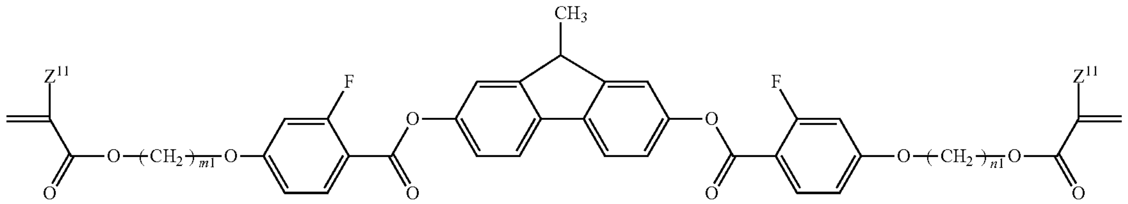

(1-1-D)

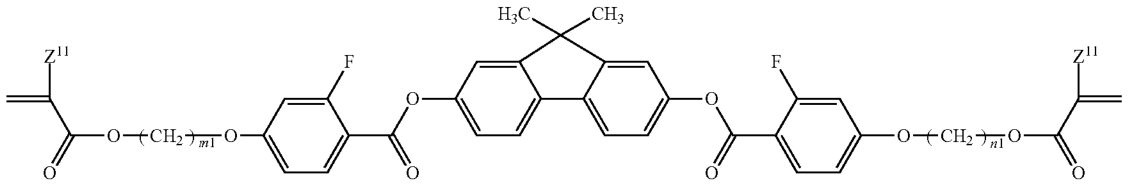

In formulas (1-1-A) to (1-1-D), $Z^{11}$ is independently hydrogen, fluorine, methyl or trifluoromethyl, and m1 and n1 are each independently an integer from 2 to 15, and preferably, an integer from 2 to 11.
Preferred examples of the compound represented by formula (1-2) are shown below.
Formula 16
(1-2-A)
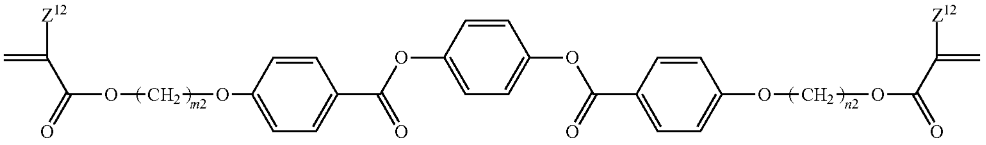
(1-2-B)
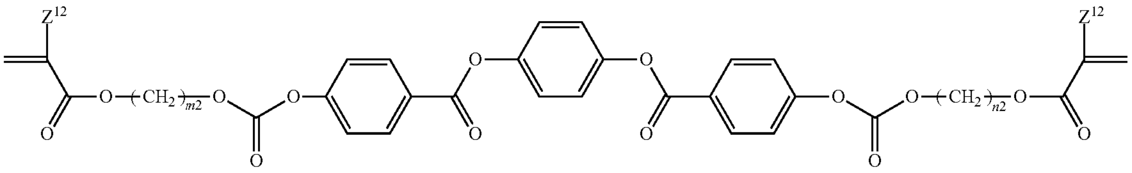
(1-2-C)
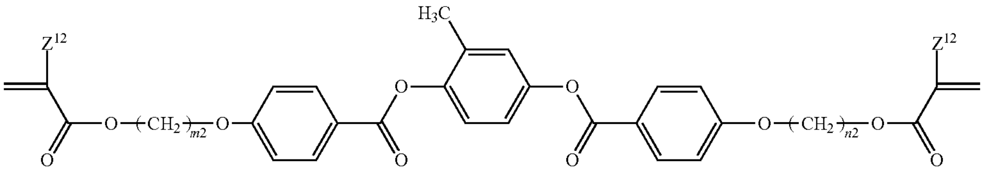
(1-2-D)
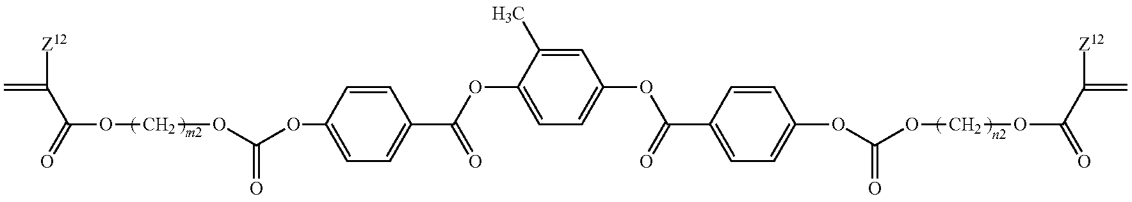
(1-2-E)
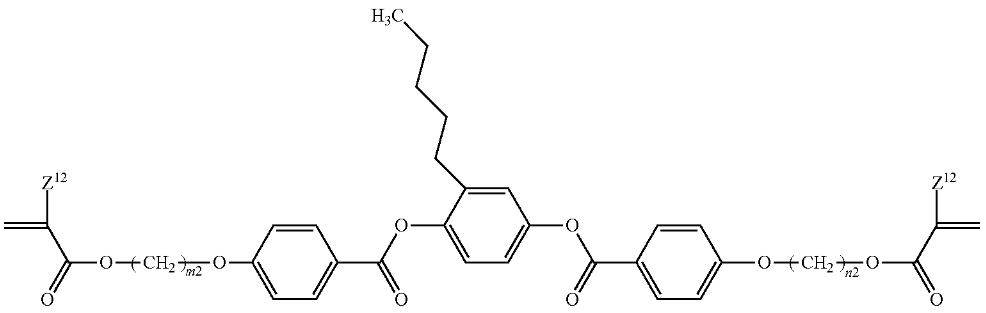
(1-2-F)
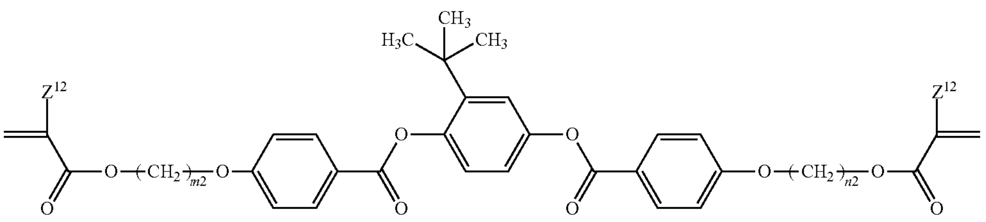

-continued
Formula 17
(1-2-G)
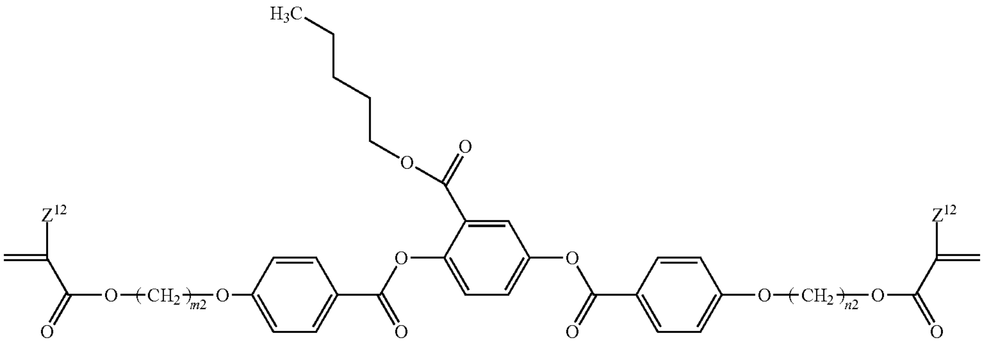
(1-2-H)
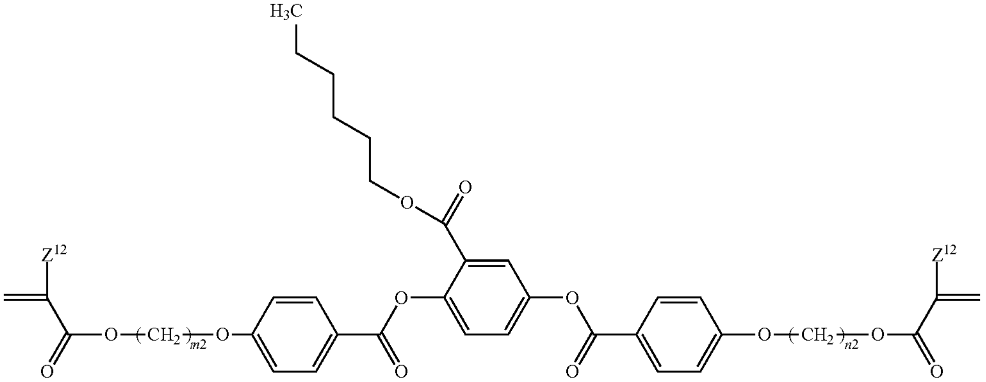
(1-2-I)
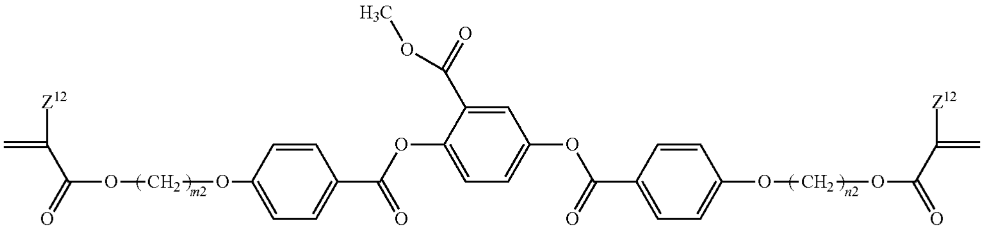
Formula 18
(1-2-J)
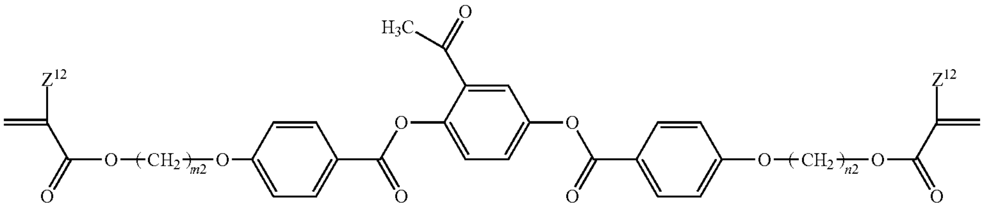
(1-2-K)
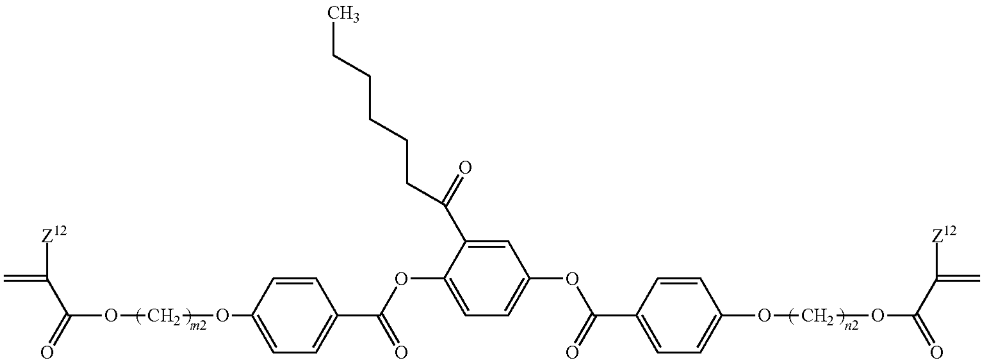

-continued (1-2-L)

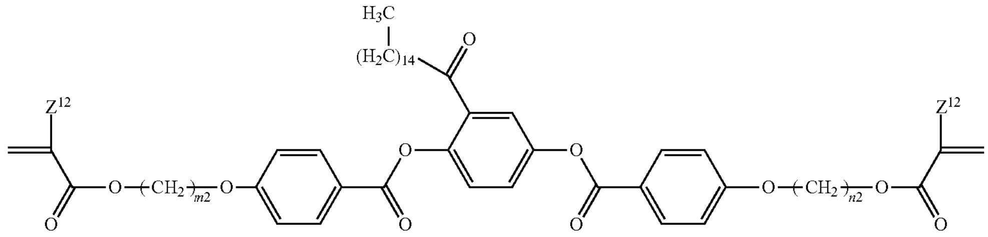

In formulas (1-2-A) to (1-2-L), $Z^{12}$ is independently hydrogen, fluorine, methyl or trifluoromethyl, and m2 and n2 are each independently an integer from 2 to 15, and preferably, an integer from 2 to 11.

Preferred examples of the compound represented by formula (1-3) are shown below.

Formula 19

(1-3-A)

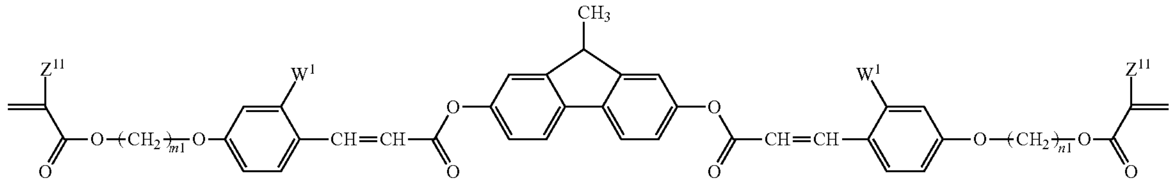

(1-3-B)

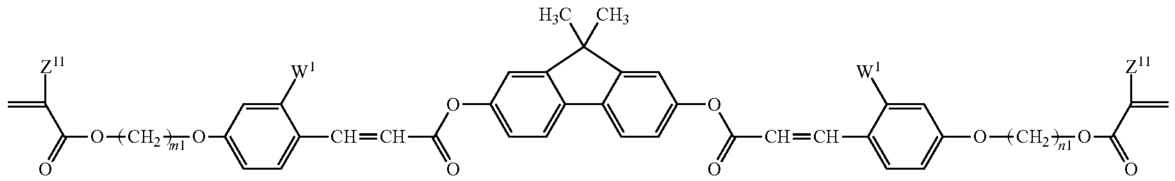

In formulas (1-3-A) to (1-3-B), $Z^{11}$ is independently hydrogen, fluorine, methyl or trifluoromethyl, $W^1$ is independently hydrogen or fluorine, and m1 and n1 are each independently an integer from 2 to 15, and preferably, an integer from 2 to 11. The compounds represented by formulas (1-3-A) to (1-3-B) are preferably a trans isomer, and both of —CH=CH— further preferably take a trans form.

Preferred examples of the compound represented by formula (2-1) are shown below.

Formula 20

(2-1-A)

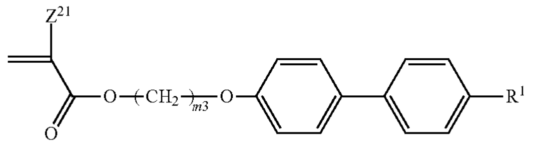

(2-1-B)

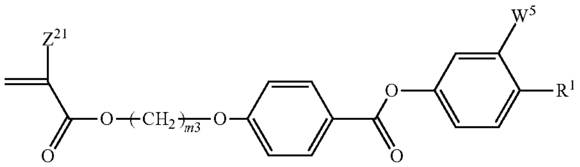

(2-1-C)

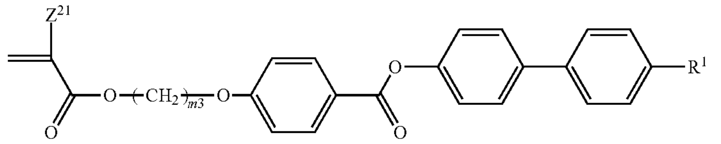

-continued

Formula 21

(2-1-D)

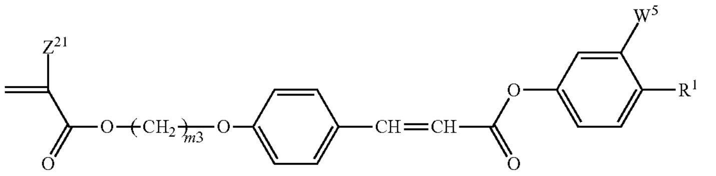

(2-1-E)

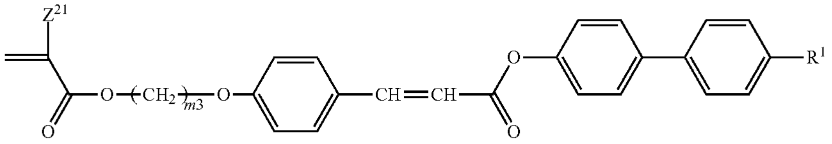

(2-1-F)

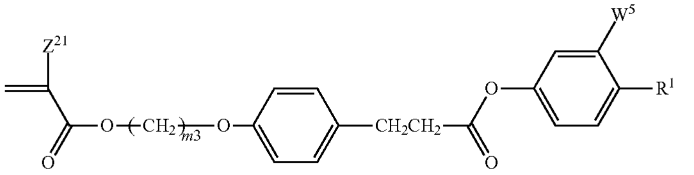

(2-1-G)

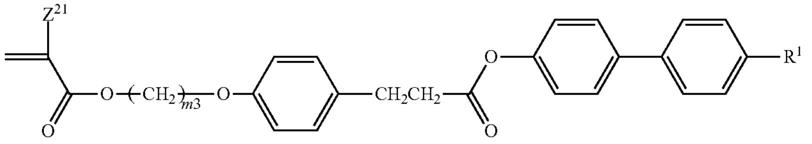

Formula 22

(2-1-H)

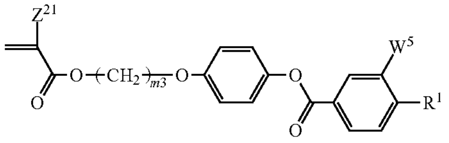

(2-1-I)

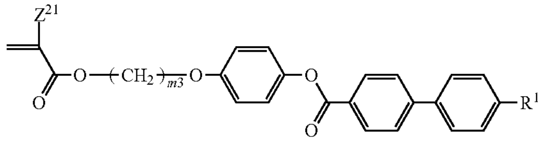

In formulas (2-1-A) to formula (2-1-I), $Z^{21}$ is hydrogen or methyl, $W^5$ is hydrogen or fluorine and $R^1$ and $m^3$ are defined in a manner similar as described above.

In formula (2-1-D) and formula (2-1-E), a trans isomer is further preferred.

Preferred examples of the compounds represented by formula (3-1) to formula (3-6) are shown below.

Formula 23

(3-1-A)

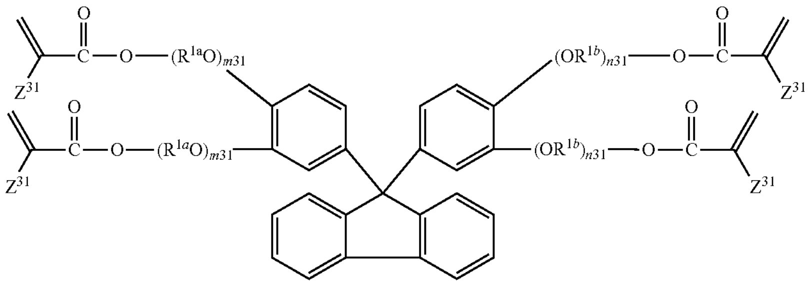

wherein, $Z^{31}$ is independently hydrogen or methyl, $R^{1a}$ and $R^{1b}$ are independently alkylene having 2 to 4 carbons, and m31 and n31 are independently an integer from 0 to 6.

Formula 24

(3-2-A)

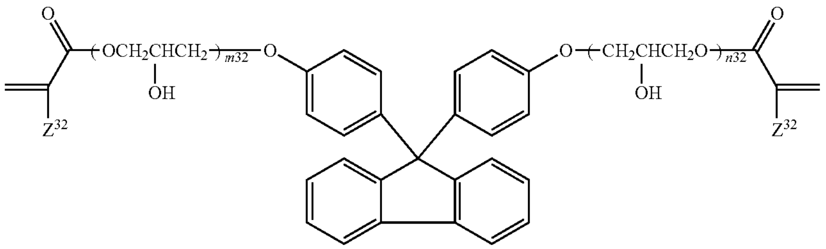

wherein, $Z^{32}$ is independently hydrogen or methyl, and m32 and n32 are independently an integer from 1 to 3.

Formula 25

(3-3-A)

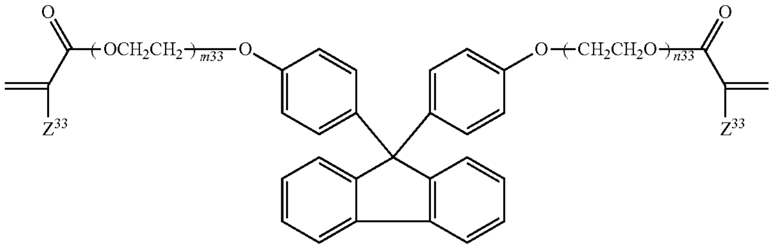

wherein, $Z^{33}$ is independently hydrogen or methyl, and m33 and n33 are independently an integer from 0 to 3.

Formula 26

(3-4-A)

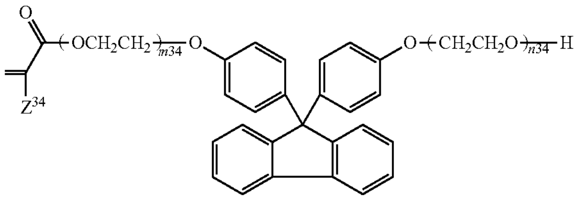

wherein, $Z^{34}$ is hydrogen or methyl, and m34 and n34 are independently an integer from 0 to 10.

Formula 27

(3-5-A)

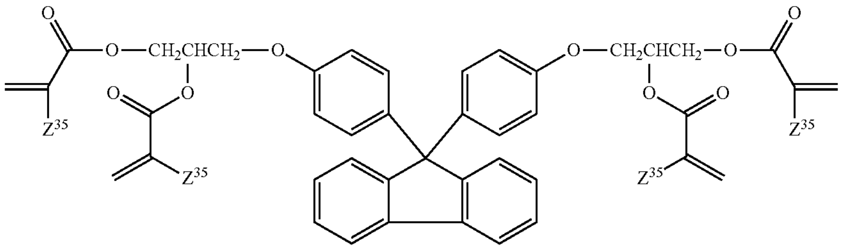

wherein, $Z^{35}$ is independently hydrogen or methyl.

Formula 28

(3-6-A)

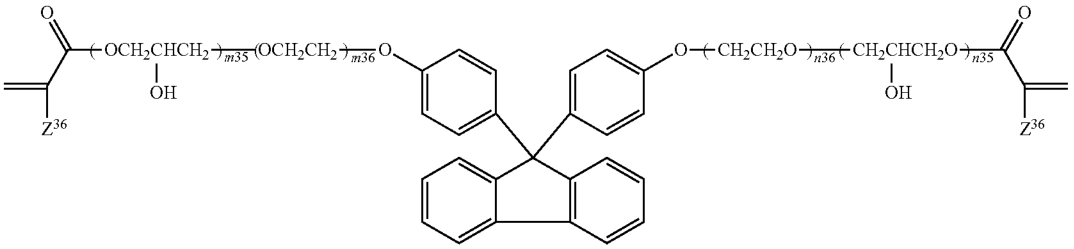

wherein, $Z^{36}$ is independently hydrogen or methyl, m35 and n35 are independently an integer from 1 to 3, and m36 and n36 are independently an integer from 1 to 3.

Preferred examples of the compounds represented by formula (4-1) and formula (4-2) are shown below.

In formula (4-1-A) to formula (4-1-C), $Z^{41}$ is independently hydrogen or methyl, $W^7$ is independently hydrogen or fluorine, and m5 and n5 are independently an integer from 2 to 15. In formula (4-2-A) to formula (4-2-C), $Z^{42}$ is independently hydrogen or methyl, $W^8$ is independently hydrogen or fluorine, and m6 and n6 are independently an Formula 29

(4-1-A)

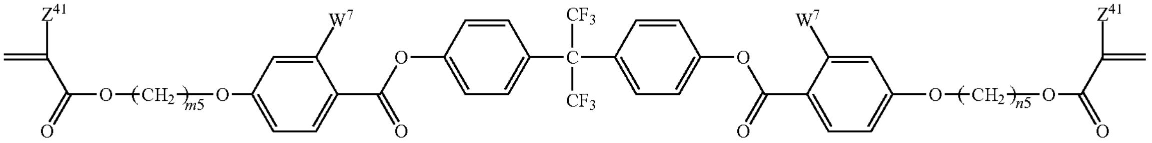

(4-1-B)

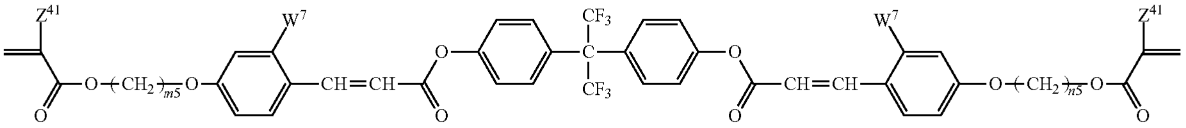

(4-1-C)

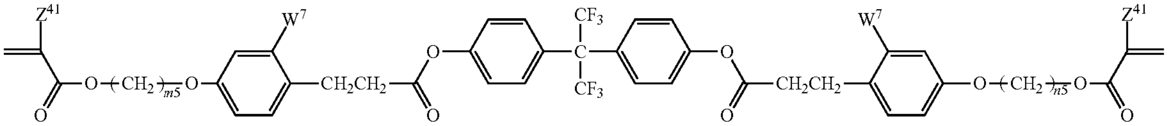

Formula 30

(4-2-A)

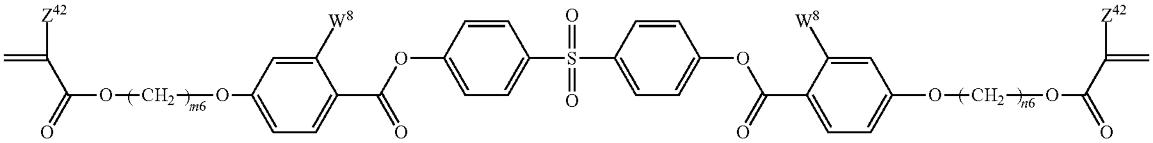

(4-2-B)

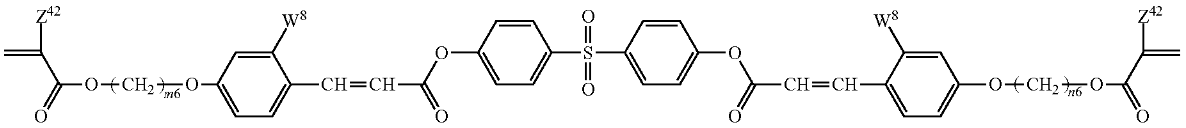

(4-2-C)

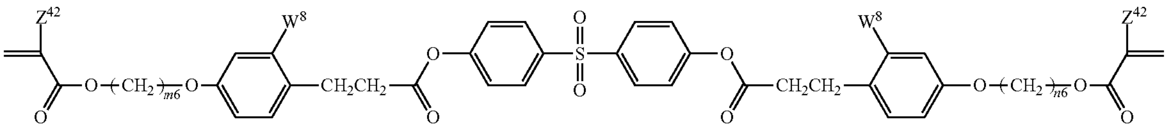

integer from 2 to 15. In formula (4-1-B) and formula (4-2-B), a trans isomer is preferred, and both of —CH═CH— further preferably take a trans form.
Preferred examples of the compound represented by formula (5-1) are shown below.
Formula 31
(5-1-A)
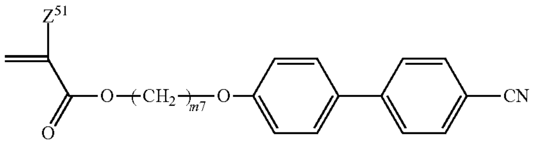
(5-1-B)
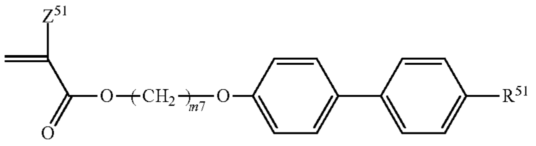
(5-1-C)
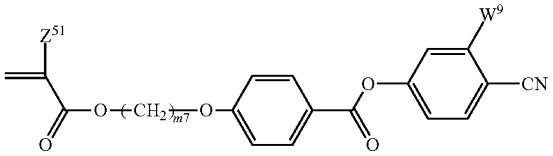
(5-1-D)
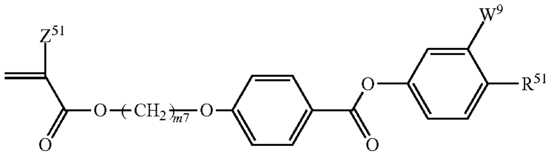
(5-1-E)
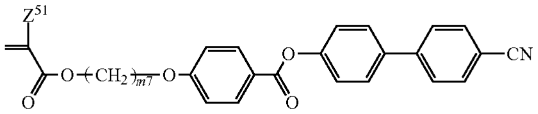
(5-1-F)
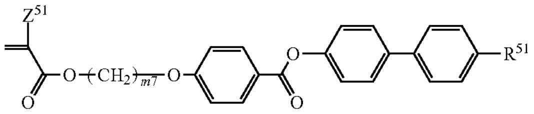
Formula 32
(5-1-G)
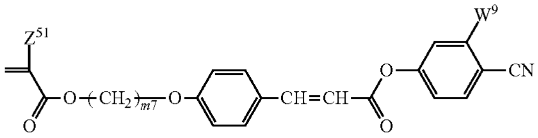
(5-1-H)
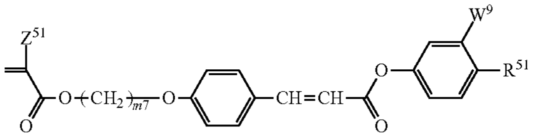
(5-1-I)
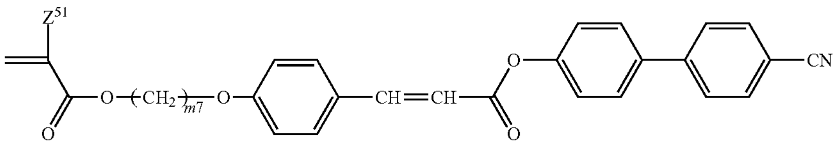
(5-1-J)
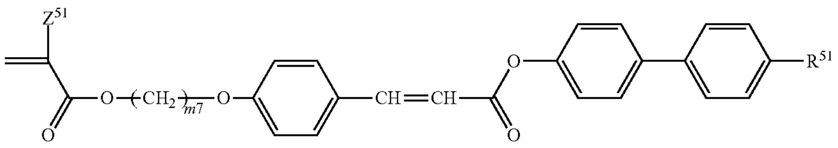
(5-1-K)
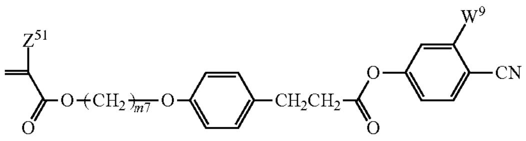
(5-1-L)
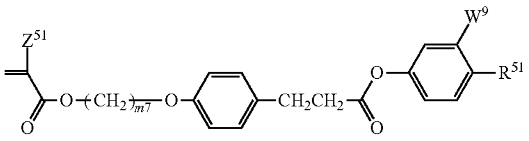
(5-1-M)
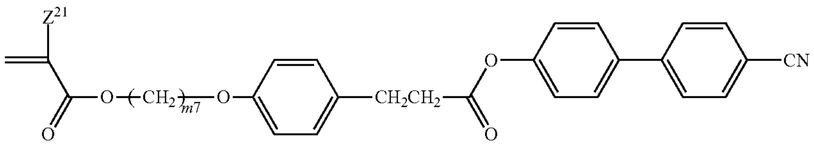

-continued (5-1-N)

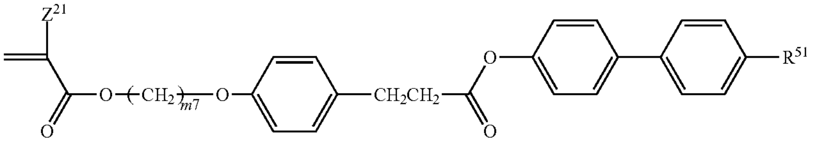

Formula 33

(5-1-O)

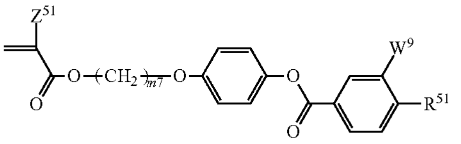

(5-1-P)

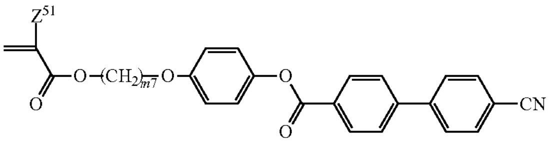

(5-1-Q)

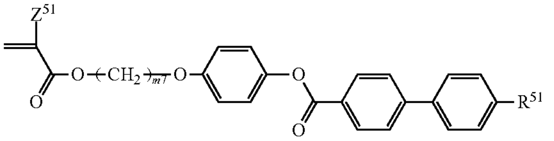

In formula (5-1-A) to formula (5-1-Q), $Z^{51}$ is hydrogen or methyl, $W^{9}$ is hydrogen or fluorine, $R^{51}$ is alkyl having 1 to 20 carbons, alkoxy having 1 to 20 carbons or trifluoromethoxy, m7 is an integer from 2 to 15, and preferably, an integer from 2 to 12.

In formula (5-1-G) to formula (5-1-J), a trans isomer is further preferred.

Preferred examples of the compound represented by formula (6-1) are shown below.

Formula 34

(6-1-1)

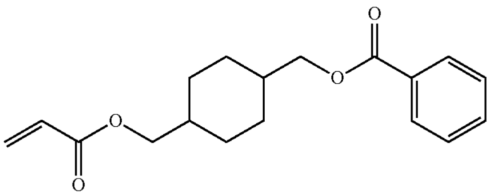

(6-1-2)

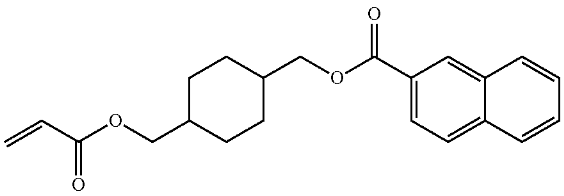

(6-1-3)

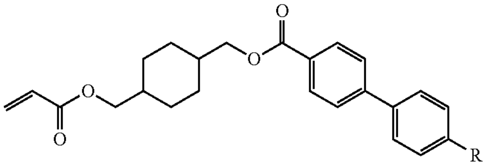

(6-1-4)

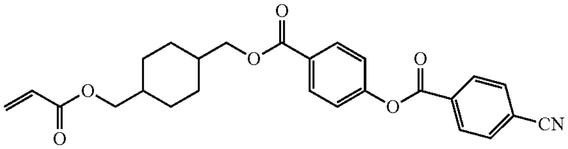

(6-1-5)

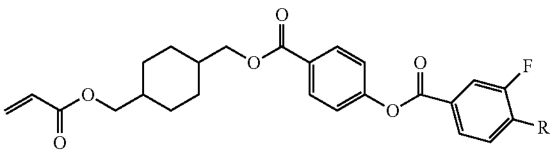

(6-1-6)

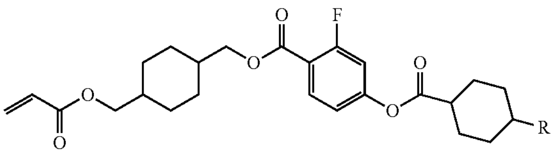

-continued
(6-1-7)
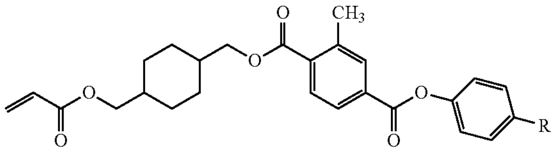
(6-1-8)
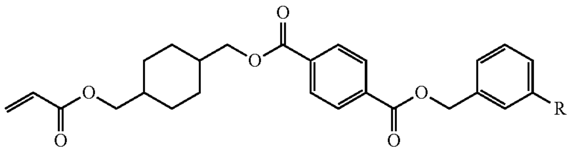
(6-1-9)
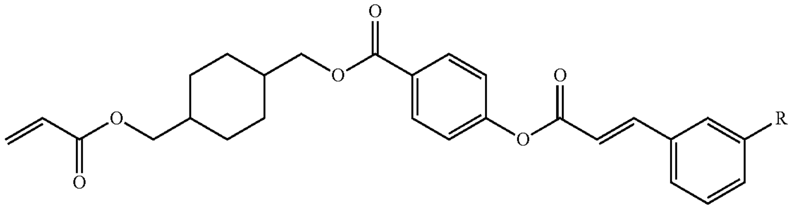
(6-1-10)
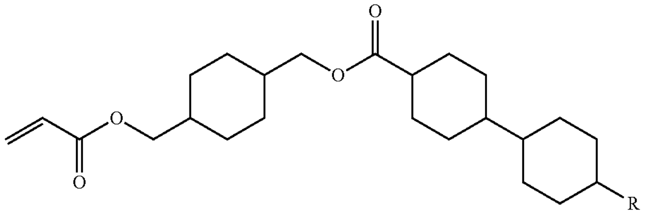
Formula 35
(6-1-11)
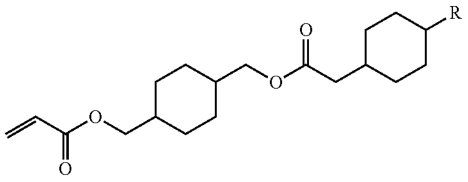
(6-1-12)
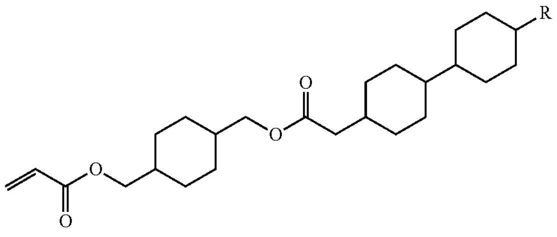
(6-1-13)
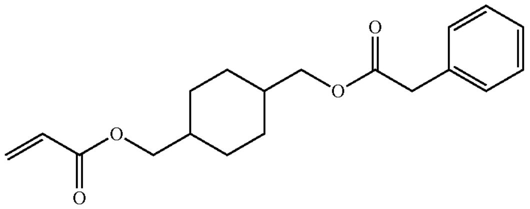
(6-1-14)
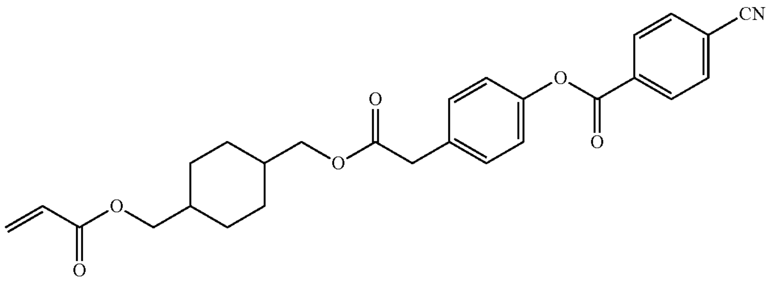

-continued
(6-1-15)
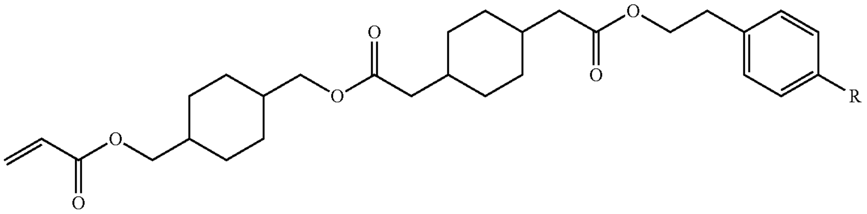
Formula 36
(6-1-16)
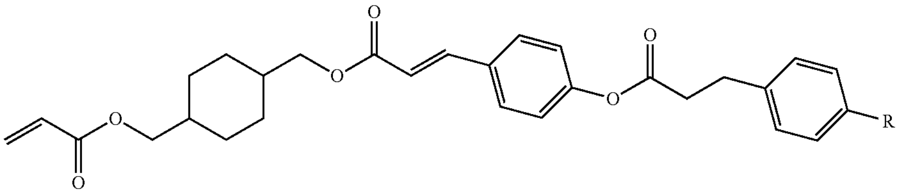
(6-1-17)
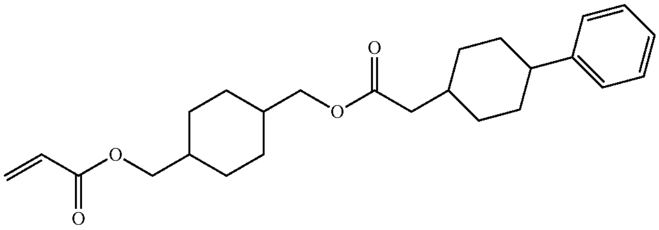
(6-1-18)
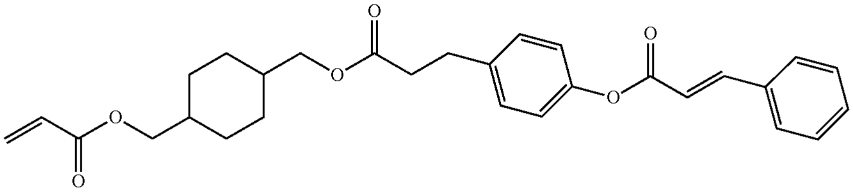
(6-1-19)
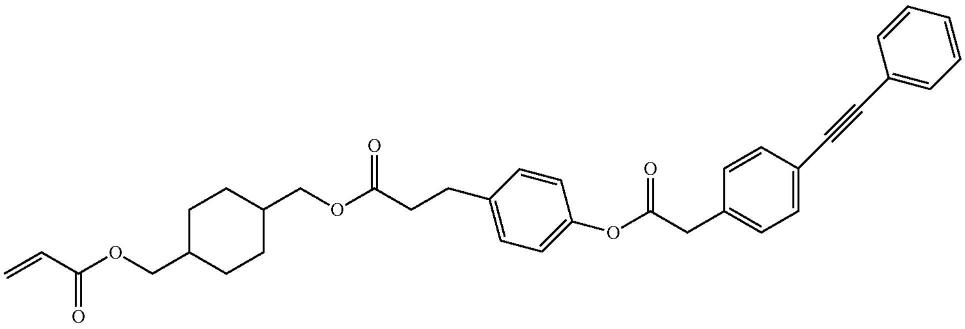
In formula (6-1-1) to formula (6-1-19), R is hydrogen, alkyl having 1 to 10 carbons, alkoxy having 1 to 10 carbons, trifluoromethyl or trifluoromethoxy.
Moreover, in formula (6-1-9), formula (6-1-16) and formula (6-1-18), a trans isomer is further preferred.

Formula 37
(6-1-20)
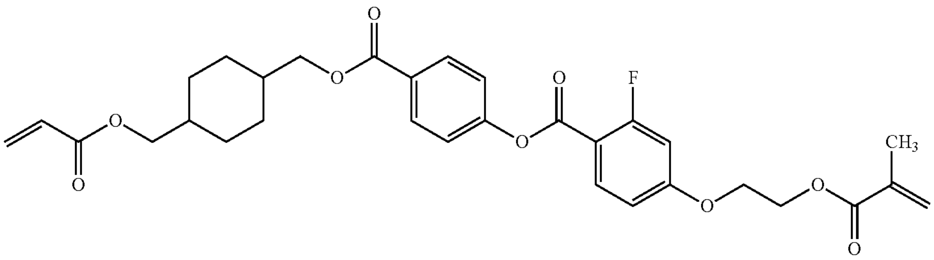
(6-1-21)
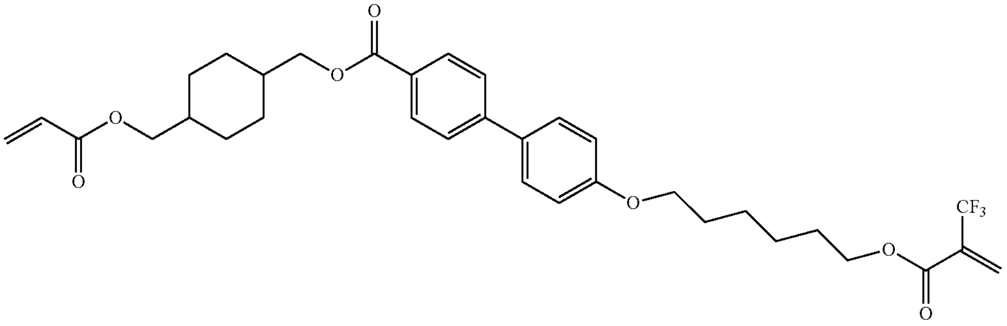
(6-1-22)
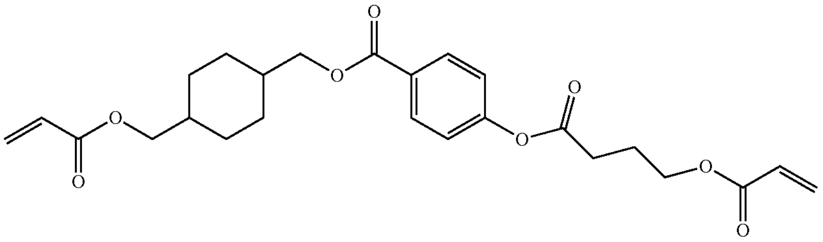
(6-1-23)
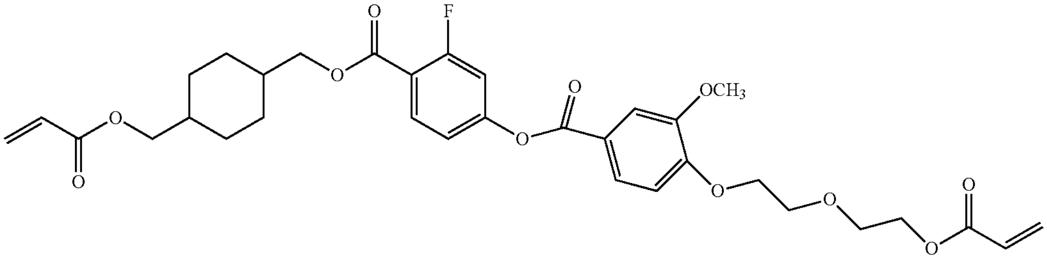
(6-1-24)
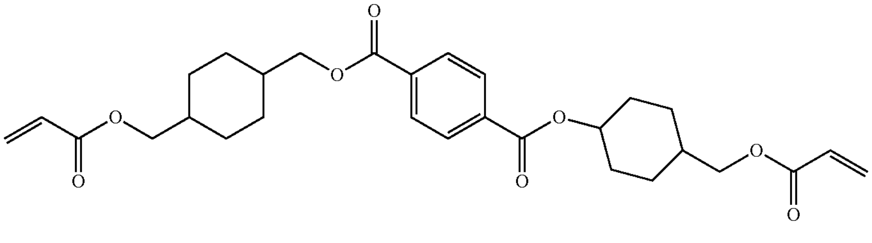
(6-1-25)
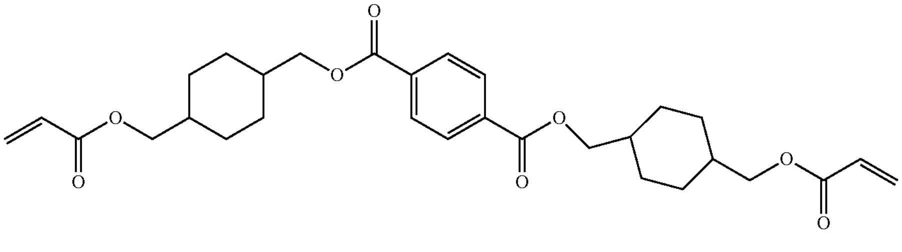

-continued
(6-1-26)
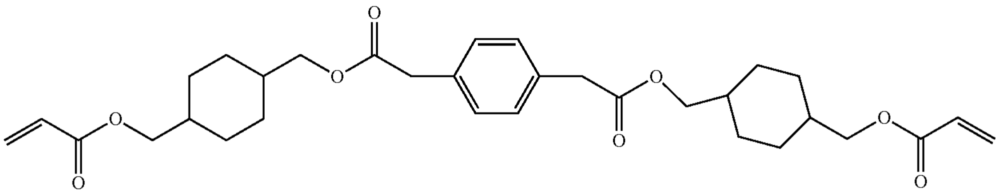
Formula 38
(6-1-27)
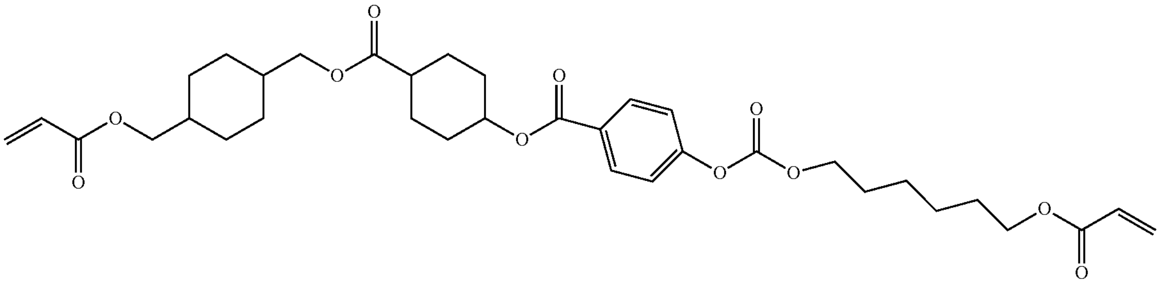
(6-1-28)
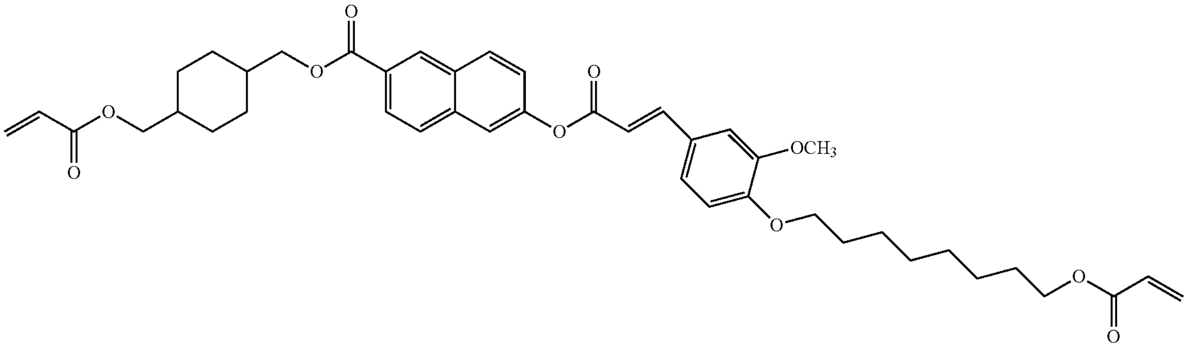
(6-1-29)
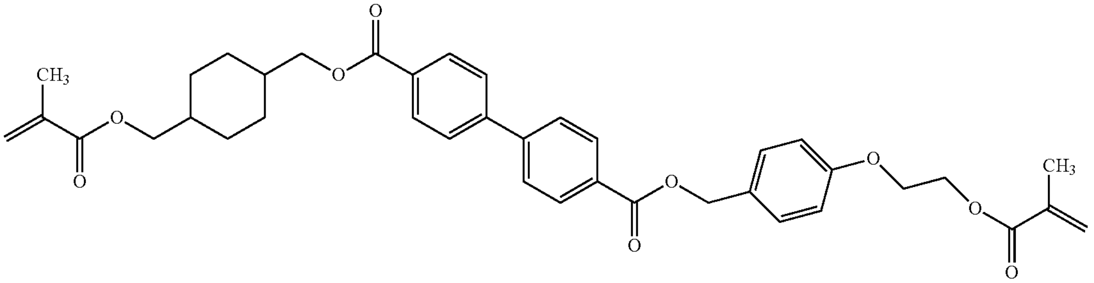
(6-1-30)
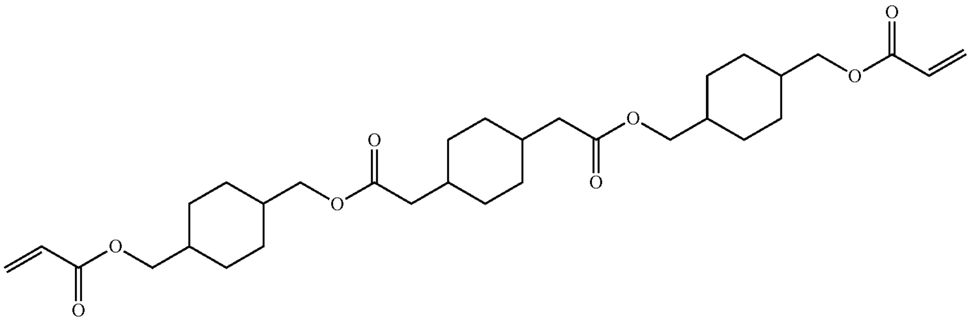

-continued
(6-1-31)
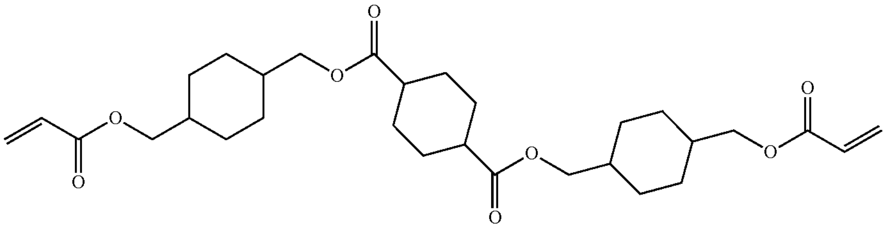
(6-1-32)
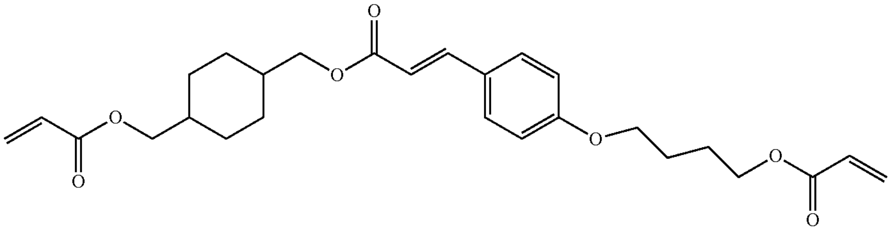
(6-1-33)
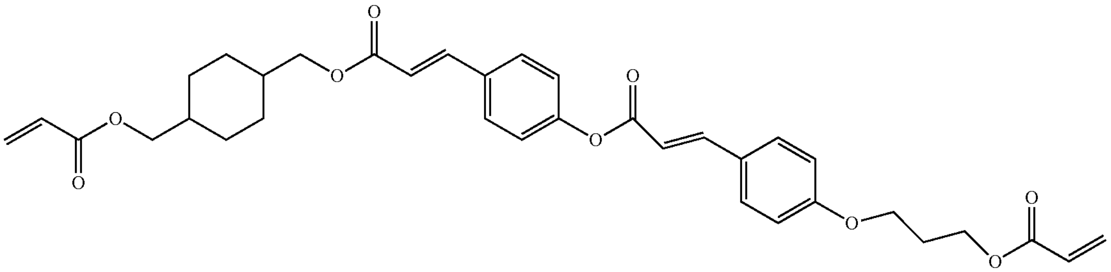
(6-1-34)
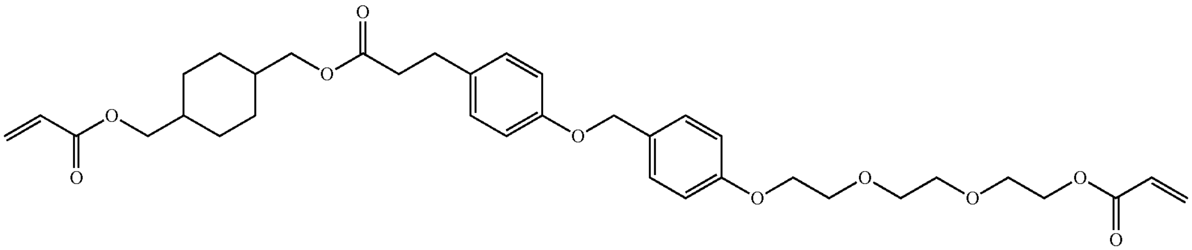
Formula 39
(6-1-35)
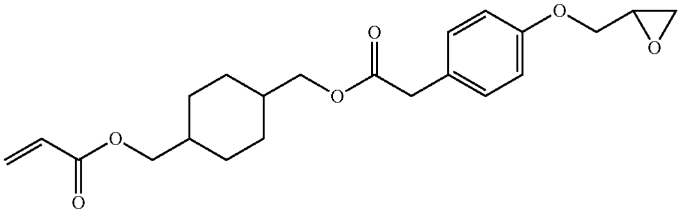
(6-1-36)
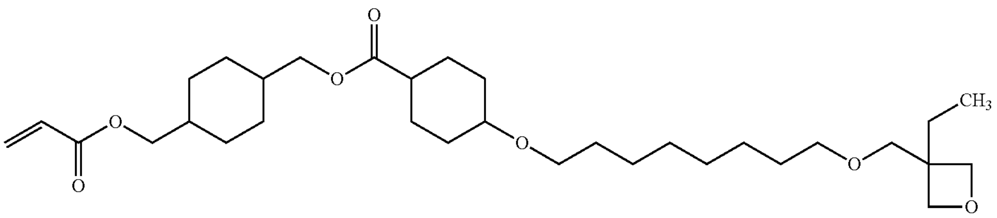

-continued
(6-1-37)
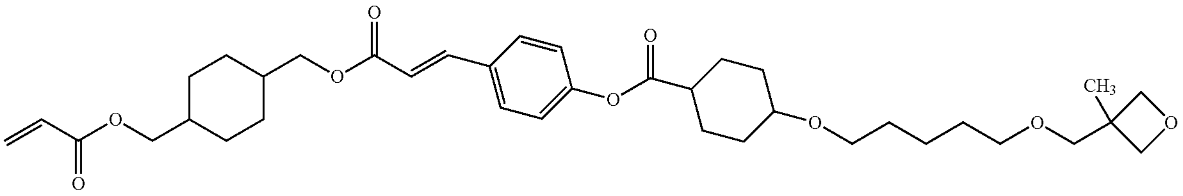
(6-1-38)
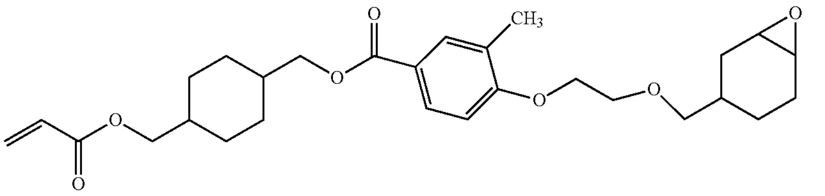
(6-1-39)
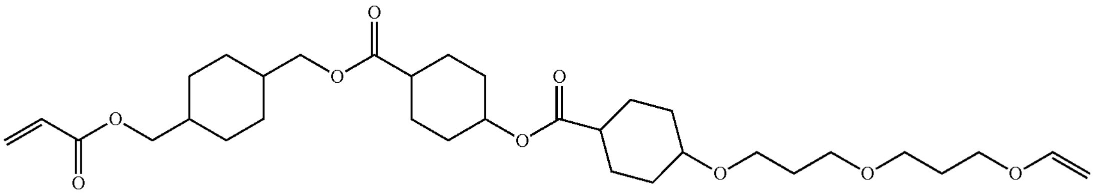
(6-1-40)
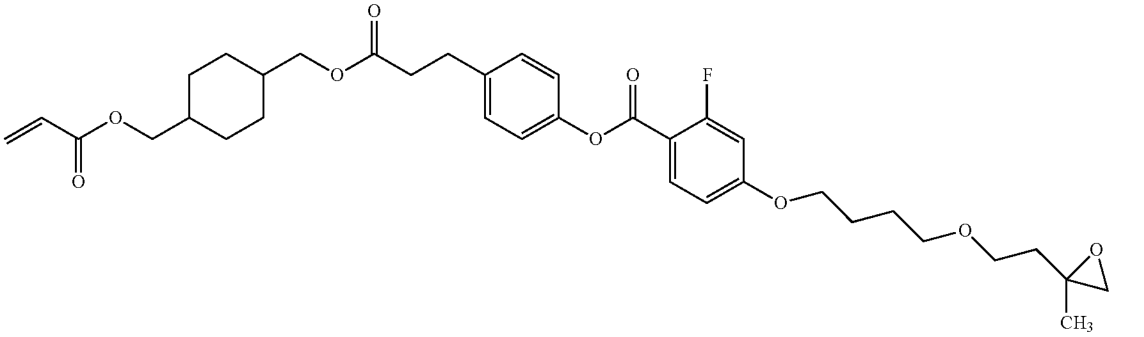
(6-1-41)
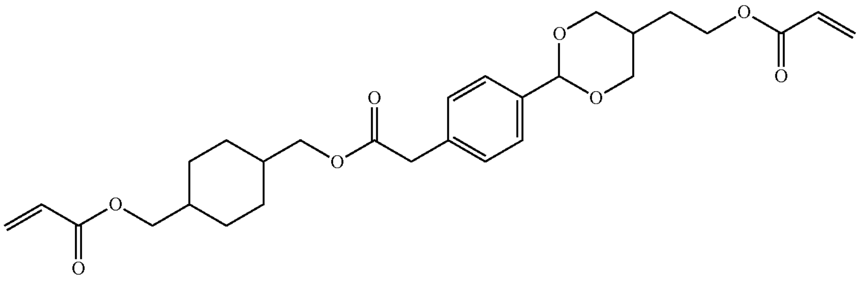
In formula (6-1-28), formula (6-1-32) and formula (6-1-37), a trans isomer is further preferred, the compound represented by formula (6-1-33) is preferably a trans isomer, and both of —CH═CH— further preferably take a trans form.
Preferred examples of the compound represented by formula (6-2) are shown below.

Formula 40

(6-2-A)

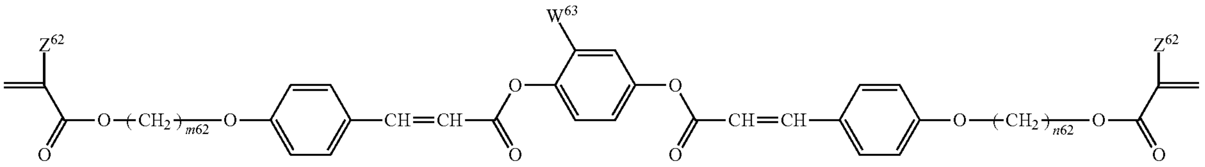

(6-2-B)

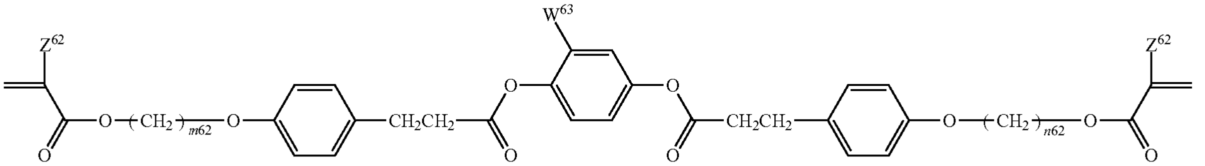

(6-2-C)

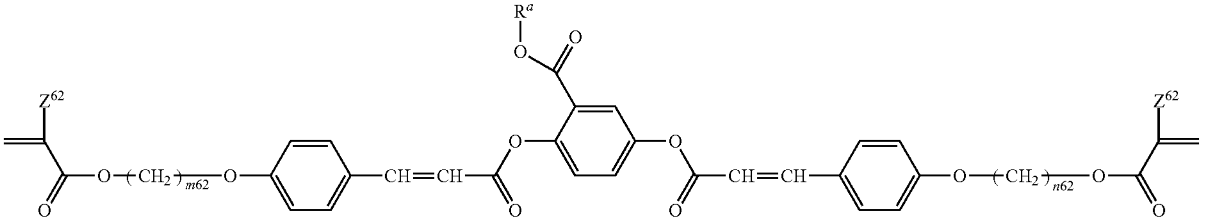

(6-2-D)

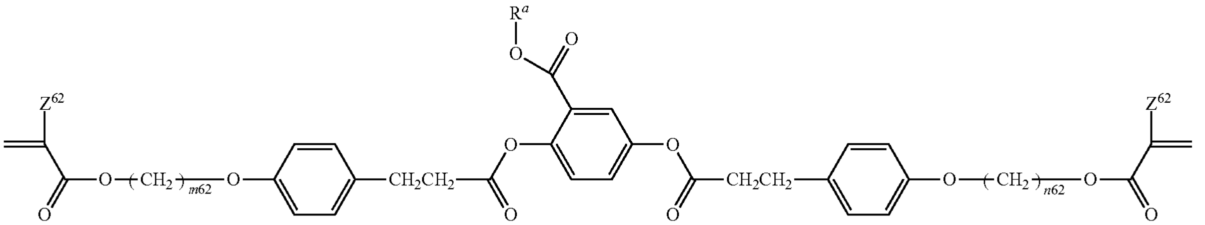

(6-2-E)

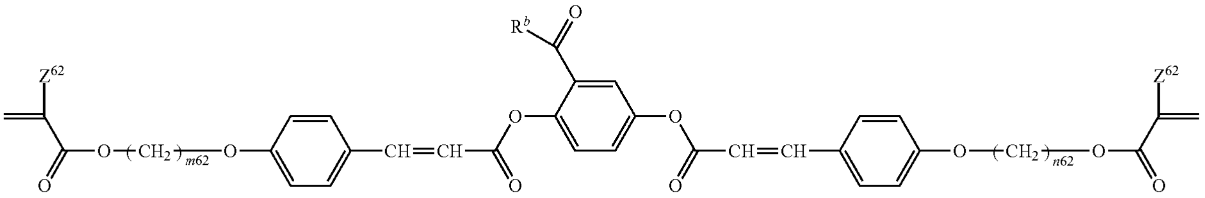

(6-2-F)

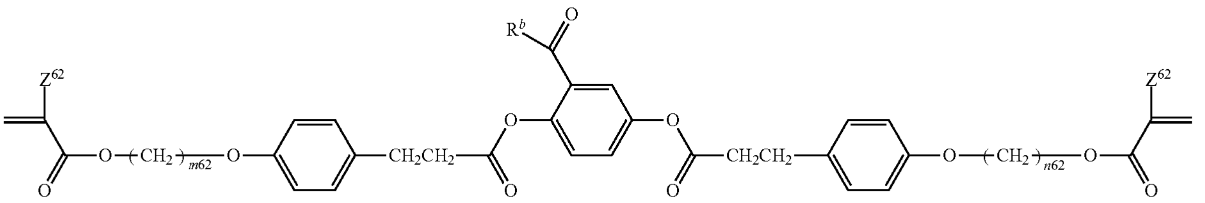

In formula (6-2-A) to formula (6-2-F), $Z^{62}$ is independently hydrogen, fluorine, methyl or trifluoromethyl, $W^{63}$ is hydrogen, methyl, straight-chain alkyl having 1 to 7 carbons or branched alkyl having 1 to 7 carbons, $R^a$ is straight-chain alkyl having 1 to 7 carbons, $R^b$ is straight-chain alkyl having 1 to 15 carbons, and m62 and n62 are independently an integer from 2 to 15.

In formula (6-2-A), formula (6-2-C) and formula (6-2-E), a trans isomer is preferred, and both of —CH═CH— further preferably take a trans form.

Furthermore, specific preferred examples of the compounds represented by formula (1-1) to formula (1-3), formula (2-1), formula (3-1) to formula (3-6), formula (4-1), formula (4-2), formula (5-1), formula (6-1) and formula (6-2) are shown below.

Formula 41
(1-1-1)
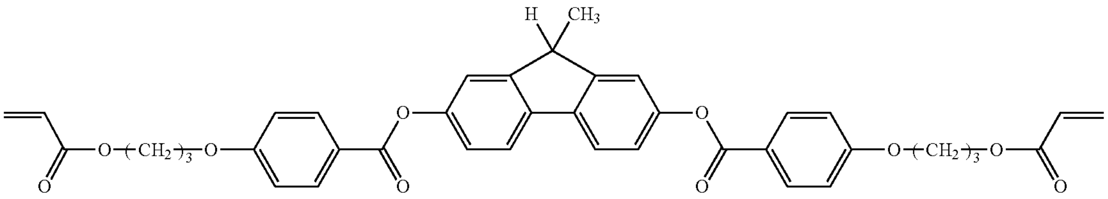
(1-1-2)
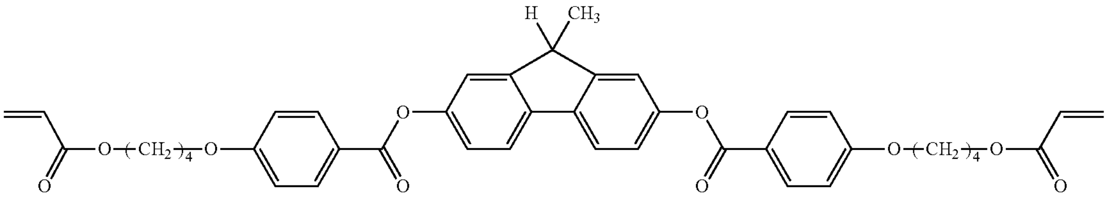
(1-1-3)
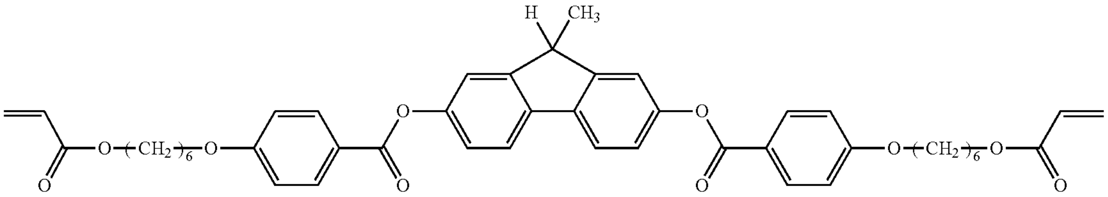
(1-1-4)
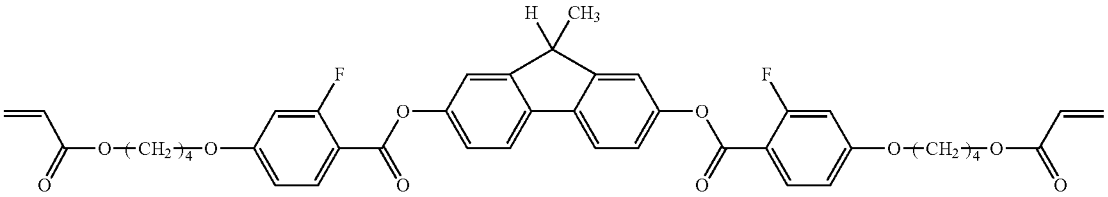
(1-1-5)
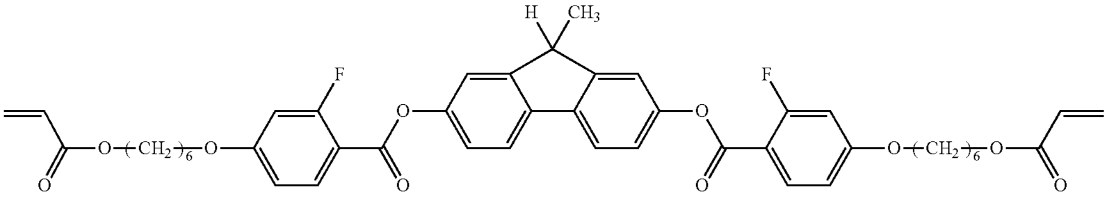
(1-1-6)
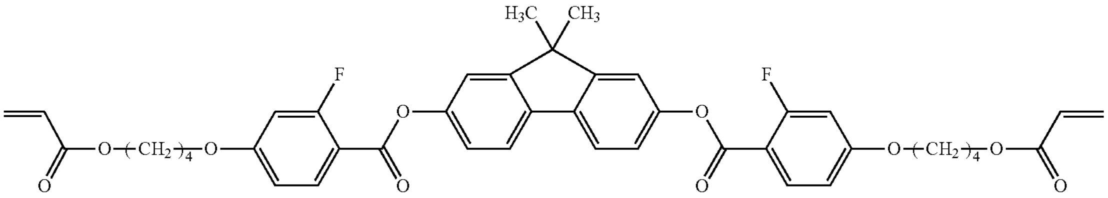
(1-1-7)
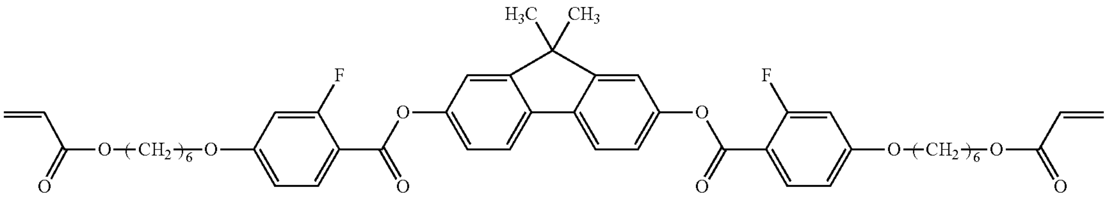

-continued
(1-1-8)
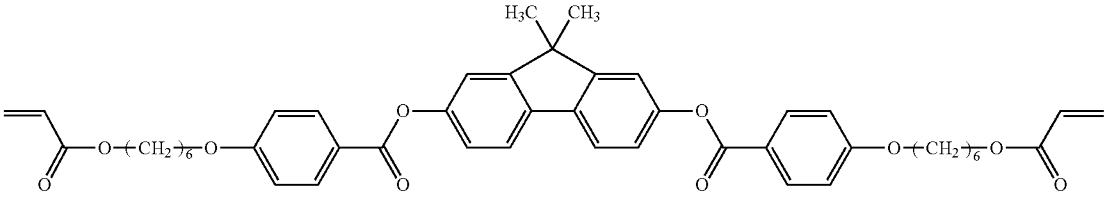
Formula 42
(1-1-9)
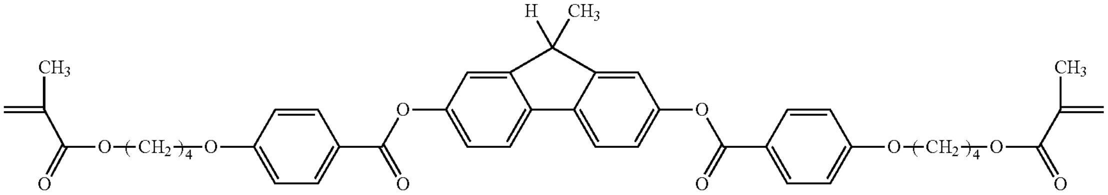
(1-1-10)
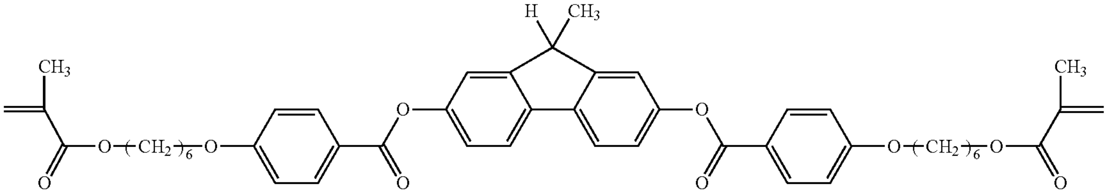
(1-1-11)
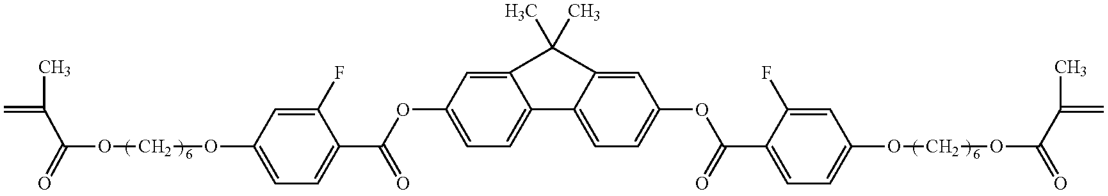
(1-1-12)
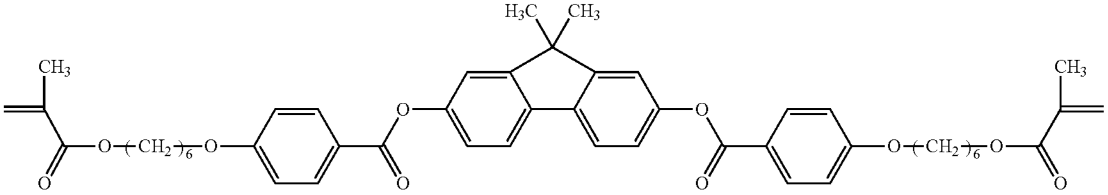
Formula 43
(1-2-1)
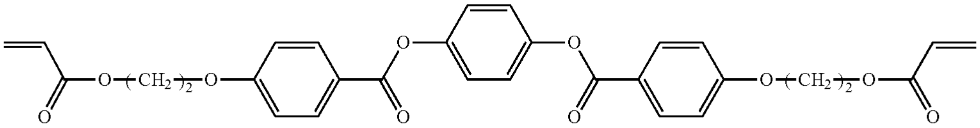
(1-2-2)
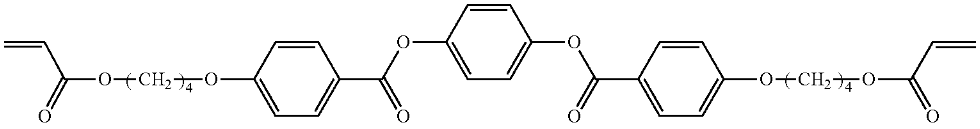
(1-2-3)
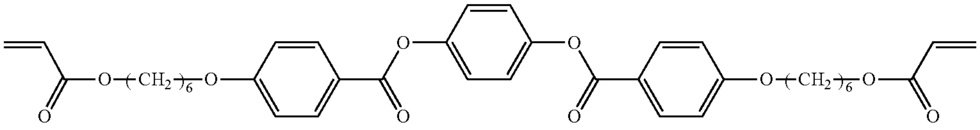

-continued
(1-2-4)
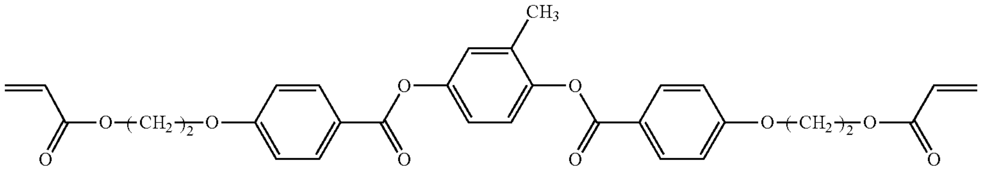
(1-2-5)
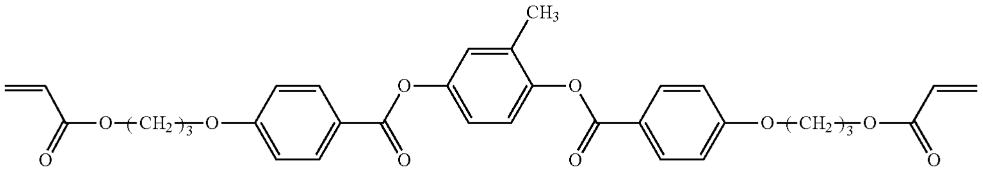
(1-2-6)
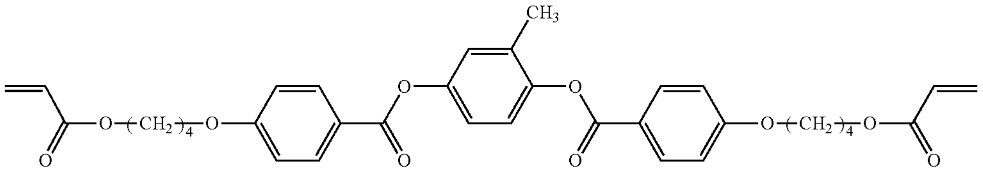
(1-2-7)
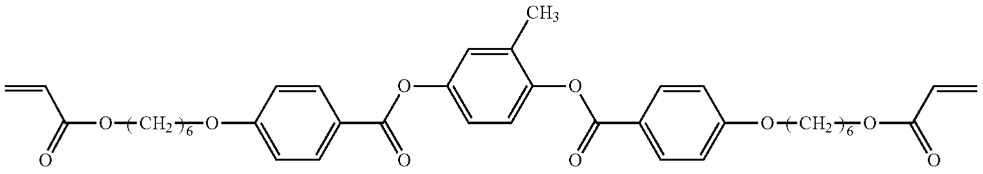
(1-2-8)
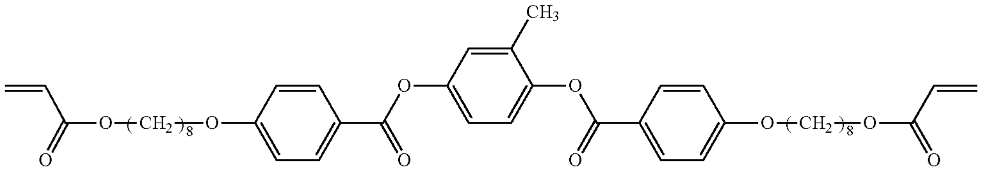
(1-2-9)
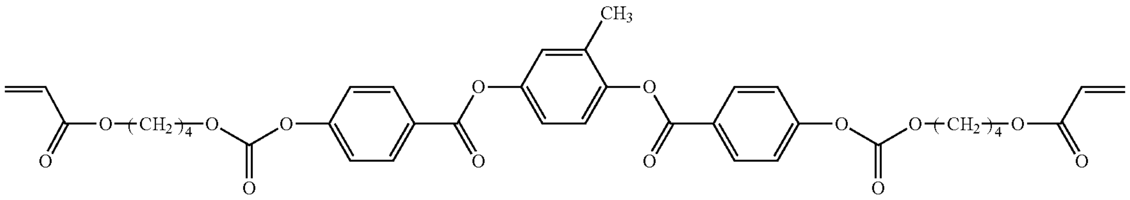
(1-2-10)
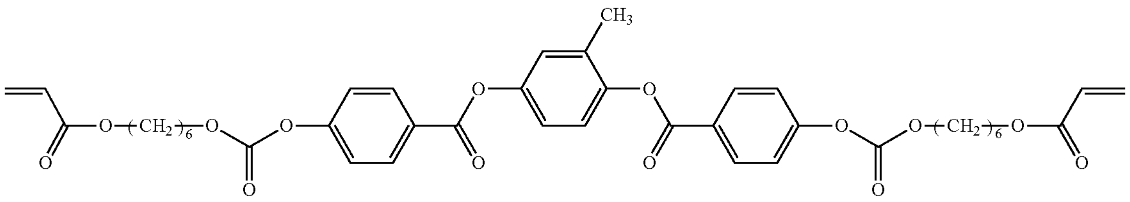
(1-2-11)
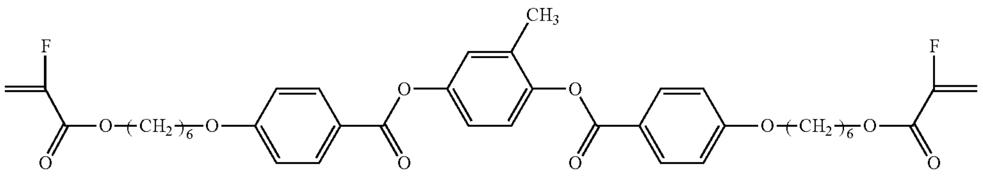

-continued
(1-2-12)
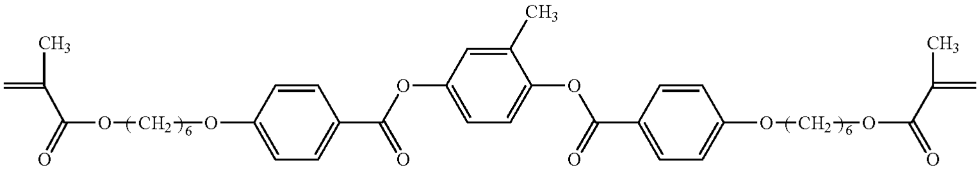
Formula 44
(1-2-13)
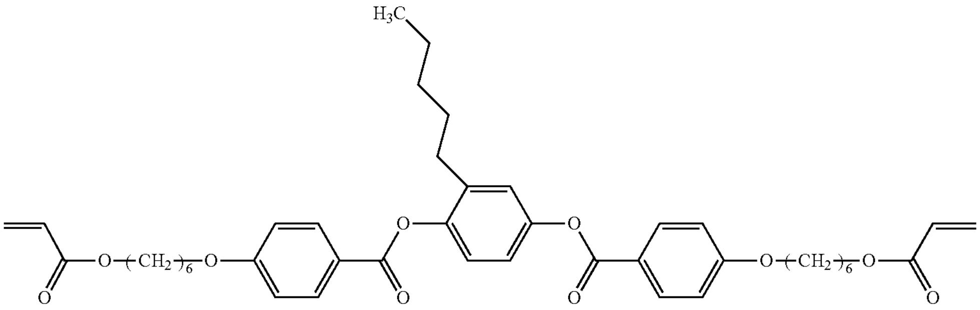
(1-2-14)
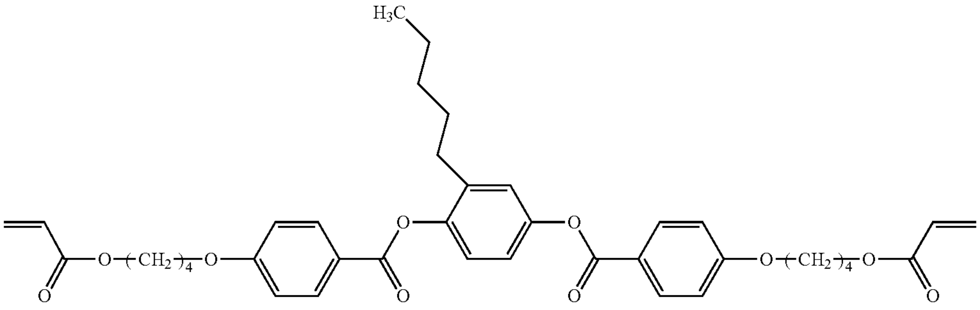
(1-2-15)
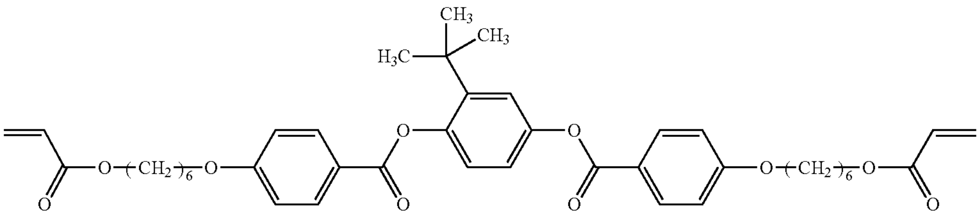
(1-2-16)
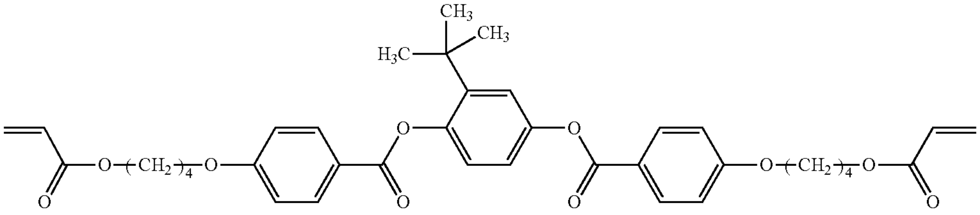

-continued
Formula 45
(1-2-17)
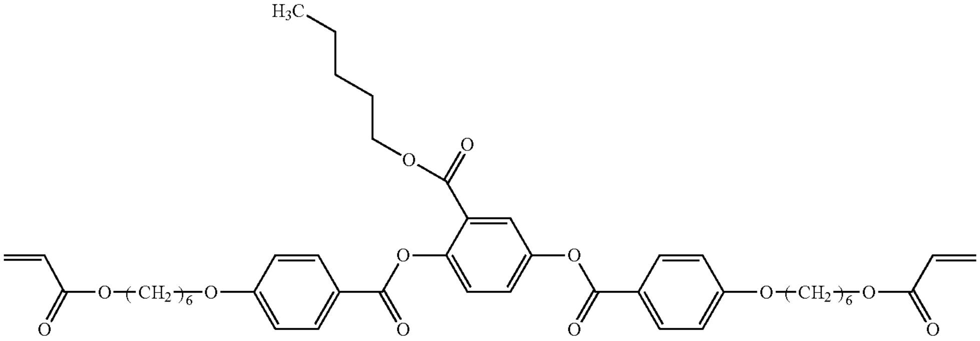
(1-2-18)
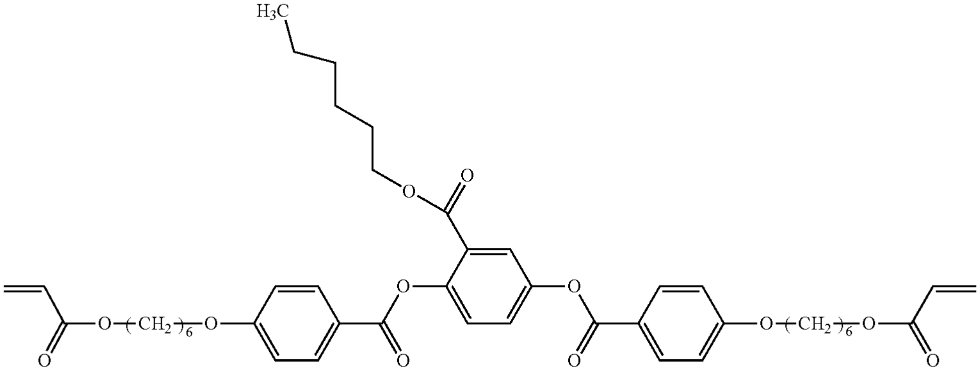
(1-2-19)
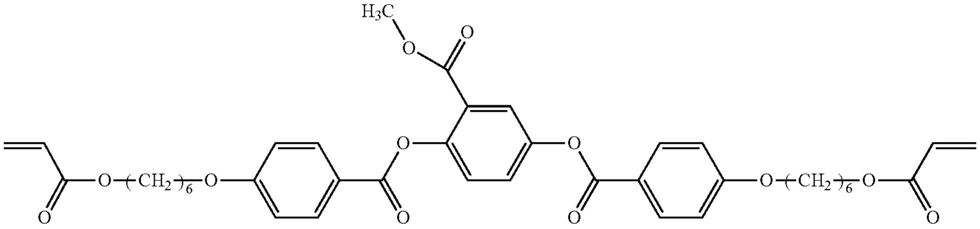
Formula 46)
(1-3-A-1)
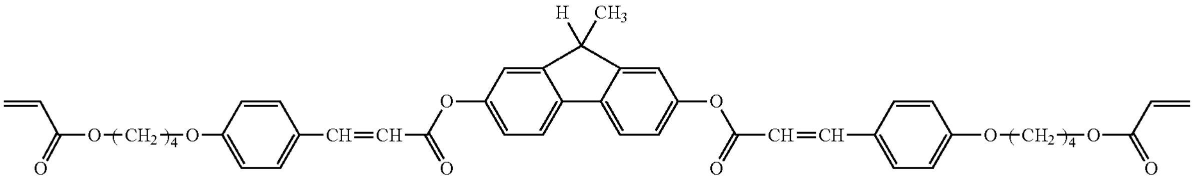
(1-3-A-2)
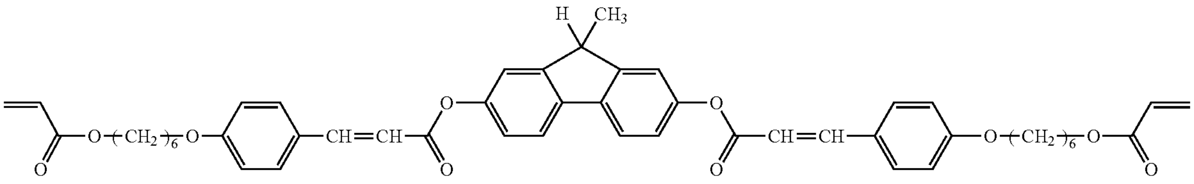

-continued
(1-3-A-3)
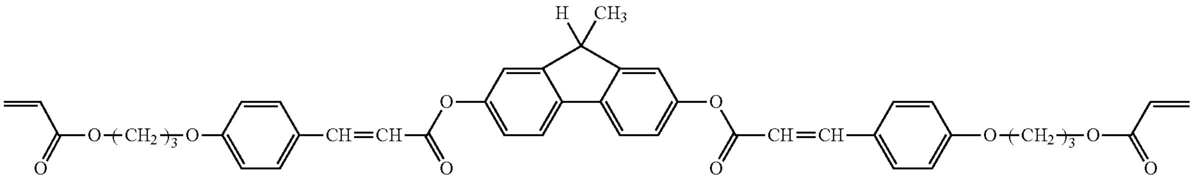
(1-3-A-4)
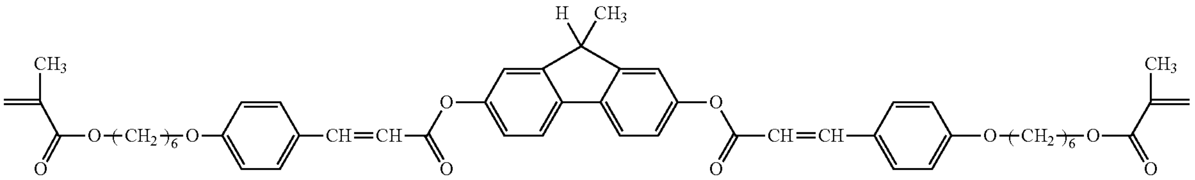
Formula 47
(1-3-B-1)
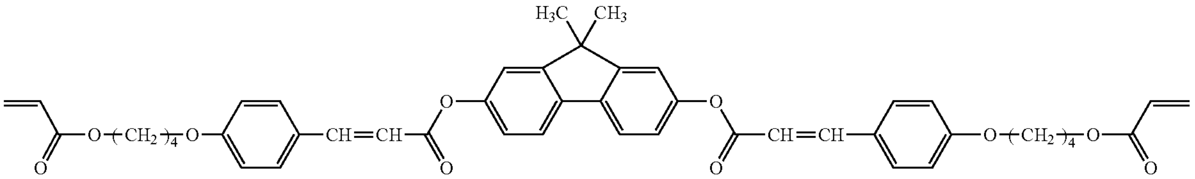
(1-3-B-2)
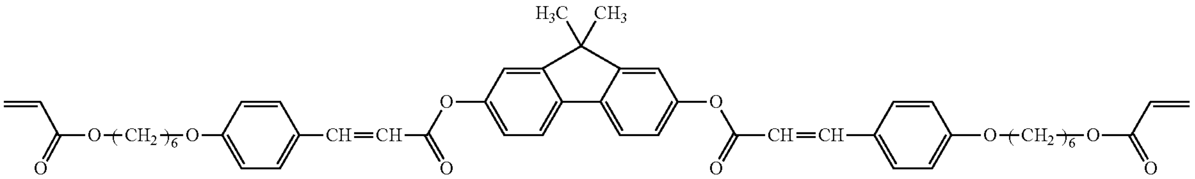
(1-3-B-3)
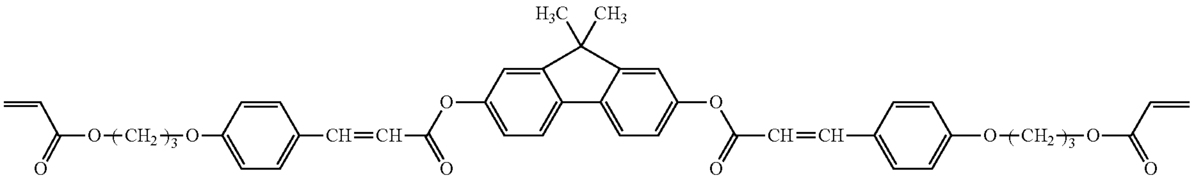
(1-3-B-4)
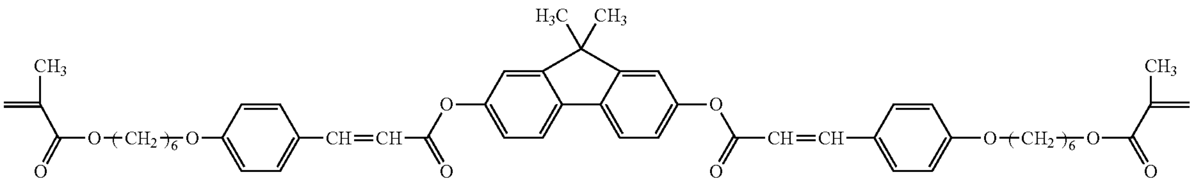
In formula (1-3-A-1) to formula (1-3-A-4), and formula (1-3-B-1) to formula (1-3-B-4), a trans isomer is preferred, and both of —CH═CH— further preferably take a trans form.

Formula 48
(2-1-1)
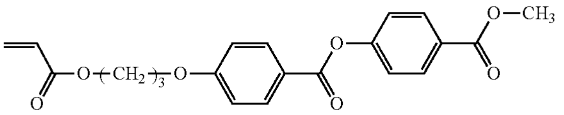
(2-1-2)
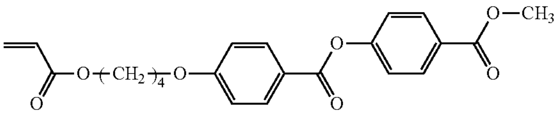
(2-1-3)
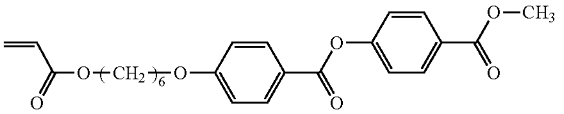
(2-1-4)
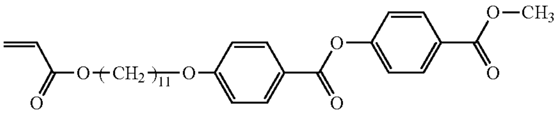
(2-1-5)
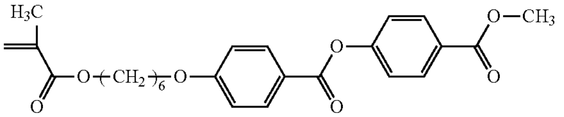
(2-1-6)
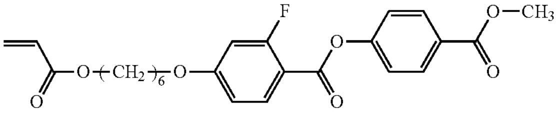
(2-1-7)
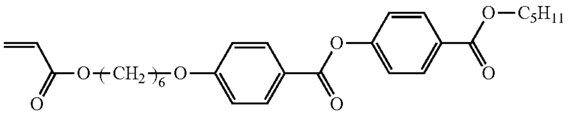
(2-1-8)
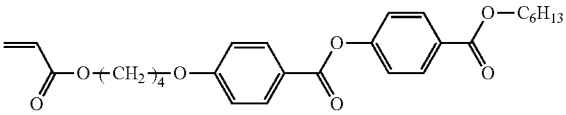
Formula 49
(2-1-9)
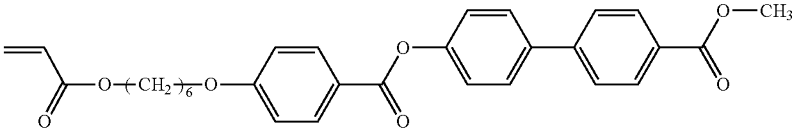
(2-1-10)
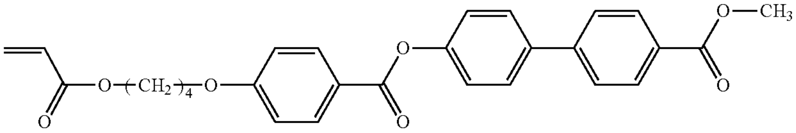
(2-1-11)
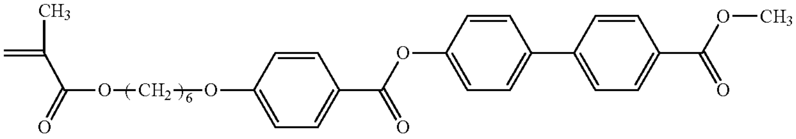
Formula 50
(2-1-12)
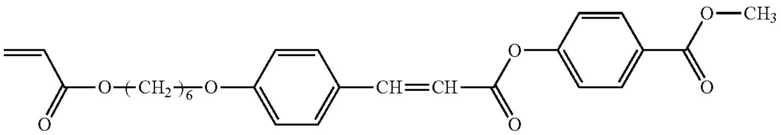
(2-1-13)
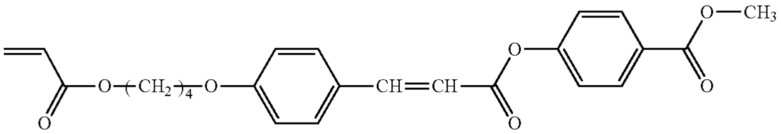
(2-1-14)
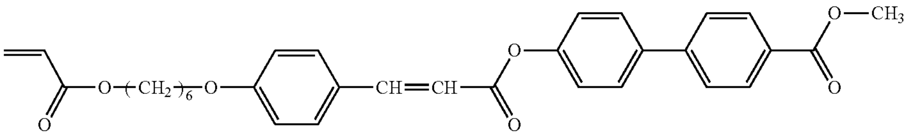

-continued
(2-1-15)
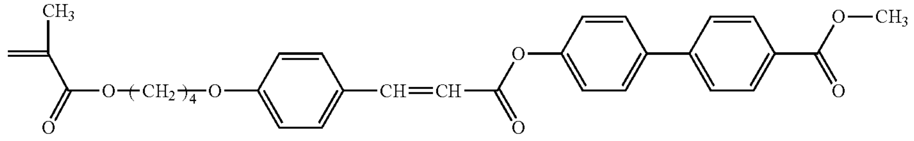
In formula (2-1-12) to formula (2-1-15), a trans isomer is further preferred.
Formula 51
(2-1-16)
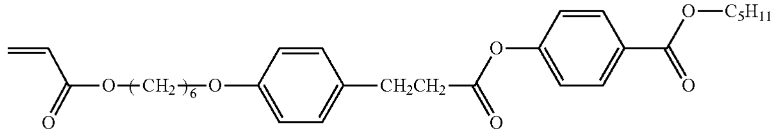
(2-1-17)
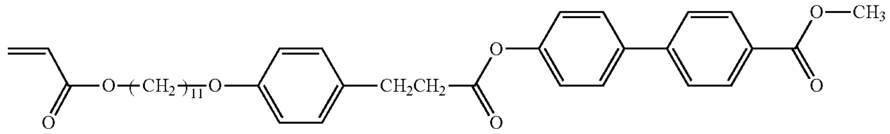
(2-1-18)
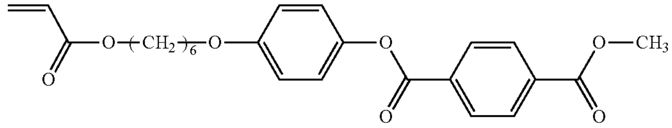
Specific examples of the compound represented by formula (3) are shown below.
Formula 52
(3-3-1)
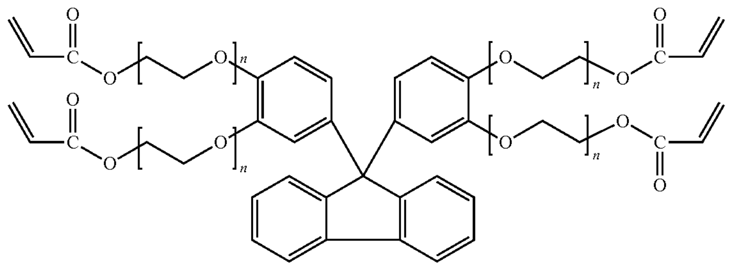
(3-1-2)
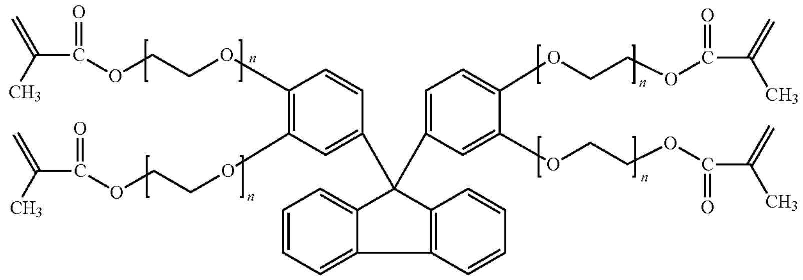
In the formulas, n is each independently an integer from 1 to 4.

Formula 53
(3-2-1)
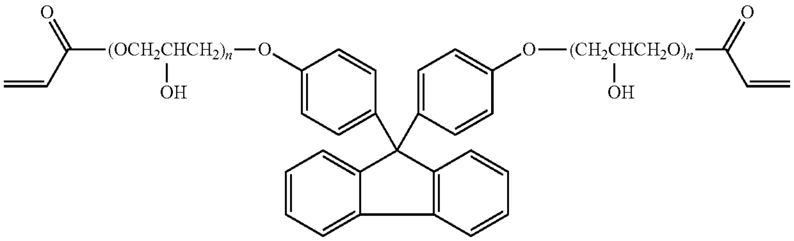
(3-2-2)
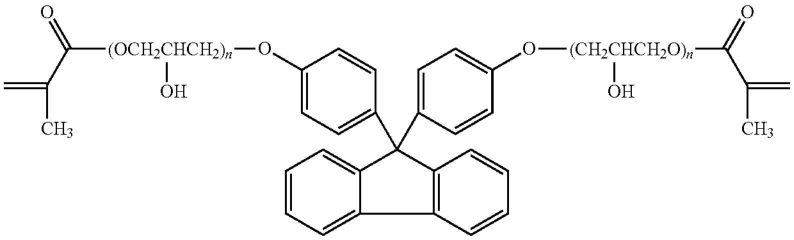
In the formulas, n is each independently an integer from 1 to 3.
Formula 54
(3-3-1)
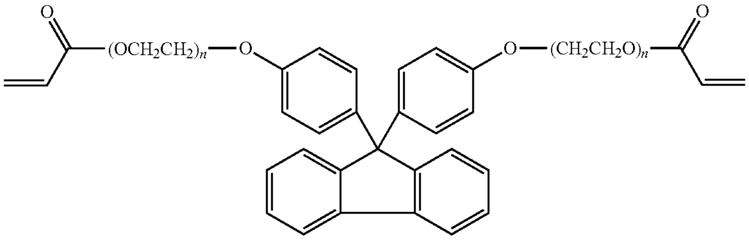
(3-3-2)
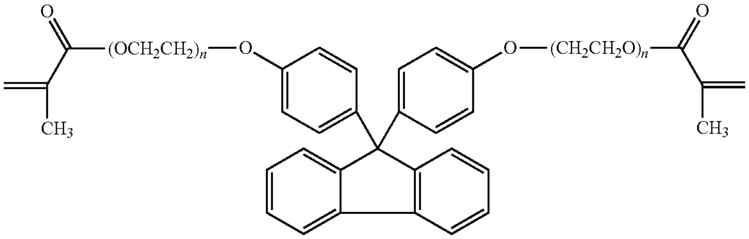
(3-3-3)
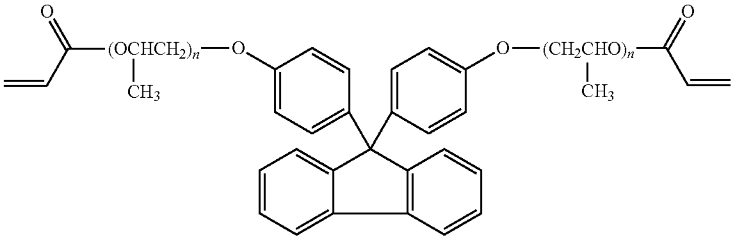

In the formulas, n is each independently an integer from 1 to 3.
Formula 55
(3-4-1)
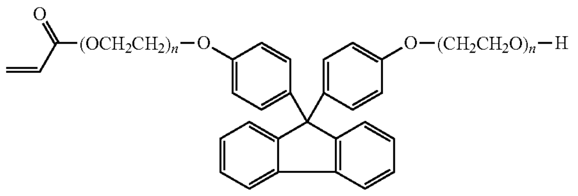
-continued
(3-4-2)
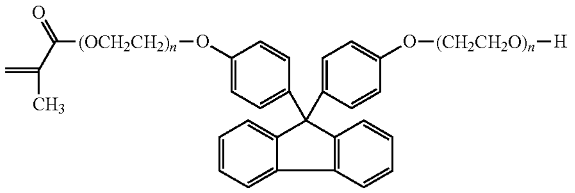
(3-4-3)
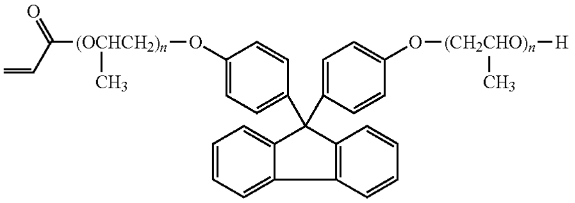
In the formulas, n is each independently an integer from 0 to 2.
Formula 56
(3-5-1)
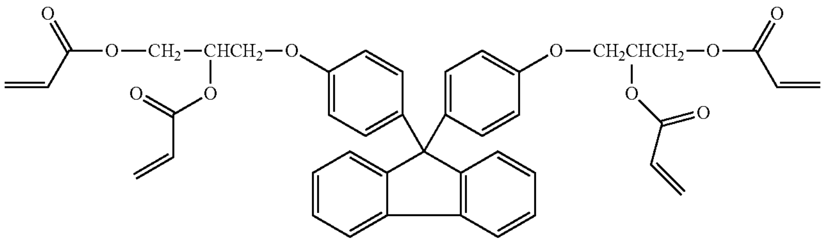
(3-5-2)
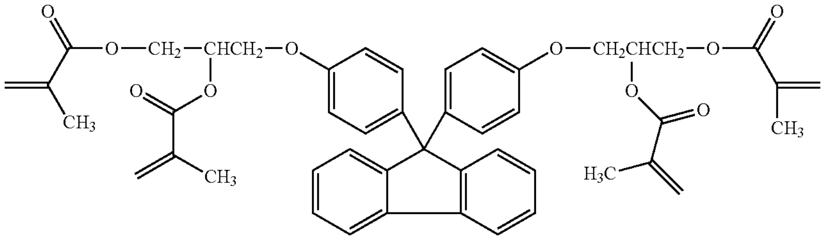
(3-5-3)
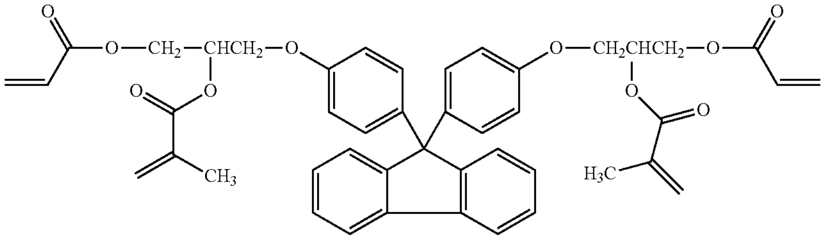
(3-5-4)
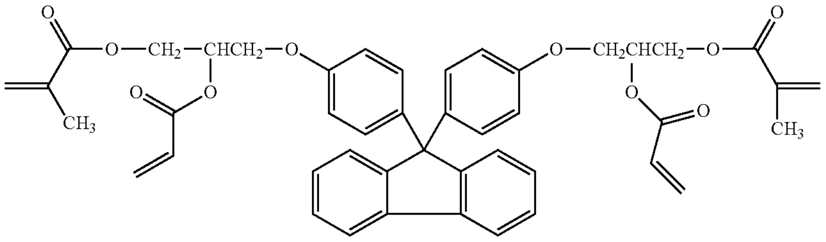

-continued

Formula 57

(3-6-1)

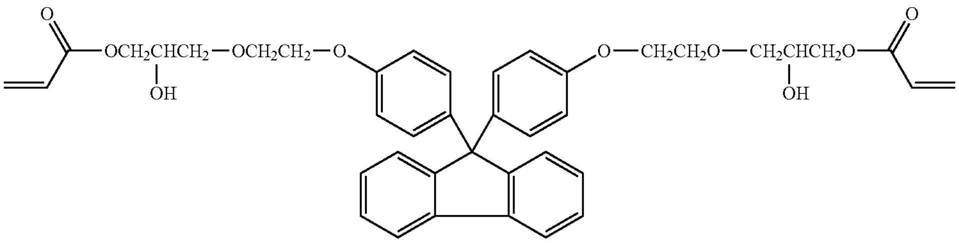

(3-6-2)

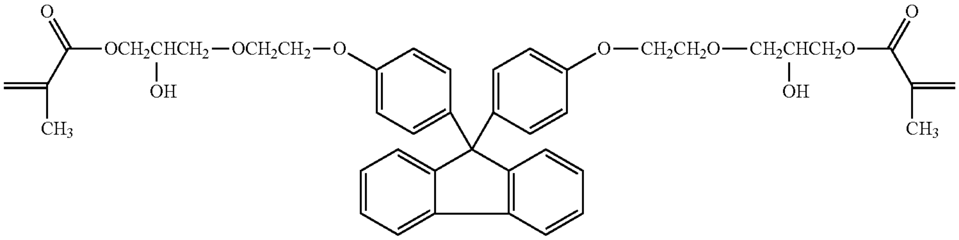

Specific examples of commercial items including the compounds represented by formula (3-1-1), formula (3-2-1), formula (3-3-1) or formula (3-6-1) include OGSOL (registered trademark) EA-0250T, OGSOL EA-0500, OGSOL EA-1000, CA-0400, CA-0450T, ONF-1, BPEFA, GA-1000 or the like made by Osaka Gas Chemicals Co., Ltd. The commercial items may also be used.

Specific examples of the compound represented by formula (4) are shown below.

Formula 58

(4-1-1)

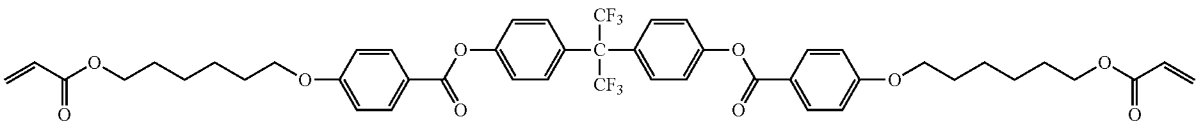

(4-1-2)

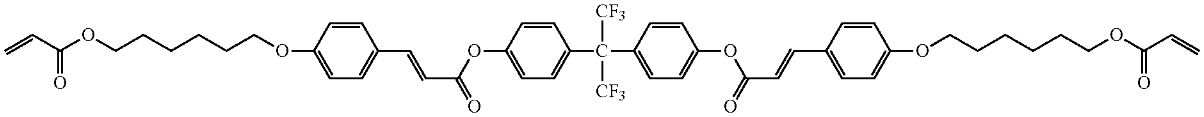

(4-1-3)

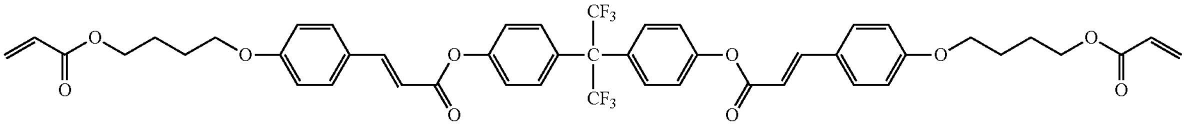

(4-1-4)

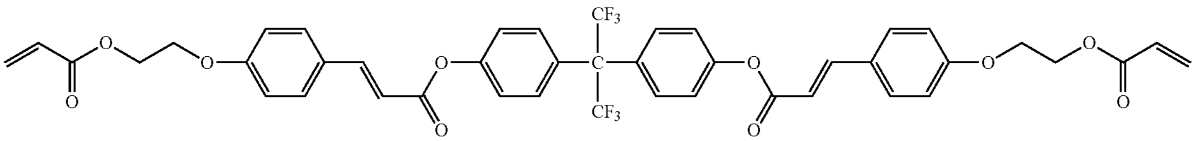

(4-1-5)

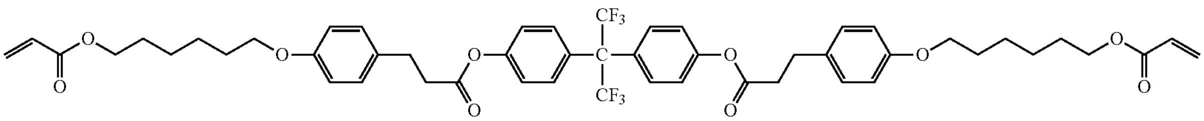

-continued
(4-1-6)
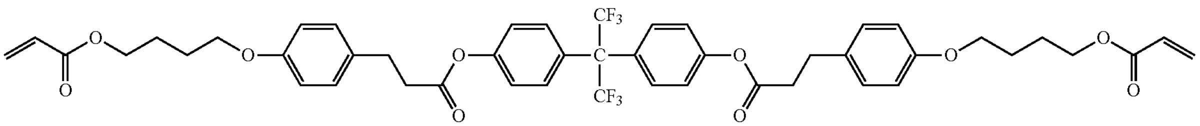
In formula (4-1-2) to formula (4-1-4), a trans isomer is preferred, and both of —CH═CH— further preferably take a trans form.
Formula 59
(4-1-7)
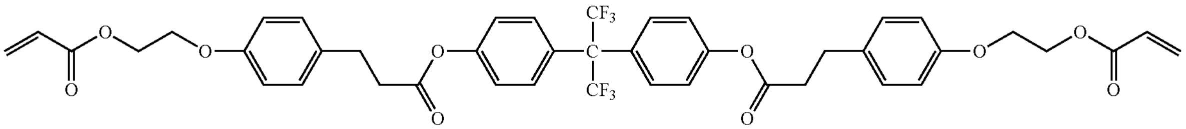
(4-1-8)
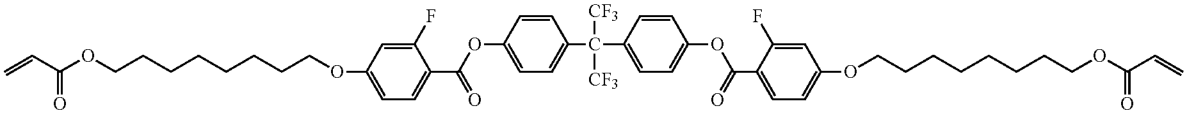
(4-1-9)
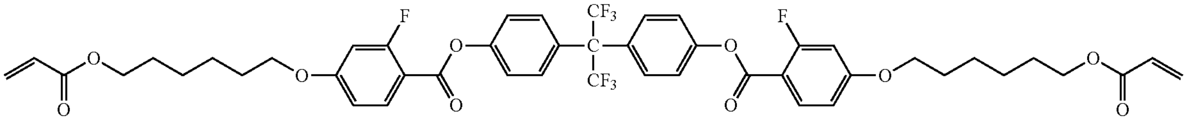
(4-1-10)
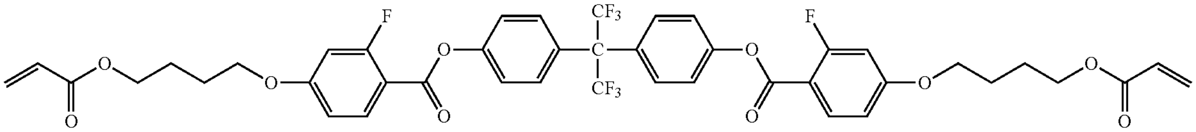
(4-1-11)
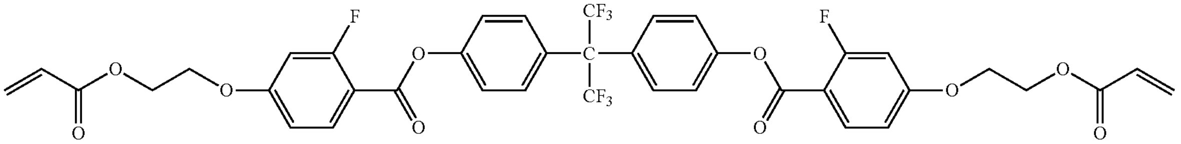
(4-1-12)
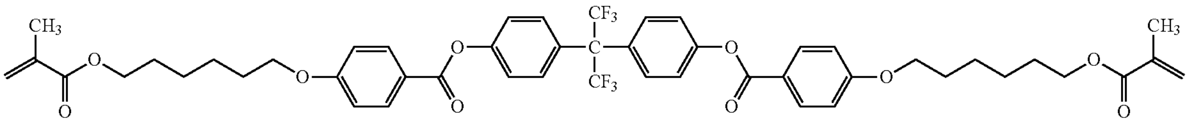
(4-1-13)
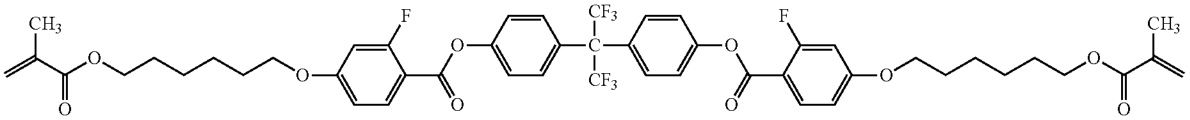
(4-1-14)
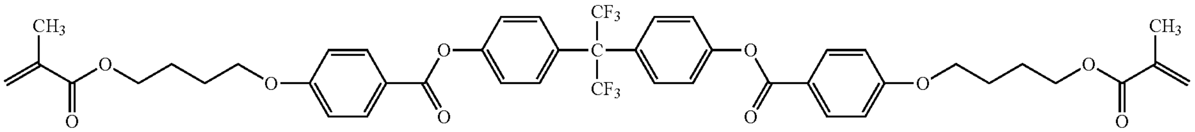

-continued
(4-1-15)
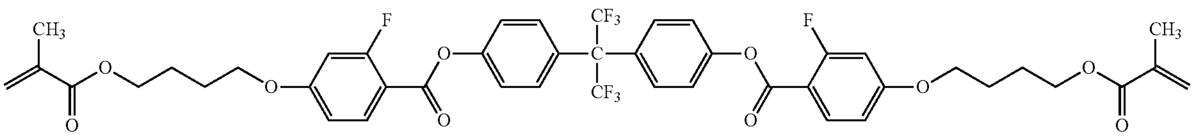
Formula 60
(4-2-1)
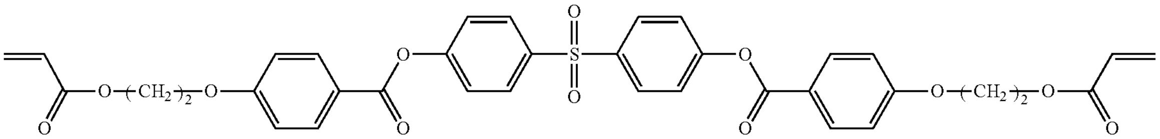
(4-2-2)
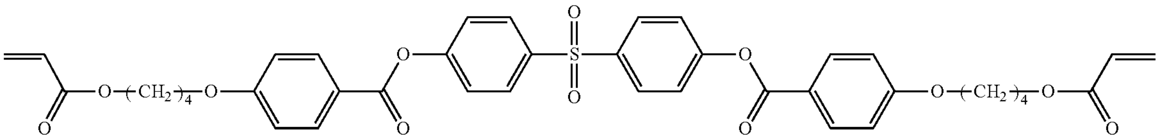
(4-2-3)
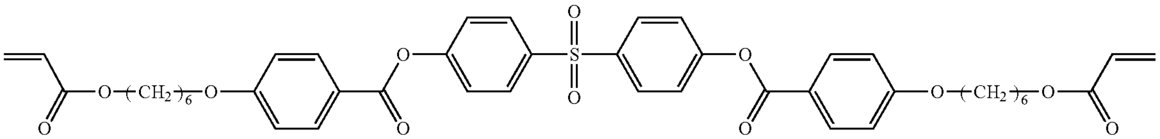
(4-2-4)
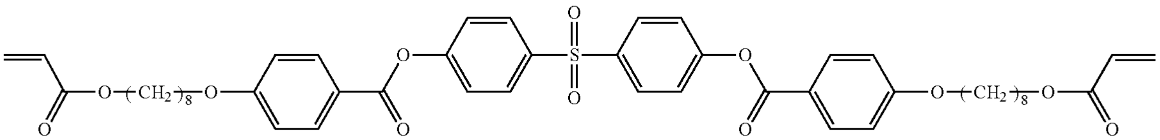
Formula 61
(4-2-5)
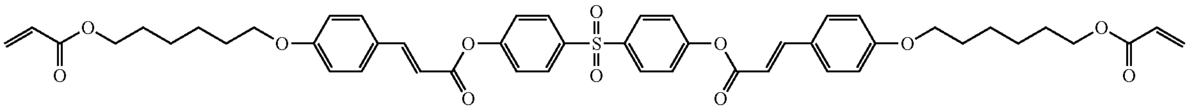
(4-2-6)
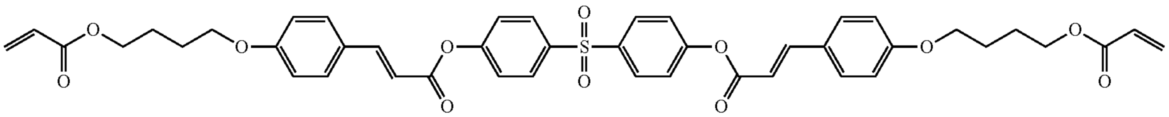
(4-2-7)
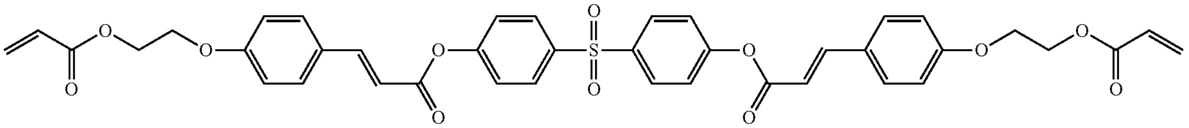
(4-2-8)
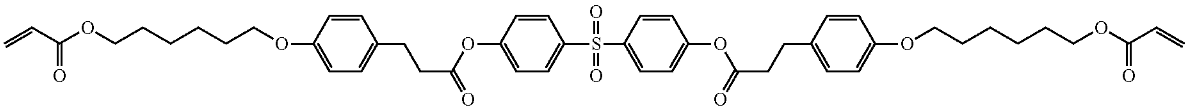

-continued
(4-2-9)
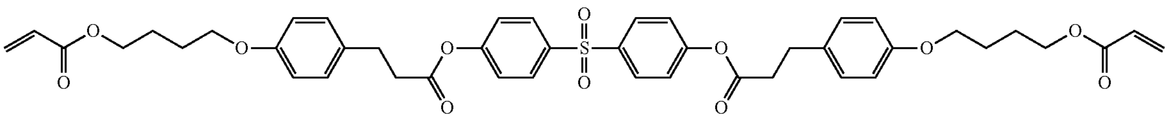
In formula (4-2-5) to formula (4-2-7), a trans isomer is preferred, and both of —CH═CH— further preferably take a trans form.
Formula 62
(4-1-10)
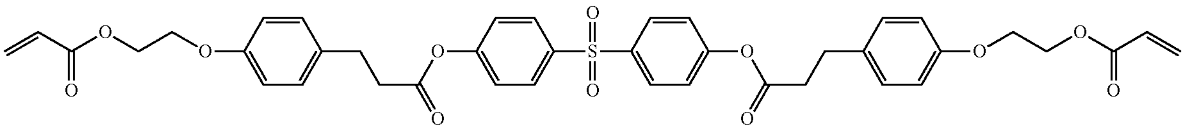
(4-1-11)
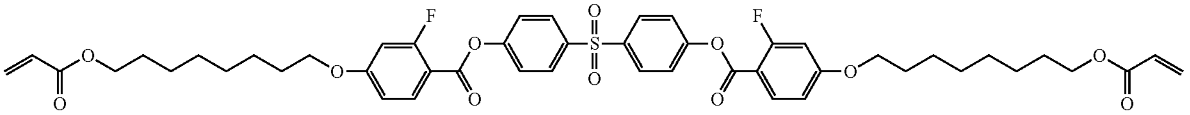
(4-1-12)
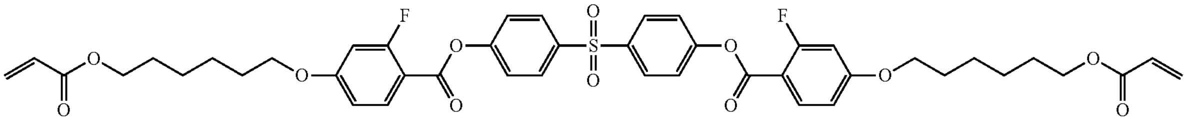
(4-1-13)
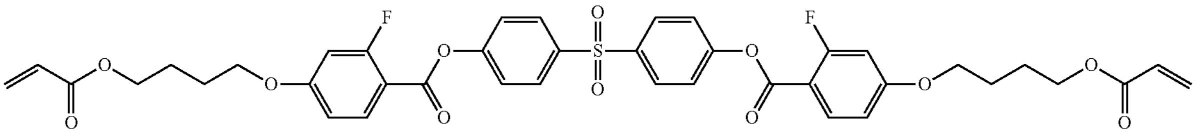
(4-1-14)
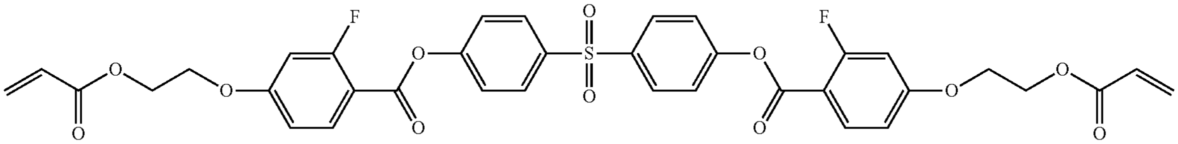
(4-1-15)
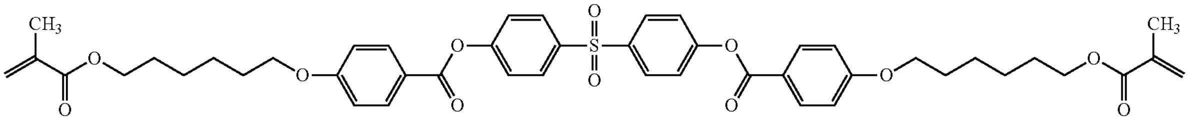
(4-1-16)
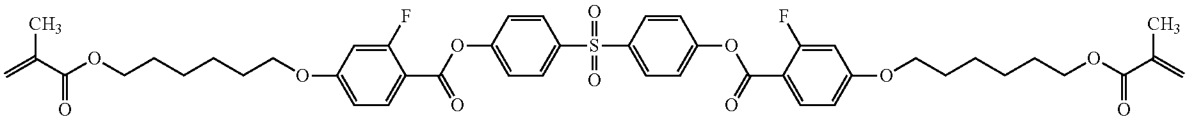

Preferred examples of the compound represented by formula (5-1) are shown below.
Formula 63
(5-1-1)
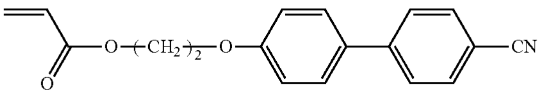
(5-1-2)
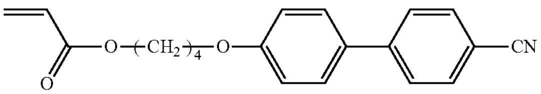
(5-1-3)
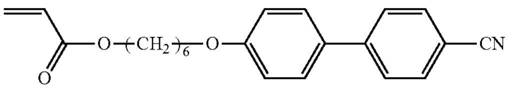
(5-1-4)
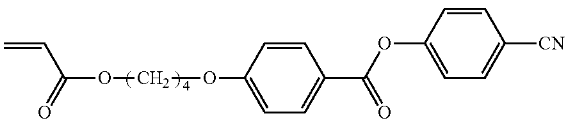
(5-1-5)
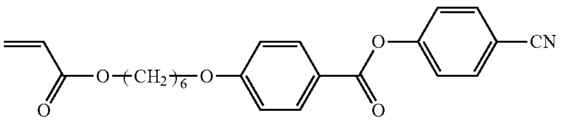
(5-1-6)
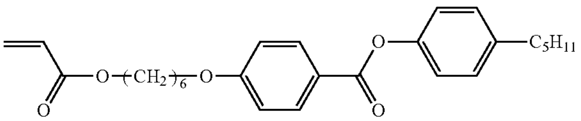
(5-1-7)
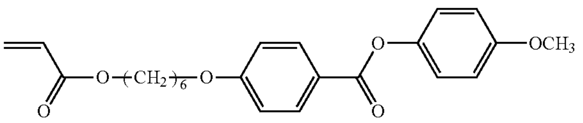
(5-1-8)
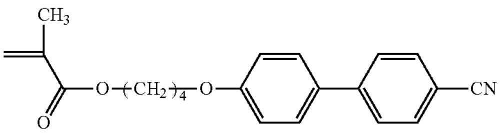
(5-1-9)
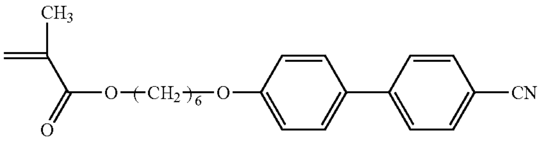
Formula 64
(5-1-10)
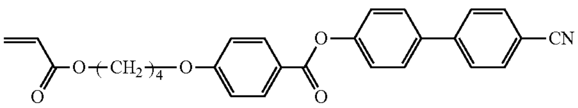
(5-1-11)
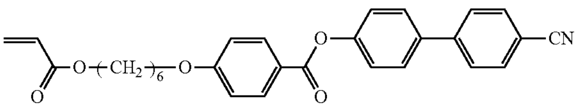
(5-1-12)
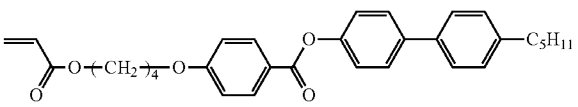
(5-1-13)
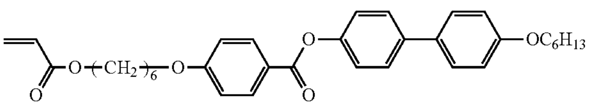
(5-1-14)
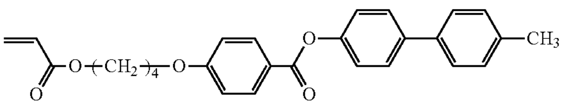
(5-1-15)
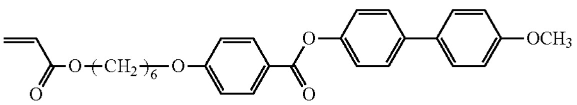
Formula 65
(5-1-16)
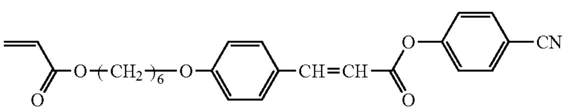
(5-1-17)
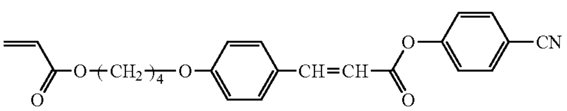
(5-1-18)
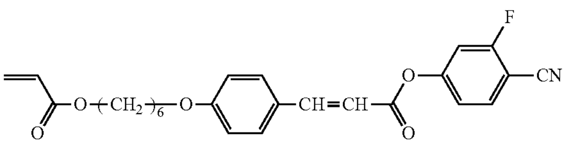
(5-1-19)
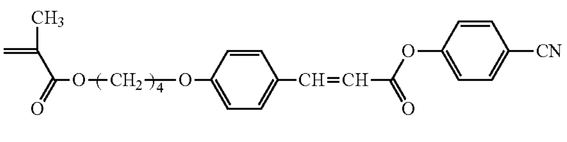

-continued
Formula 66
(5-1-20)
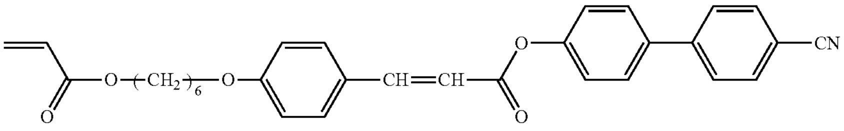
(5-1-21)
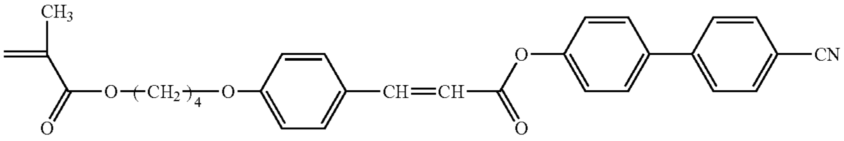
(5-1-22)
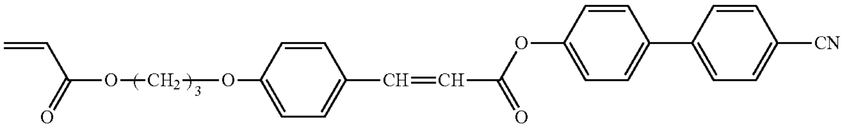
(5-1-23)
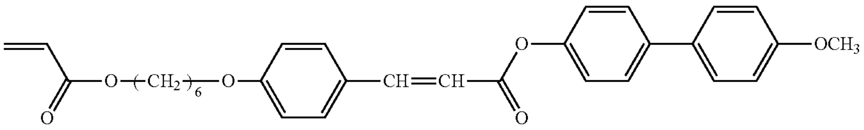
In formula (5-1-16) to formula (5-1-23), a trans isomer is further preferred.
Formula 67
(5-1-24)
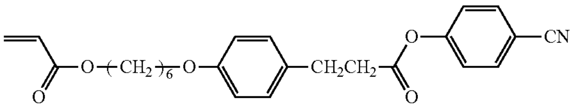
(5-1-25)
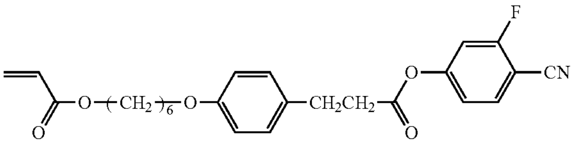
(5-1-26)
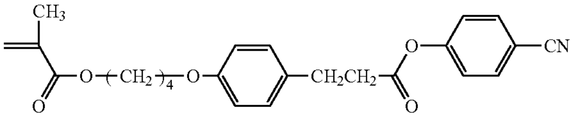
(5-1-27)
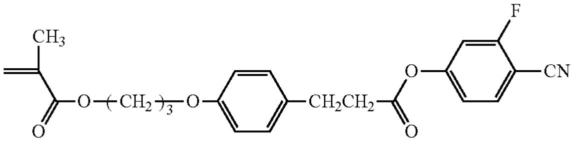
(5-1-28)
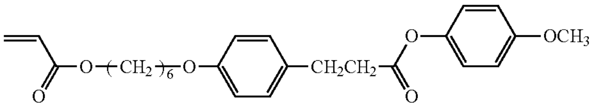
(5-1-29)
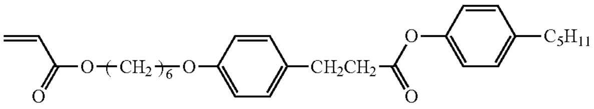
(5-1-30)
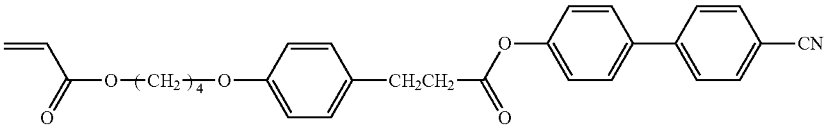
(5-1-31)
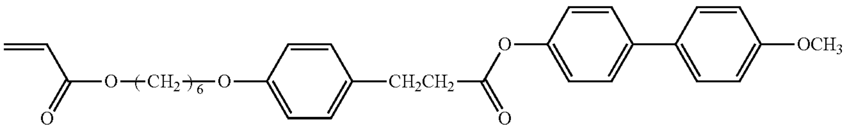

-continued
Formula 68
(5-1-32)
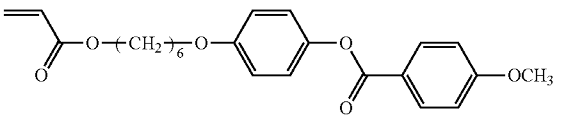
(5-1-33)
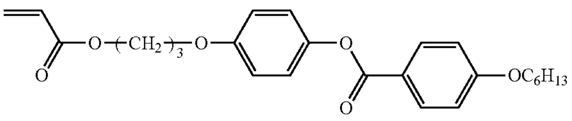
(5-1-34)
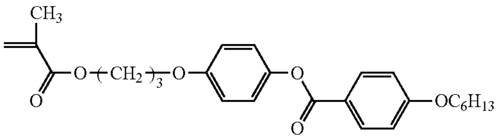
(5-1-35)
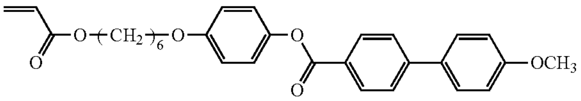
Formula 69
(5-1-36)
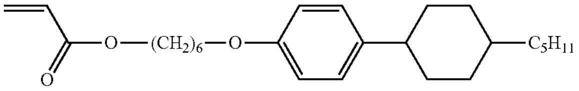
(5-1-37)
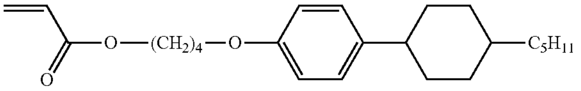
(5-1-38)
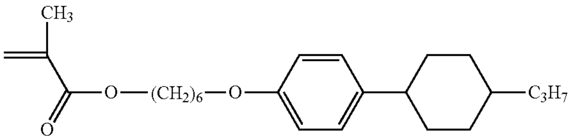
(5-1-39)
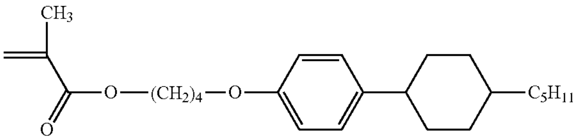
Formula 70
(5-1-40)
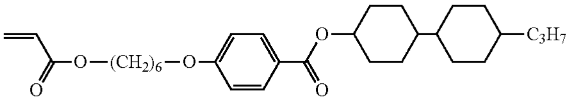
(5-1-41)
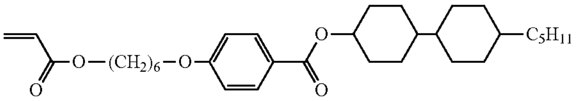
(5-1-42)
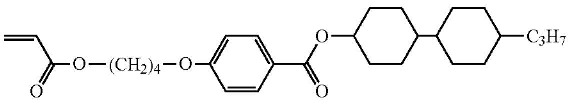
(5-1-43)
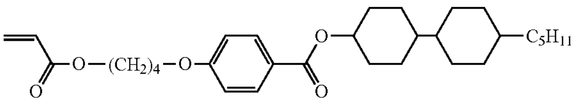
(5-1-44)
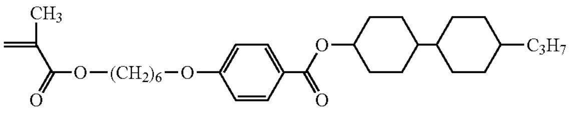
(5-1-45)
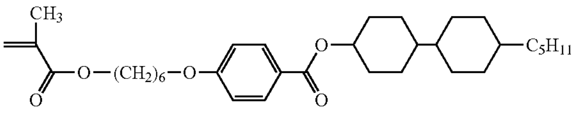
Formula 71
(5-1-46)
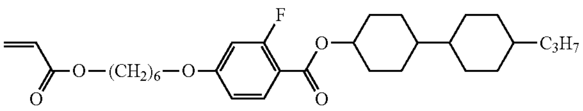
(5-1-47)
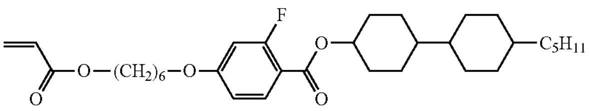
(5-1-48)
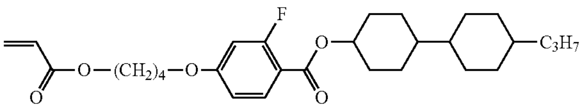
(5-1-49)
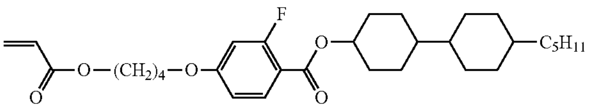
(5-1-50)
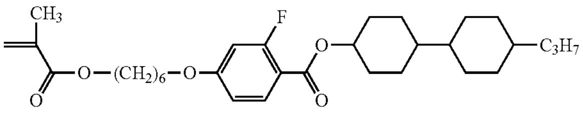
(5-1-51)
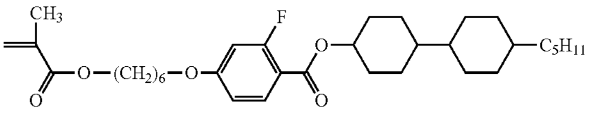

-continued
Formula 72
(5-1-52)
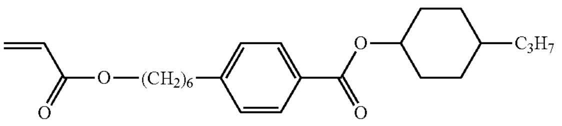
(5-1-53)
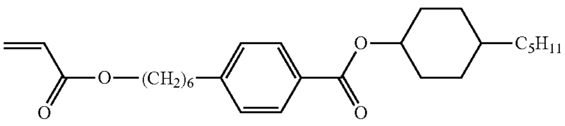
(5-1-54)
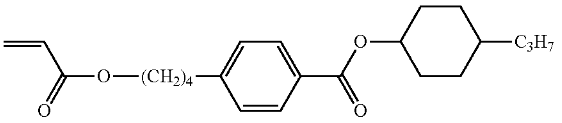
(5-1-55)
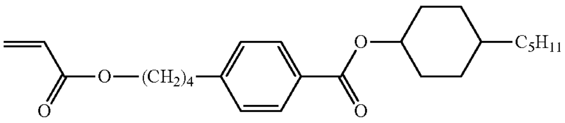
(5-1-56)
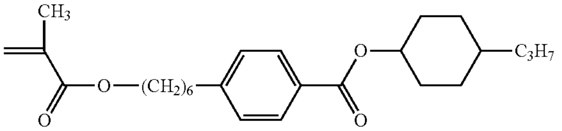
(5-1-57)
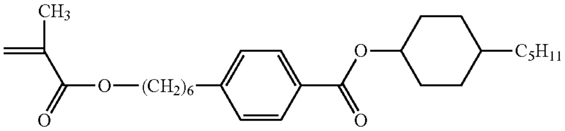
Formula 73
(5-1-58)
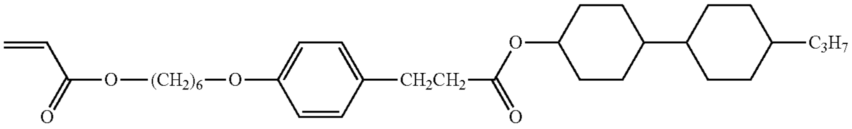
(5-1-59)
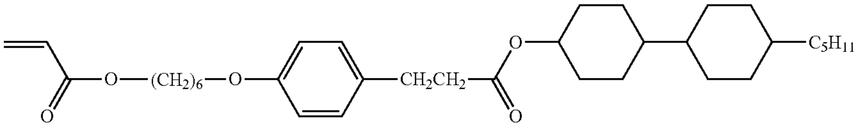
(5-1-60)
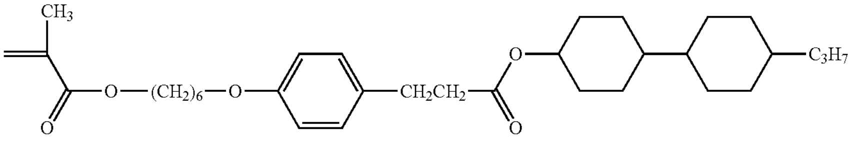
(5-1-61)
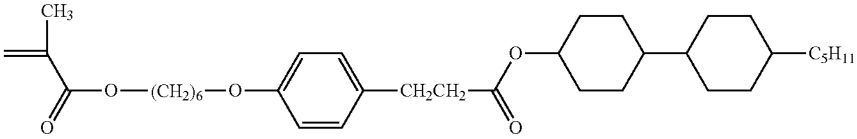
Formula 74
(5-1-62)
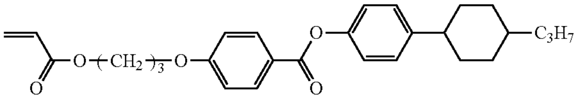
(5-1-63)
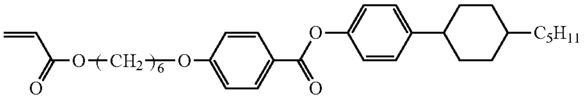
(5-1-64)
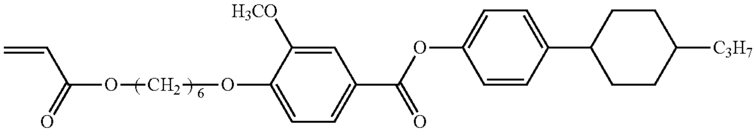
(5-1-65)
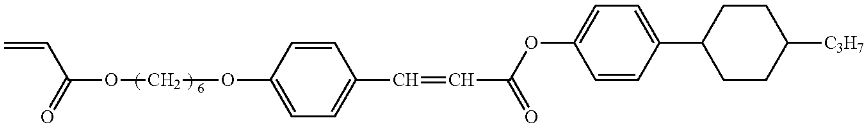

-continued
(5-1-66)
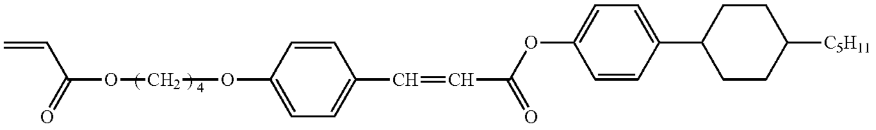
(5-1-67)
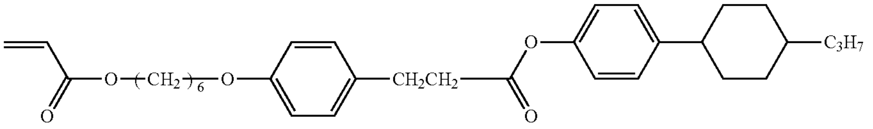
(5-1-68)
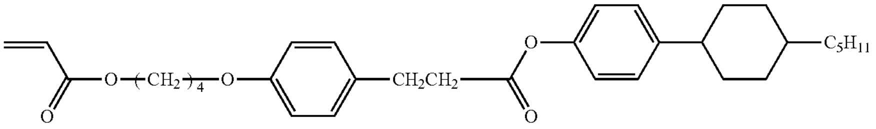
In formula (5-1-65) and formula (5-1-66), a trans isomer is further preferred.
Formula 75
(6-1-3-1)
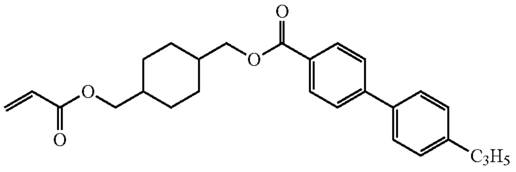
(6-1-5-1)
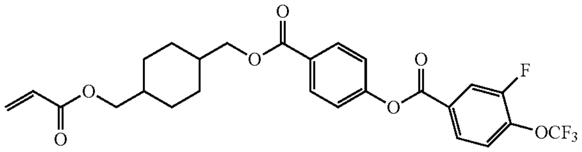
(6-1-6-1)
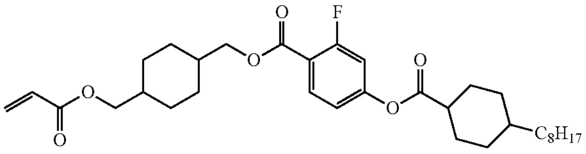
(6-1-7-1)
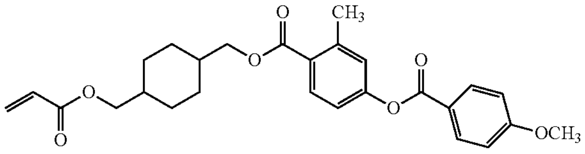
(6-1-10-1)
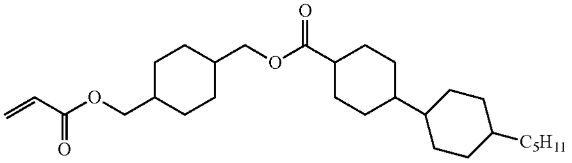
(6-1-10-2)
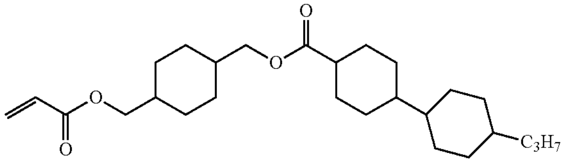
Formula 76
(6-1-11-1)
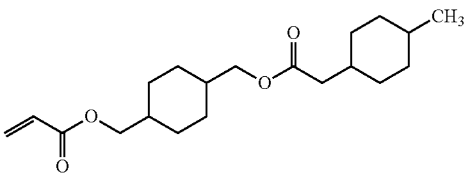
(6-1-12-1)
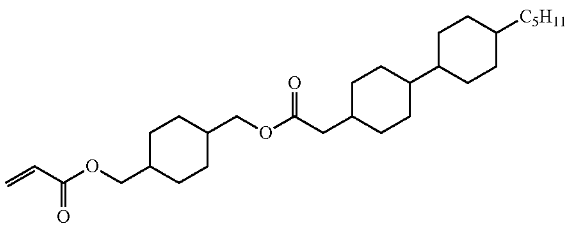

-continued
(6-1-12-2)
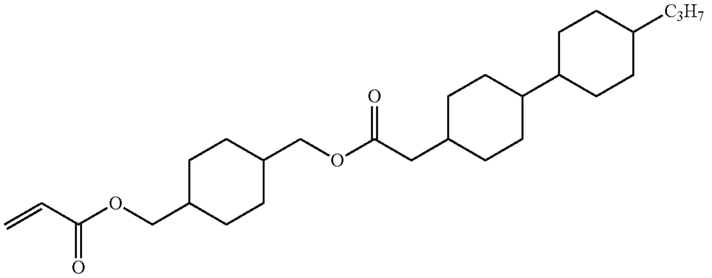
(6-1-15-1)
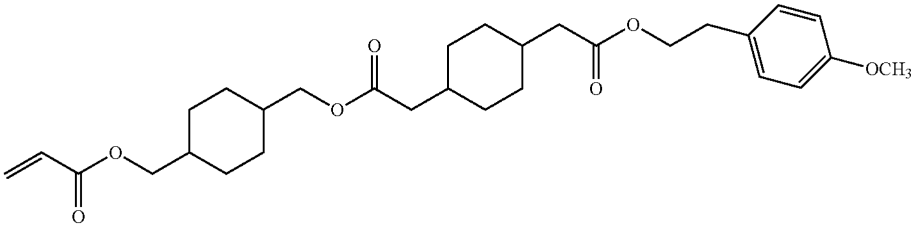
(6-1-16-1)
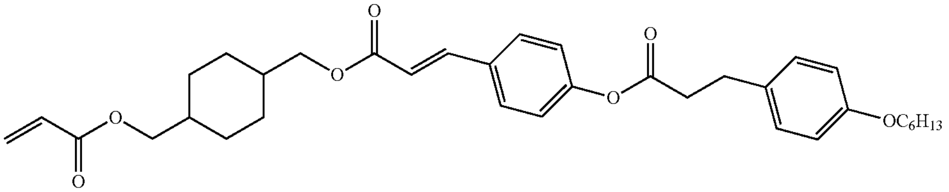
In formula (6-1-16-1), a trans isomer is further preferred.
Formula 77
(6-2-A-1)
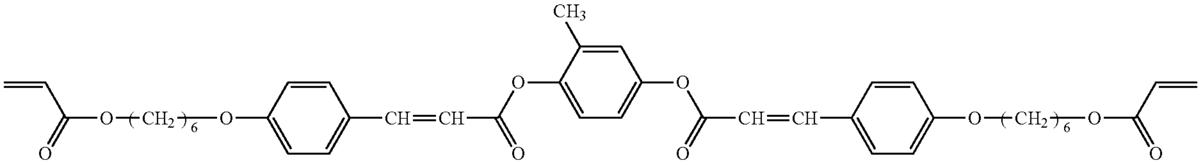
(6-2-A-2)
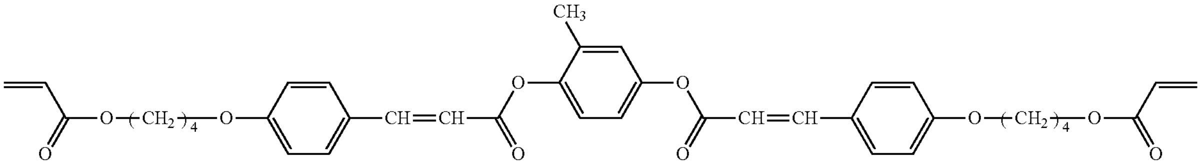
(6-2-A-3)
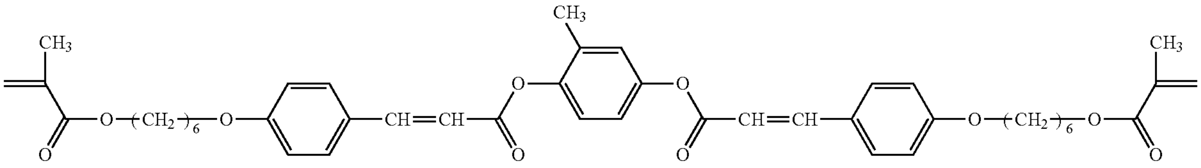

-continued
(6-2-A-4)
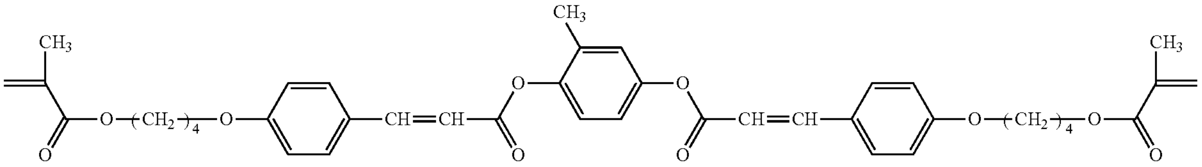
(6-2-B-1)
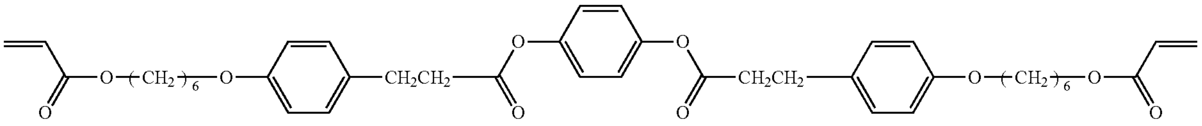
(6-2-B-2)
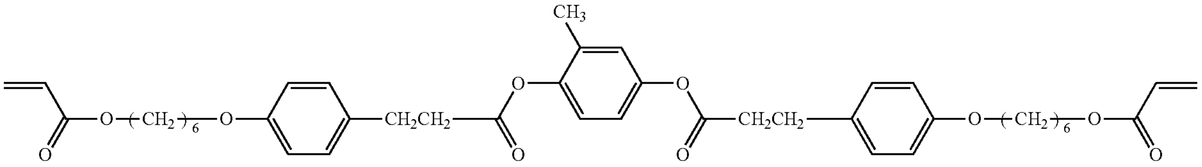
(6-2-B-3)
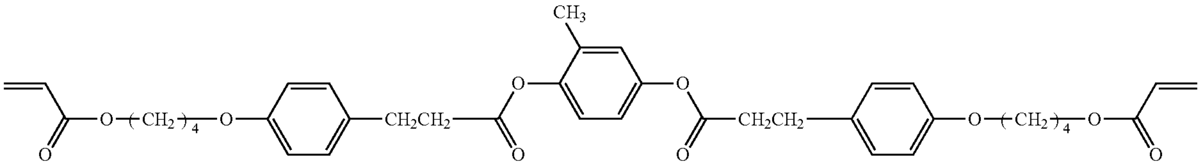
In formula (6-2-A-1) to formula (6-2-A-4), a trans isomer is preferred, and both of —CH═CH— further preferably take a trans form.
Formula 78
(6-2-C-1)
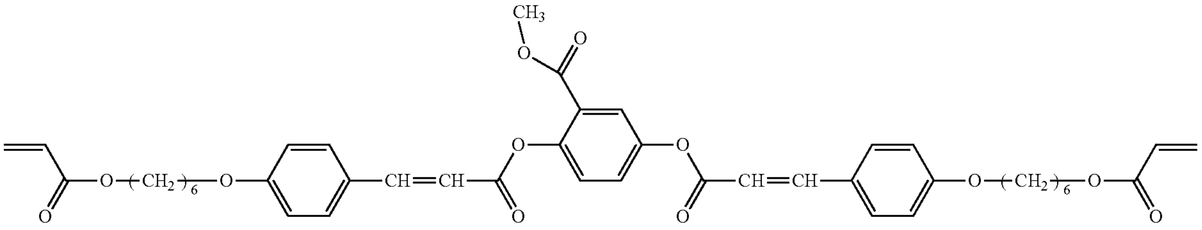
(6-2-C-2)
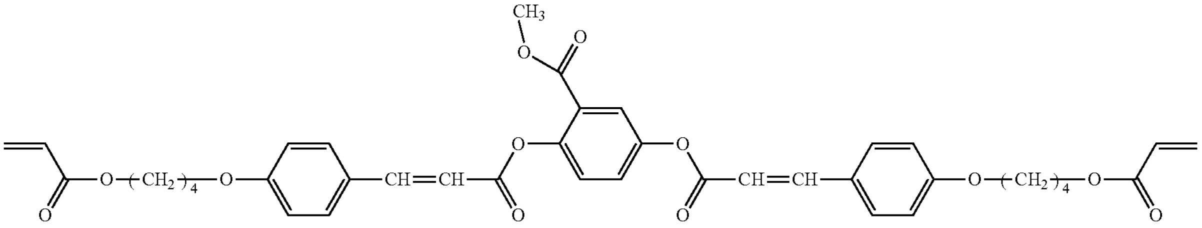

-continued
(6-2-C-3)
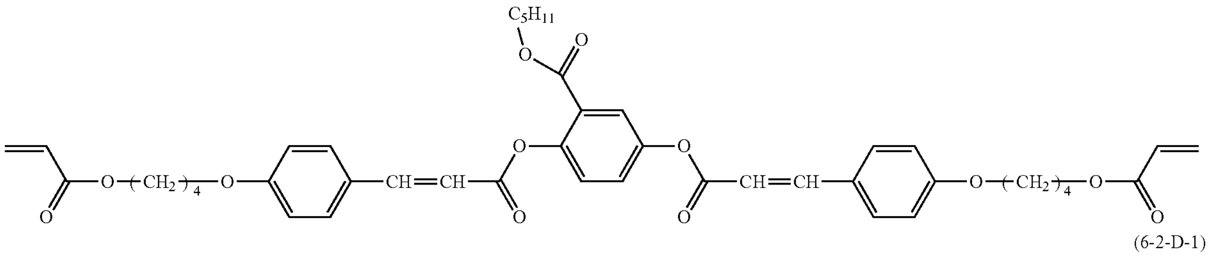
(6-2-D-1)
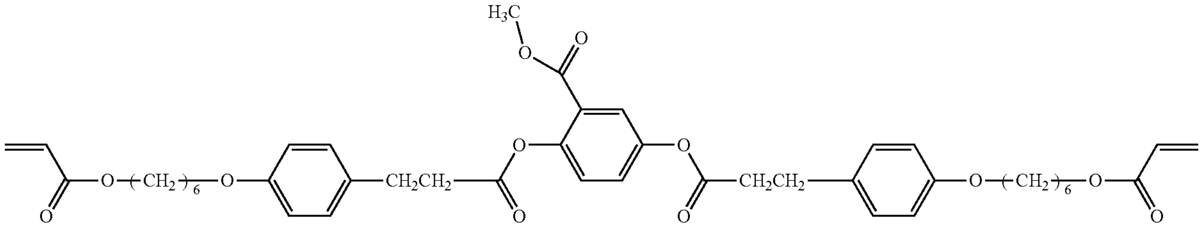
(6-2-D-2)
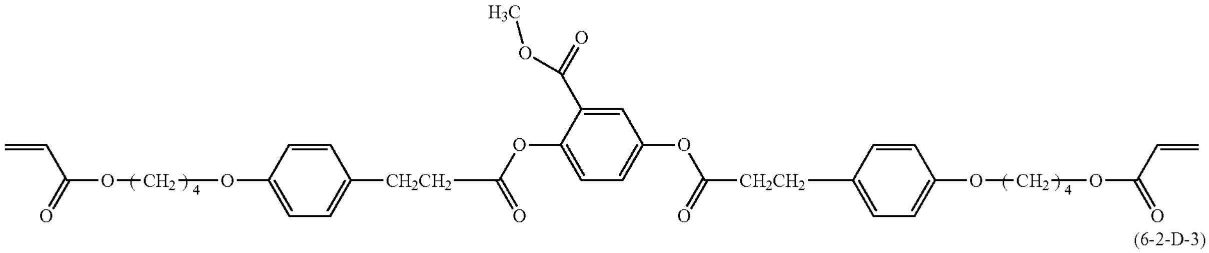
(6-2-D-3)
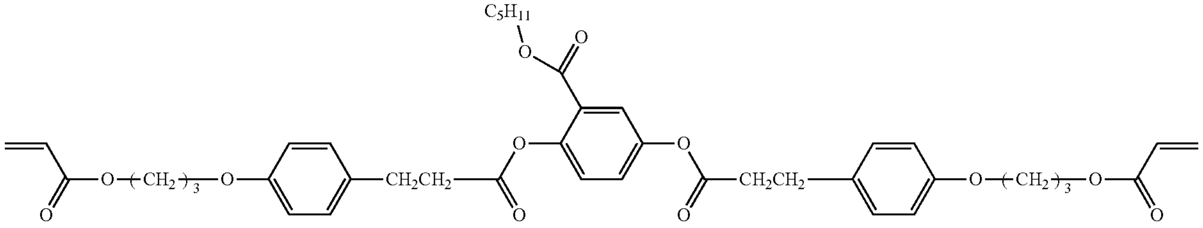
In formula (6-2-C-1) to formula (6-2-C-3), a trans isomer is preferred, and both of —CH═CH— further preferably take a trans form.
Formula 79
(6-2-E-1)
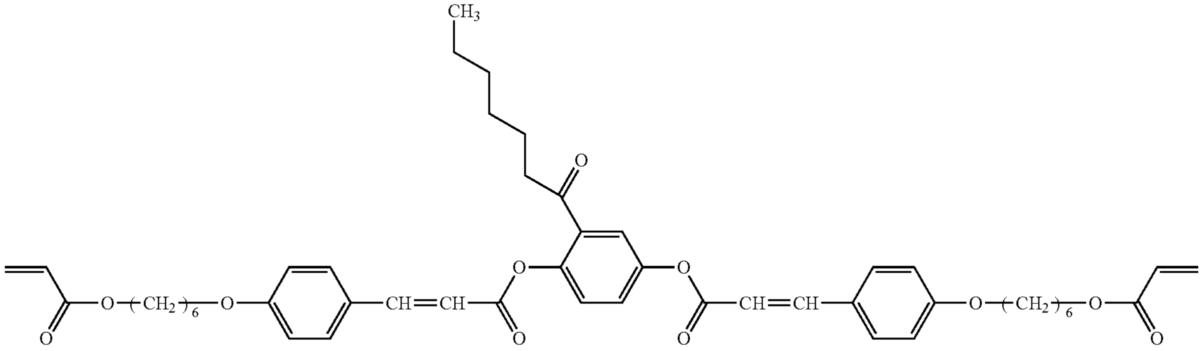

-continued (6-2-E-2)

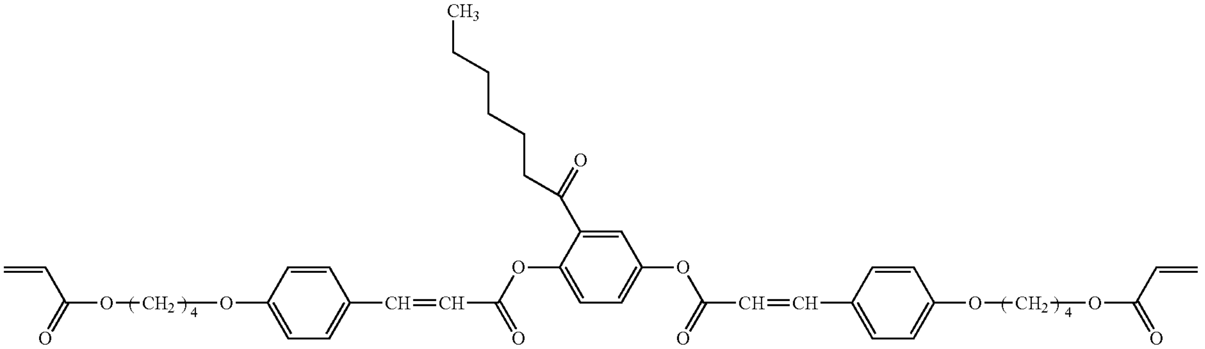

(6-2-E-3)

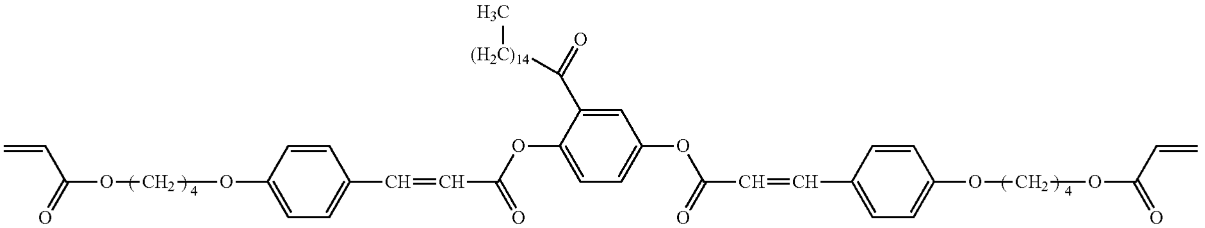

(6-2-F-1)

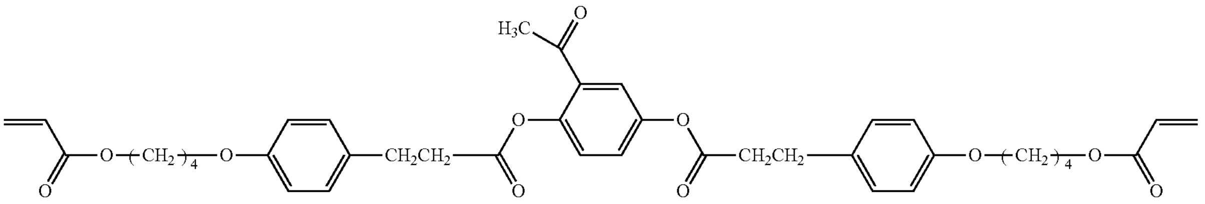

(6-2-F-2)

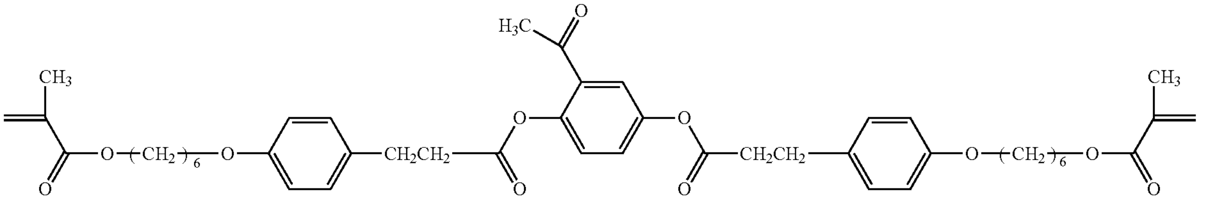

In formula (6-2-E-1) to formula (6-2-E-3), a trans isomer is preferred, and both of —CH═CH— further preferably take a trans form.

Next, specific examples of any other polymerizable compound, the additive and the organic solvent are described, and the compounds may include a commercial item. Specific examples of any other polymerizable compound include a compound having one polymerizable group, a compound having two polymerizable groups, a compound having three or more polymerizable groups, a non-liquid crystalline polymerizable compound having a functional group including a hydroxyl and having an acryloyl or a methacryloyl in one compound, a polymerizable compound having a carboxyl and a polymerizable compound having a phosphate.

Specific examples of the compound having one polymerizable group but having no functional group including the hydroxyl include styrene, nucleus-substituted styrene, acrylonitrile, vinyl chloride, vinylidene chloride, vinylpyridine, N-vinyl pyrrolidone, vinylsulfonic acid, fatty acid vinyl (vinyl acetate), α,β-ethylenic unsaturated carboxylic acid (acrylic acid, methacrylic acid, maleic acid, fumaric acid, itaconic acid), alkyl ester of (meth)acrylic acid (number of carbons in alkyl: 1 to 18), hydroxyalkyl ester of (meth) acrylic acid (number of carbons in hydroxyalkyl: 1 to 18), aminoalkyl ester of (meth)acrylic acid (number of carbons in aminoalkyl: 1 to 18), ether oxygen-containing alkylester of (meth)acrylic acid (number of carbons in ether oxygen-containing alkyl: 3 to 18, such as methoxyethyl ester, ethoxyethyl ester, methoxypropyl ester, methylcarbyl ester, ethylcarbyl ester and butylcarbyl ester), N-vinylacetamide, vinyl p-t-butylbenzoate, vinyl N,N-dimethylaminobenzoate, vinyl benzoate, vinyl pivalate, vinyl 2,2-dimethylaminobenzoate, vinyl 2,2-dimethylpentanoate, vinyl 2-methyl-2-methyl-2-butanoate, vinyl propionate, vinyl stearate, vinyl 2-ethyl-2-methylbutanoate, dicyclopentaniloxylethyl (meth) acrylate, isobornyloxylethyl (meth)acrylate, isobornyl (meth)acrylate, adamanthyl (meth)acrylate, dimethyl adamanthyl (meth)acrylate, dicyclopentanyl(meth)acrylate, dicyclopentenyl (meth)acrylate, mono(meth)acrylic acid ester of polyethylene glycol (number of repeating units (degree of polymerization): 2 to 20) a terminal group of which is capped by alkyl having 1 to 6 carbons, mono (meth)acrylic ester of polypropylene glycol (number of repeating units (degree of polymerization): 2 to 20) a terminal group of which is capped by alkyl having 1 to 6 carbons, and mono (meth)acrylic ester of polyalkylene glycol such as a copolymer (degrees of polymerization: 2 to 20) of ethylene oxide and propylene oxide a terminal group of which is capped by alkyl having 1 to 6 carbons.

Specific examples of the compound having two polymerizable groups but having no functional group including the hydroxyl include 1,4-butanediol diacrylate, 1,6-hexanediol diacrylate, 1,9-nonanediol diacrylate, neopentylglycol diacrylate, dimethyloltricyclodecane diacrylate, triethyleneglycol diacrylate, dipropyleneglycol diacrylate, tripropyleneglycol diacrylate, tetraethyleneglycol diacrylate, bisphenol A EO-added diacrylate, bisphenol A glycidyl diacrylate (Viscoat V#700), polyethylene glycol diacrylate and a methacrylate compound of the compound thereof. The compounds are suitable for further improving film-formation capability of a polymer.

Specific examples of the compound having three or more polymerizable groups but having no functional group including the hydroxyl include trimethylolpropane tri(meth)acrylate, trimethylol EO-added tri(meth)acrylate, tris(meth)acryloyloxyethyl phosphate, tris(meth)(acryloyloxyethyl)isocyanurate, alkyl-modified dipentaerythritol tri(meth)acrylate, EO-modified trimethylolpropane tri (meth) acrylate, PO-modified trimethylolpropane tri (meth) acrylate, pentaerythritol tetra(meth)acrylate, alkyl-modified dipentaerythritol tetra(meth)acrylate, ditrimethylolpropane tetra(meth)acrylate, dipentaerythritol hexa(meth)acrylate, alkyl-modified dipentaerythritol penta(meth)acrylate, Viscoat V#802 (number of functional groups=8) and Viscoat V#1000 (number of functional groups=14 on average). "Viscoat" is a trade name of products from Osaka Organic Chemical Industry Ltd. A compound having 16 or more functional groups can be obtained by using Boltorn H20 (16 functional groups), Boltorn H30 (32 functional groups) and Boltorn H40 (64 functional groups) sold by Perstorp Specialty Chemicals as a raw material and acrylating the raw material.

The non-liquid crystalline polymerizable compound having the functional group including the hydroxyl and having the acryloyl or methacryloyl in one compound may include a commercial item. Preferred examples include butanediol monoacrylate, a reaction product between butyl glycidyl ether and (meth)acrylic acid (Denacol DA-151 (registered trademark), made by Nagase & Co., Ltd.), 3-chloro-2-hydroxypropyl methacrylate, glycerol methacrylate (Blemmer (registered trade mark) GLM, made by NOF Corporation), glycerol acrylate, glycerol dimethacrylate (Blemmer GMR series, made by NOF Corporation), glycerol triacrylate (EX-314, made by Nagase ChemteX Corporation), 2-hydroxyethyl acrylate (BHEA, made by Nippon Shokubai Co., Ltd.), 2-hydroxyethyl methacrylate (HEMA, made by Nippon Shokubai Co., Ltd.), 2-hydroxypropyl acrylate (HPA, made by NIPPON SHOKUBAI CO., LTD.), 2-hydroxypropyl methacrylate (HPMA, made by Nippon Shokubai Co., Ltd.), caprolactone-modified 2-hydroxyethyl acrylate, caprolactone-modified 2-hydroxyethyl methacrylate, phenoxyhydroxypropyl acrylate (M-600A, made by Kyoeisha Chemical Co., Ltd.), 2-hydroxy-3-acryloyloxypropyl methacrylate (G-201P, made by Kyoeisha Chemical Co., Ltd.), Kayarad (registered trademark) R-167, made by Nippon Kayaku Co., Ltd., triglycerol diacrylate (Epoxy Ester 80MFA, made by Kyoeisha Chemical Co., Ltd.), pentaerythritol tri(meth)acrylate, dipentaerythritolmonohydroxy penta(meth)acrylate, 2-acryloyloxyethyl succinate, 2-acryloyloxyethyl hexahydrophthalate, 2-acryloyloxyethyl phthalate, 2-acryloyloxyethyl-2-hydroxyethyl phthalate, 2-acryloyloxyethyl acid phosphate, L-methacryloxyethyl acid phosphate, 2-methacryloyloxyethyl succinate, 2-methacryloyloxyethyl hexahydrophthalate, 2-acryloyloxyethyl-2-hydroxyethyl phthalate, 4-(2-acryloyloxyeth-1-yloxy) benzoic acid, 4-(3-acryloyloxy-n-prop-1-yloxy)benzoic acid, 4-(2-methacryloyloxyeth-1-yloxy)benzoic acid, 4-(4-acryloyloxy-n-but-1-yloxy)benzoic acid, 4-(6-acryloyloxy-n-hex-1-yloxy)benzoic acid, 4-(6-acryloyloxy-n-hex-1-yloxy)-2-methyl benzoic acid, 4-(6-methacryloyloxy-n-hex-1-yloxy)benzoic acid, 4-(10-acryloyloxy-n-dec-1-yloxy) benzoic acid, 2-acryloyloxyethyl acid phosphate and 2-methacryloiloxy-ethyl acid phosphate.

Specific examples of monomethacrylic acid ester of polyethylene glycol having a degree of polymerization from 2 to 20, as exemplified by formula (7-1) described below, include Blemmer PE-90 (n=2), PE-200 (n=4.5) and PE-350 (n=8), as made by NOF Corporation. Here, the number of repeating units of a polyethylene glycol chain (degree of polymerization) is further preferably 2 to 10, in which n represents the number of average constitutional units.

Formula 80

(7-1)

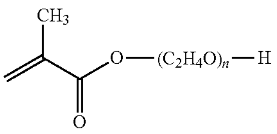

Specific examples of monoacrylic ester of polyethylene glycol having a degree of polymerization from 2 to 20 include, as exemplified by formula (7-2) described below, Blemmer AE-90 (n=2), AE-200 (n=4.5) and AE-400 (n=10), as made by NOF Corporation. Here, the number of repeating units of a polyethylene glycol chain (degree of polymerization) is further preferably 2 to 10.

Formula 81

(7-2)

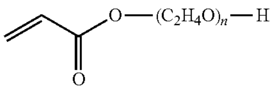

Specific examples of monomethacrylic acid ester of polypropylene glycol having a degree of polymerization from 2 to 20 include, as exemplified by formula (7-3) described below, Blemmer PP-1000 (n=4 to 6), PP-500 (n=9) and PP-800 (n=13), as made by NOF Corporation. Here, the number of repeating units of a polyethylene glycol chain (degree of polymerization) is further preferably 3 to 13.

Formula 82

(7-3)

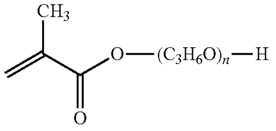

Specific examples of monoacrylic ester of polypropylene glycol having a degree of polymerization from 2 to 20 include, as exemplified by formula (7-4) described below, Blemmer AP-150 (n=3), AP-400 (n=6), AP-550 (n=9) and AP-800 (n=13), as made by NOF Corporation. Here, the number of repeating units of a polyethylene glycol chain (degree of polymerization) is further preferably 3 to 13.

Formula 83

(7-4)

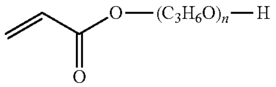

Specific examples of poly(ethylene glycol-propylene glycol) monomethacrylic acid ester include, as exemplified by formula (7-5) described below, Blemmer 50PEP-300, made by NOF Corporation. Here, ethylene or propylene that means R is randomly copolymerized. The mean number (m) of constitutional units of ethyleneoxy and propyleneoxy is approximately 2.5 and approximately 3.5, respectively. Further, m described below also represents the mean number of constitutional units of each alkylene.

Formula 84

(7-5)

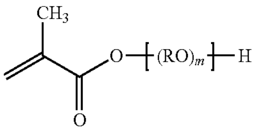

R: $C_2H_4$ or $C_3H_6$

Specific examples of poly'ethylene glycol-propylene glycol) monomethacrylic acid ester include, as exemplified by formula (7-6) described below, Blemmer 70PEP-350 B (m=5, n=2), made by NOF Corporation.

Formula 85

(7-6)

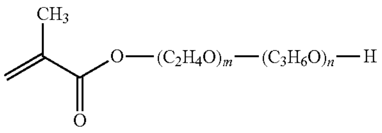

Specific examples of polyethylene glycol-polypropylene glycol monoacrylic acid ester include Blemmer AEP series.

Specific examples of poly(ethylene glycol-tetramethylene glycol) monomethacrylic acid ester include, as exemplified by formula (7-7) described below, Blemmer 55PET-400, 30PET-800 and 55PET-800, made by NOF Corporation. Here, the number of repeating units of a poly(ethylene glycol-tetramethylene glycol) chain is further preferably 2 to 10. In the formula, ethylene or butylene that means R is randomly copolymerized. The mean number (m) of constitutional units of ethyleneoxy and butyleneoxy is 5 and 2 in 55PET-400, 6 and 10 in 30PET-800, and 10 and 5 in 55PET-800, respectively.

Formula 86

(7-7)

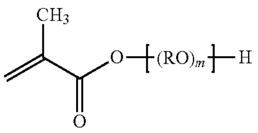

R: $C_2H_4$ or $C_4H_8$

Specific examples of poly(ethylene glycol-tetramethylene glycol) monoacrylic acid ester include Blemmer AET series, made by NOF Corporation.

Specific examples of poly (propylene glycol-tetramethylene glycol) monomethacrylic acid ester include, as exemplified by formula (7-8) described below, Blemmer 30PPT-800, 50PPT-800 and 70PPT-800, made by NOF Corporation. Here, the number of repeating units of a poly (propylene glycol-tetramethylene glycol) chain is further preferably 3 to 10. In the formula, propyleneoxy or butyleneoxy that means R is randomly copolymerized. The mean number (m) of constitutional units of propylene and butylene is 4 and 8 in 30PPT-800, 7 and 6 in 50PPT-800 and 10 and 3 in 70PPT-800, respectively.

Formula 87

(7-8)

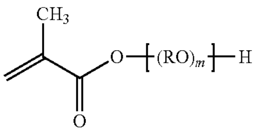

R: $C_3H_6$ or $C_4H_8$

Specific examples of poly (propylene glycol-tetramethylene glycol) monoacrylic acid ester include Blemmer APT series, made by NOF Corporation.

Specific examples of propylene glycol-polybutylene glycol mono((meth)acrylic ester) include, as exemplified by formula (7-9) described below, Blemmer 10PPB-500B (n=6), and as exemplified by formula (7-10) described below, 10APB-500B (n=6), as made by NOF Corporation. Here, the number of repeating units of a propylene glycol-polybutylene glycol chain is further preferably 6.

Formula 88

(7-9)

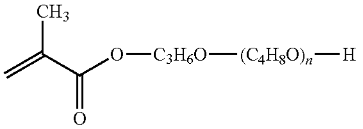

(7-10)

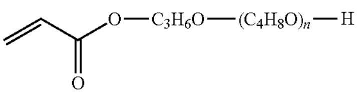

Preferred examples of the polymerizable compound having the carboxyl are described below, and may include a commercial item.

Preferred examples include 2-methacryloyloxyethyl succinate (Light Ester HO-MS (N), made by Kyoeisha Chemical Co.), Ltd.), 2-methacryloyloxyethyl hexahydrophthalate (Light Ester HO-HH (N), made by Kyoeisha Chemical Co., Ltd.), 2-acryloyloxyethyl succinate (Light Ester HOA-MS (N), made by Kyoeisha Chemical Co., Ltd.), 2-acryloyloxyethyl hexahydrophthalate (Light Acrylate HOA-HH (N), made by Kyoeisha Chemical Co., Ltd.), 2-acryloyloxyethyl phthalate (Light Acrylate HOA-MPL (N), made by Kyoeisha Chemical Co., Ltd.), 2-acryloyloxyethyl-2-hydroxyethyl phthalate (Light Acrylate HOA-MPE (N), made by Kyoeisha Chemical Co., Ltd.), 4-(2-acryloyloxyeth-1-yloxy) benzoic acid (ST01630, made by Synthon Chemicals GmbH & Co. KG), 4-(3-acryloyloxy-n-prop-1-yloxy) benzoic acid (ST02453, made by Synthon Chemicals GmbH & Co. KG), 4-(2-methacryloyloxyeth-1-yloxy) benzoic acid (ST01889, made by Synthon Chemicals GmbH & Co. KG), 4-(4-acryloyloxy-n-but-1-yloxy) benzoic acid (ST01680, made by Synthon Chemicals GmbH & Co. KG), 4-(6-acryloyloxy-n-hex-1-yloxy) benzoic acid (ST00902, made by Synthon Chemicals GmbH & Co. KG), 4-(6-acryloyloxy-n-hex-1-yloxy)-2-methylbenzoic acid (ST03606, made by Synthon Chemicals GmbH & Co. KG), 4-(6-methacryloyloxy-n-hex-1-yloxy) benzoic acid (ST01618, made by Synthon Chemicals GmbH & Co. KG) and 4-(10-acryloyloxy-n-dec-1-yloxy) benzoic acid (ST03604, made by Synthon Chemicals GmbH & Co. KG).

Preferred examples of the polymerizabie compound having the phosphate are described below, and may include a commercial item.

Specific examples include 2-acryloyloxyethyl acid phosphate (Light Acrylate P-1A(N), made by Kyoeisha Chemical Co., Ltd.), 2-methacryloyloxyethyl acid phosphate (Light Ester P-1M, made by Kyoeisha Chemical Co., Ltd.), Light Ester P-2M, made by Kyoeisha Chemical Co., Ltd., and KAYAMER (registered trademark) PM-2, made by Nippon Kayaku Co., Ltd.

Specific examples of the surfactant include a cationic surfactant, an anionic surfactant and a nonionic surfactant.

Specific examples of the ionic surfactant include a titanate compound, imidazoline, a quaternary ammonium salt, alkylamine oxide, a polyamine derivative, a polyoxyethylene-polyoxypropylene condensate, polyethylene glycol and an ester thereof, sodium lauryl sulfate, ammonium lauryl sulfate, amines lauryl sulfate, alkyl-substituted aromatic sulfonate, alkyl phosphate, an aliphatic or aromatic sulfonic acid-formalin condensate, laurylamidopropyl betaine, laurylaminoacetic acid betaine, polyethylene glycol fatty acid ester, polyoxyethylene alkylamine, perfluoroalkyl sulfonate and perfluoroalkyl carboxylate.

Specific examples of kinds of nonionic surfactants include vinyl-based, silicone-based, fluorine-based and hydrocarbon-based surfactants, and the vinyl-based surfactant is preferred.

Specific examples of the vinyl-based nonionic surfactant include one or more surfactants selected from polyalkyl acrylate, polyalkyl methacrylate, polyalkyl vinyl ether, polybutadiene, polyolefin and polyvinyl ether.

Specific examples of the silicone-based nonionic surfactant include polydimethylsiloxane, polyphenylsiloxane, specifically modified siloxane, fluorine-modified siloxane and surface-treated siloxane.

Specific examples of the fluorine-based nonionic surfactant include a fluorine polymer.

Specific examples of the hydrocarbon-based nonionc surfactant include polyethylene, polypropylene, polyisobutylene, paraffin, liquid paraffin, chlorinated polypropylene, chlorinated paraffin and chlorinated liquid paraffin.

Specific examples include a silicone-based nonionic surfactant described in paragraph 0196 of JP 2011-246365 A, a fluorine-based nonionic surfactant described in paragraph 0197 of the same gazette, a nonionic surfactant containing an acrylic polymer as a main component as described in paragraph 0199 of the same gazette, and a fluorine-based nonionic surfactant or a silicone-based nonionic surfactant described in paragraph 0019 of JP 2009-242563 A, or TEGO Flow 300, TEGO Flow 370 and TEGO Flow ZFS460 (made by Evonik Industries AG) being vinyl-based nonionic surfactants.

The surfactant may be used alone or in combination of two or more surfactants.

Among the surfactants, the vinyl-based surfactant being the nonionic surfactant has a lower degree of segregation on a surface of the paint film (without excessive localization) in comparison with the silicone-based or fluorine-based nonionic surfactant, and therefore is considered to be advantageous in suppressing the alignment defect and developing the tilt alignment. Among the vinyl-based surfactants, polyalkyl acrylate (acrylic polymer), polyalkyl methacrylate or the like is further preferred.

Specific examples of the vinyl-based surfactant containing the acrylic polymer or acrylic copolymer as the main component include Polyflow series (Polyflow No. 7, No. 50 E, No. 50 EHF, No. 54 N, No. 75, No. 77, No. 85, No. 85 HF, No. 90, No. 90 D-50, No. 95 or No. 99 C) (made by Kyoeisha Chemical Co., Ltd.), TEGO Flow series (TEGO Flow 300, 370, or ZFS 460) (made by Evonik Industries AG) and BYK series (BYK 350, 352, 354, 355, 356, 358N, 361N, 381, 392, 394, 3441 or 3440) (made by BYK Japan KK).

Addition of the surfactants as described above presumably causes moderate suppression of the homeotropic alignment on a side of an air interface, and alignment of directions of raising liquid crystal molecules from the interface in one direction. Therefore, the alignment defect can be presumably suppressed. Moreover, the surfactant is effective in facilitating control of uniformity of the directions of raising the liquid crystal molecules in the tilt alignment, uniform application of the composition onto the support substrate or the like.

Moreover, in order to optimize applicability to the substrate, a surfactant classified as a (substrate) wetting agent may be simultaneously used in the range in which the tilt alignment is not affected. The wetting agent is effective in decreasing surface tension of the polymerizable liquid crystal solution and improving applicability to a coating substrate. Specific examples of such a wetting agent include Polyflow series (KL-100, KL-700, LE-604, 605, 606), TEGO Twin series (4000) (made by Evonik Industries AG) and TEGO Wet series (KL245, 250, 260, 265 and 270, 280, 500, 505, 510, 520) (made by Evonik Industries AG).

The surfactant may have a polymerizable group in order to cause integration with the polymerizable liquid crystal compound. Specific examples of the polymerizable group to be introduced into the surfactant include an ultraviolet light reaction-type functional group and a thermally polymerizable functional group. From a viewpoint of reactivity with the polymerizable liquid crystal compound, the ultraviolet light reaction-type functional group is preferred. A preferred ratio of the surfactant is in the range of approximately 0.0001 to approximately 0.05, and further preferably, in the range of approximately 0.0003 to approximately 0.03 in terns of a weight ratio based on the total weight of component (A) and component (B), although the ratio is different depending on a kind of surfactant, a composition ratio of the compositions or the like.

In order to optimize a rate of polymerization of the polymerizable liquid crystal composition, a publicly known photopolymerization initiator may be used. A preferred amount of addition of the photopolymerization initiator is approximately 0.0001 to approximately 0.20 in terms of the weight ratio based on the total weight of component (A) and component (B). A further preferred weight ratio is in the range of approximately 0.001 to approximately 0.15. A still further preferred ratio is in the range of approximately 0.01 to approximately 0.15.

Specific examples of the photopolymerization initiator include 2-hydroxy-2-methyl-1-phenylpropane-1-one (Darocur (registered trademark) 1173), 1-hydroxycyclohexylphenyl ketone, 2,2-dimethoxy-1,2-diphenylethane-1-one (Irgacure (registered trademark) 651), 1-hydroxy-cyclohexyl-phenyl-ketone (Irgacure 184), Irgacure 127, Irgacure 500 (mixture of Irgacure 184 and benzophenone), Irgacure 2959, Irgacure 907, Irgacure 369, Irgacure 379, Irgacure 754, Irgacure 1300, Irgacure 819, Irgacure 1700, Irgacure 1800, Irgacure 1850, Irgacure 1870, Darocur 4265, Darocur MBF, Darocur TPO, Irgacure 784, Irgacure 754, Irgacure OXE01, Irgacure OXE02, AdekaArkls NCI-831, Adeka Arkls NCI-930 and Adeka Optomer N-1919. The photopolymerization initiator may be used alone or in combination of two or more initiators. Both of Darocur and Irgacure described above are names of products sold by BASF Japan, Ltd. Both of Adeka Arkls and Adeka Optomer are names of products sold by ADEKA Corporation. To the initiators, a publicly known sensitizer (isopropylthioxanthone, diethylthioxanthone, ethyl-4-dimethylaminobenzoate (Darocur EDB), 2-ethylhexyl-4-dimethylaminobenzoate (Darocur EHA) and so forth) may be added.

Other specific examples of the photoradical polymerization initiator include p-methoxyphenyl-2,4-bis (trichloromethyl) triazine, 2-(p-butoxystyryl)-5-trichloromethyl-1,3,4-oxadiazole, 9-phenylacridine, 9,10-benzophenazine, a benzophenone-Michler's ketone mixture, a hexaarylbiimidazole-mercaptobenzimidazole mixture, 1-(4-isopropylphenyl)-2-hydroxy-2-methylpropan-1-one, benzyldimethylketal, 2-methyl-1-[4-(methylthio)phenyl]-2-morpholinopropan-1-one, a 2,4-diethylxanthone-methyl p-dimethylaminobenzoate mixture and a benzophenone-methyltriethanolamine mixture.

When a compound has ($R^{61}$—F) to ($R^{61}$—B) as the polymerizable group upon using the compound represented by formula (6), a publicly known photocationic polymerization initiator may be used. A preferred amount of addition of the photocationic polymerization initiator is approximately 0.0001 to approximately 0.1 in terms of the weight ratio based on the total weight of the cationic polymerization compound. A further preferred weight ratio is approximately 0.001 to approximately 0.07.

Specific examples of trade names of the photocationic polymerization initiator include CPI series (CPI-100P, 200K) made by San-Apro Ltd., Cyracure UVI-6990, Cyracure UVI-6974 and Cyracure UVI-6992 as UCC product, AdekaOptomer SP series (SP-150, SP-170, SP-171, SP-056, SP-066, SP-130, SP-140, SP-082, SP-103, SP-601, SP-606 and SP-701), made by ADEKA Corporation, PHOTOINITIATOR 2074, made by Rhodia, Ltd., Irgacure 250, 270 and 290, made by BASF Japan Ltd., WPI series and WPAG series, made by Wako Pure Chemical Industries, Ltd., UV-9380C, made by GE Silicones, and also TPS series, TAZ series, DPI series, BPI series, MDS series, DTS series, SI series, PI series, NDI series, PAI series, NAI series, NI series, DAM series, MBZ series, PYR series, DNB series and NB series, made by Midori Kagaku Co., Ltd.

When a salt is predicted to be generated to cause polymerization inhibition during simultaneous use of the radical polymerization initiator and a photo-acid generator, a change of the photo-acid generator to a photo-base generator is recommended. Specific examples of trade names of the photo-base generator include WPBG series (WPBG-018, WPBG-027, WPBG-082, WPBG-140, WPBG-165, WPBG-166, WPBG-167, WPBG-168, WPBG-172 and WPBG-266), made by Wako Pure Chemical Industries, Ltd.

A thermal polymerization initiator may be used in the invention. Specific examples of trade names include Adeka Opton series (CP-66), made by ADEKA Corporation, and San-Aid (main agent) SI-60, SI-80, SI-100, SI-110, SI-145, SI-150, SI-160 and SI-180, and San-Aid (auxiliary agent), SI, made by Sanshin Chemical Industry Co., Ltd. The initiators may be simultaneously used with the photoradical initiator and the photocation polymerization initiator, or with the photoradical initiator.

Mechanical characteristics of the optical anisotropic film can be controlled by adding one kind or two or more kinds of chain transfer agents to the polymerizable liquid crystal composition. A length of a polymer chain or a length of two crosslinked polymer chains in a polymer film can be controlled by using the chain transfer agent. Both lengths can also be simultaneously controlled. When an amount of the chain transfer agent is increased, the length of the polymer chain decreases. Specific examples of preferred chain transfer agents include a thiol compound and a styrene dimer.

Specific examples of monofunctional thiol include dodecanethiol and 2-ethylhexyl-(3-mercaptopropionate). Specific examples of polyfunctional thiol include trimethylolpropanetris(3-mercaptopropionate), pentaerythritoltetrakis (3-mercaptopropionate), 1,4-bis(3-mercaptobutyryloxy) butane (Karenz MT BD1), pentaerythritoltetrakis(3-mercaptobutylate) (Karenz MTPE1) and 1,3,5-tris(3-mercaptobutyloxyethyl)-1,3,5-triazine-2,4,6(1H,3H,5H)-trione (Karenz MT NR1). "Karenz" is a trade name of products from Showa Denko K.K. Specific examples of a thiol compound other than the compounds described above include a thiol compound described in paragraphs 0042 to 0043 in WO 2013/080855 A and a compound described in $11^{th}$ line on p. 23 to $27^{th}$ line on p. 24 in WO 2008/077261 A. Specific examples of the styrene dimer include α-methylstyrene dimer (2,4-diphenyl-4-methyl-1-pentene) and 1,1-diphenylethylene. Moreover, Quinoexter QE-2014 can also be utilized. "Quinoexter" is a trade name of products from Kawasaki Kasei Chemicals Ltd.

A polymerization inhibitor can be added to the polymerizable liquid crystal composition in order to prevent polymerization start during storage. A publicly known polymerization inhibitor can be used, and preferred examples include 2,5-di(t-butyl)hydroxytoluene (BHT), hydroquinone, Methyl Blue, diphenylpicryl hydrazide (DPPH), benzothiazine, 4-nitrosodimethylaniline (NIDI) and o-hydroxybenzophenone. The polymerization inhibitor may be used alone, or in combination of two or kinds.

An oxygen inhibitor can also be added in order to improve storage stability of the polymerizable liquid crystal composition. A radical generated within the composition reacts with oxygen in an atmosphere and yields a peroxide radical by which an unwanted reaction with the polymerizable compound is promoted. The oxygen inhibitor is preferably added in order to prevent such a reaction. Specific examples of the oxygen inhibitor include phosphate esters.

In order to further improve weather resistance of the polymerizable liquid crystal composition, an ultraviolet light absorber, a light stabilizer (radical scavenger), an antioxidant and so forth may be added. The additives may be used alone or in combination of two or more of kinds. Specific examples of the ultraviolet light absorber include Tinuvin PS, Tinuvin P, Tinuvin 99-2, Tinuvin 109, Tinuvin 213, Tinuvin 234, Tinuvin 326, Tinuvin 328, Tinuvin 329, Tinuvin 384-2, Tinuvin 571, Tinuvin 900, Tinuvin 928, Tinuvin 1130, Tinuvin 400, Tinuvin 405, Tinuvin 460, Tinuvin 479, Tinuvin 5236, ADK STAB LA-32, ADK STAB LA-34, ADK STAB LA-36, ADK STAB LA-31, ADK STAB 1413 and ADK STAB LA-51. "Tinuvin (registered trademark)" is a registered trademark of product from CIBA Holding Incorporated, and a trade name of products from BASF Japan Ltd. Moreover, "ADK STAB (registered trademark)" is a trade name of products from ADEKA Corporation.

Specific examples of the light stabilizer include Tinuvin 111 FDL, Tinuvin 123, Tinuvin 144, Tinuvin 152, Tinuvin 292, Tinuvin 622, Tinuvin 770, Tinuvin 765, Tinuvin 780, Tinuvin 905, Tinuvin 5100, Tinuvin 5050 and 5060, Tinuvin 5151, Chimassorb 119 FL, Chimassorb 944 FL, Chimassorb 944 LD, ADK STAB LA-52, ADK STAB LA-57, ADK STAB LA-62, ADK STAB LA-67, ADK STAB LA-63P, ADK STAB LA-68LD, ADK STAB LA-77, ADK STAB LA-82, ADK STAB LA-87, Cyasorb UV-3346, Uvinul 4050H, Uvinul 4077H, Uvinul 4092H, Uvinul 5050H and Uvinul 5062H, made by Cytec Industries Inc., and Good-Rite UV-3034, made by Goodrich Corporation. "Chimassorb (registered trademark)" and Uvinul are trade names of products from BASF Japan Ltd.

Specific examples of the antioxidant include ADK STAB AO-20, AO-30, AO-40, AO-50, AO-60 and AO-80, made by ADEKA Corporation, Sumilizer (registered trademark) BHT, Sumilizer BBM-S and Sumilizer GA-80 sold by Sumitomo Chemical Co., Ltd., and Irganox (registered trademark) 1076, Irganox 1010, Irganox 3114 and Irganox 245 sold by BASF Japan Ltd. Commercial items thereof may also be used. Alternatively, an antioxidant described in paragraph 0008 to paragraph 0014 in JP 2008-44989 A may also be used.

In order to control adhesion with the support substrate, a silane coupling agent may be further added to the polymerizable liquid crystal composition. Specific examples of the silane coupling agent include vinyltrialkoxysilane, 3-aminopropyltrialkoxysilane, N-(2-aminoethyl)3-aminopropyltrialkoxysilane, N-(1,3-dimethylbutylidene)-3-triethoxysilyl-1-propanamine, 3-triethoxysilyl-N-(1,3-dimethylbutylidene), 3-glycidoxypropyltrialkoxysilane, 3-chlorotrialkoxysilane and 3-methacryloxypropyltrialkoxysilane. Another example includes dialkoxymethylsilane in which one of alkoxy groups (three) in the compounds is replaced by methyl. A preferred silane coupling agent includes 3-aminopropyltriethoxysilane. The silane coupling agent may be used alone, or two or more of the silane coupling agent may be mixed and used.

In order to provide the polymerizable liquid crystal composition with polarization characteristics or fluorescence characteristics, a dichroic dye or a fluorescent dye may be further added thereto. The dichroic dye preferably includes (1) a dye having a high dichroic ratio, (2) a dye having a high absorption coefficient in a direction parallel to a molecule long axis, or (3) a dye having a high compatibility or solubility with the polymerizable liquid crystal composition. For example, a dye used in a guest-host liquid crystal display device, such as anthraquinone dyes or azo dyes can be used alone or in combination thereof. Moreover, the dichroic dye may have a polymerizable group.

A preferred amount of addition of the dichroic dye is approximately 0.01 to approximately 0.50 in terms of the weight ratio based on the total weight of component (A) and component (B). A further preferred weight ratio is in the range of approximately 0.01 to approximately 0.40. A still further preferred ratio is in the range of approximately 0.01 to approximately 0.30. Specific examples of the dichroic dye include SI-486, SI-426, SI-483, SI-412 and SI-428 as sold by Mitsui Fine Chemicals, Inc., and G-205, G-206, G-207, G-241, G-472, LSB-278 and LSB-335 as sold by Nagase & Co., Ltd. Commercial items thereof may also be used.

The polymerizable liquid crystal composition of the invention can be directly applied to a surface of the support substrate. However, in order to facilitate coating, the polymerizable liquid crystal composition may be diluted with a solvent as long as the solvent does not erode the support substrate. The solvent may be used alone or in combination of two or more kinds. Specific examples of the solvent include an ester solvent, an amide solvent, an alcohol solvent, an ether solvent, a glycol monoalkyl ether solvent, an aromatic hydrocarbon solvent, a halogenated aromatic hydrocarbon solvent, an aliphatic hydrocarbon solvent, a halogenated aliphatic hydrocarbon solvent, an alicyclic hydrocarbon solvent, a ketone solvent and an acetate solvent.

Preferred examples of the ester solvent include alkyl acetate (methyl acetate, ethyl acetate, propyl acetate, isopropyl acetate, butyl acetate, 3-methoxybutyl acetate, isobutyl acetate, pentyl acetate and isopentyl acetate), cyclohexyl acetate, ethyl trifluoroacetate, alkyl propionate (methyl propionate, methyl 3-methoxypropionate, ethyl propionate, propyl propionate and butyl propionate), alkyl butyrate (methyl butyrate, ethyl butylate, butyl butyrate, isobutyl butyrate and propyl butyrate), dialkyl malonate (diethyl malonate), alkyl glycolate (methyl glycolate and ethyl glycolate), alkyl lactate (methyl lactate, ethyl lactate, isopropyl lactate, n-propyl lactate, butyl lactate and ethylhexyl lactate), monoacetin, γ-butyrolactone and γ-valerolactone.

Preferred examples of the amide solvent include N-methyl-2-pyrrolidone, N,N-dimethylacetamide, N-methylpropionamide, N, N-dimethylformamide, N,N-diethylformamide, N,N-diethylacetamide, N,N-dimethylacetamide dimethylacetal, N-methylcaprolactam and dimethylimidazolidinone.

Preferred examples of the alcohol solvent include methanol, ethanol, 1-propanol, 2-propanol, l-methoxy-2-propanol, diacetone alcohol, t-butyl alcohol, sec-butyl alcohol, butanol, 2-ethylbutanol, n-hexanol, n-heptanol, n-octanol, 1-dodecanol, ethylhexanol, 3,5,5-trimethyl hexanol, n-amyl alcohol, hexafluoro-2-propanol, glycerol, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methylcyclohexanol.

Preferred examples of the ether solvent include ethylene glycol dimethyl ether, diethylene glycol dimethyl ether, bis (2-propyl) ether, 1,3-dioxolane, 1,4-dioxane, cyclopentyl methyl ether and tetrahydrofuran (THF).

Preferred examples of the glycol monoalkyl ether solvent include ethylene glycol monoalkyl ether (ethylene glycol monomethyl ether and ethylene glycol monobutyl ether), diethylene glycol monoalkyl ether (diethylene glycol monoethyl ether), triethylene glycol monoalkyl ether, propylene glycol monoalkyl ether (propylene glycol monobutyl ether), dipropylene glycol monoalkyl ether (dipropylene glycol monomethyl ether), ethylene glycol monoalkyl ether acetate (ethylene glycol monobutyl ether acetate), diethylene glycol monoalkyl ether acetate (diethylene glycol monoethyl ether acetate), triethylene glycol monoalkyl ether acetate, propylene glycol monoalkyl ether acetate (propylene glycol monomethyl ether acetate, propylene glycol monoethyl ether acetate and propylene glycol monobutyl ether acetate), dipropylene glycol monoalkyl ether acetate (dipropylene glycol monomethyl ether acetate) and diethylene glycol methyl ethyl ether.

Preferred examples of the aromatic hydrocarbon solvent include benzene, toluene, xylene, anisole, p-cymene, mesitylene, ethylbenzene, diethylbenzene, i-propylbenzene, n-propylbenzene, t-butylbenzene, s-butylbenzene, n-butylbenzene, a terpene derivative (1,4-cineole, 1,8-cineole, D-limonene, D-limonene oxide, p-menthane, α-pinene, β-pinene, γ-terpinene, terpineol and tetralin. Preferred examples of the halogenated aromatic hydrocarbon solvent include chlorobenzene.

Preferred examples of the aliphatic hydrocarbon solvent include hexane and heptane. Preferred examples of the halogenated aliphatic hydrocarbon solvent include chloroform, dichloromethane, carbon tetrachloride, dichloroethane, trichloroethylene and tetrachloroethylene. Specific preferred examples of the alicyclic hydrocarbon solvent include cyclohexane, methylcyclohexane and decalin.

Preferred examples of the ketone solvent include acetone, methyl ethyl ketone, methyl isobutyl ketone, 2-heptanone, cyclohexanone, cyclopentanone and methyl propyl ketone.

Preferred examples of the acetate solvent include ethylene glycol monomethyl ether acetate, propylene glycol monomethyl ether acetate, propylene glycol monoethyl ether acetate, methyl acetoacetate and 1-methoxy-2-propyl acetate.

From a viewpoint of solubility of the polymerizable liquid crystal compound, use of the amide solvent, the aromatic hydrocarbon or the ketone solvent is preferred, and when a boiling point of the solvent is taken into consideration, simultaneous use of the ester solvent the alcohol solvent, the ether solvent and the glycol monoalkyl ether solvent is also preferred. Selection of the solvent is not particularly limited, but when the plastic substrate is used as the support substrate, drying temperature is required to be decreased for preventing substrate deformation, and the solvent is required to cause no substrate erosion. Preferred examples of the solvent used in such a case include an aromatic hydrocarbon solvent, a ketone solvent, an ester solvent, an ether solvent, an alcohol solvent, an acetate solvent and a glycol monoalkyl ether solvent.

A ratio of the solvent in the solution of the polymerizable liquid crystal composition is ordinarily in the range of approximately 0 to approximately 95% based on the total weight of the solution. A lower limit of the range is set to a value determined in consideration of a case where the support substrate is subjected to erosion by the solvent. Then, an upper limit thereof is set to a value determined in consideration of solution viscosity, solvent cost, and productivity such as time and an amount of heat upon evaporating the solvent. A ratio is preferably in the range of approximately 0 to approximately 90%, and further preferably in the range of approximately 0 to approximately 85%.

In the explanation below, the liquid crystal film obtained by curing the polymerizable liquid crystal composition may be occasionally referred to as the optical anisotropic film. The optical anisotropic film can be formed in a manner described below. First, the polymerizable liquid crystal composition or the solution thereof is applied onto the support substrate, and the resulting applied material is heated and dried to form the paint film. Next, the paint film is irradiated with light to polymerize the polymerizable liquid crystal composition and to immobilize nematic alignment formed by the composition in the paint film in the liquid crystal state.

Usable support substrates are glass and a plastic film. Specific examples of the plastic film include a film of polyimide, polyamideimide, polyamide, polyetherimide, polyether ether ketone, polyether ketone, polyketone sulfide, polyethersulfone, polysulfone, polyphenylene sulfide, polyphenylene oxide, polyethylene terephthalate (PET), polybutylene terephthalate, polyethylene naphthalate, polyacetal, polycarbonate, polyarylate, an acrylic resin, polyvinyl alcohol, polypropylene, cellulose, triacetyl cellulose and a partially saponified product thereof, an epoxy resin, a phenol resin or a cycloolefin resin.

Specific examples of the cycloolefin resin include a norbornene resin and a dicyclopentadiene resin, but are not limited thereto. Among the resins, a resin having no unsaturated bond or a resin in which an unsaturated bond is hydrogenated is suitably used. Specific examples include a hydrogenated product of a ring-opened (co)polymer of one kind or two or more kinds of norbornene monomers, an addition (co)polymer of one kind or two or more kinds of norbornene monomers, an addition copolymer of a norbornene monomer and an olefin monomer (ethylene, α-olefin), an addition copolymer of a norbornene monomer and a cycloolefin monomer (cyclopentene, cyclooctene, 5,6-dihydrodicyclopentadiene) and a modified product thereof. Specific examples include ZEONEX (registered trademark), ZEONOR (registered trademark, made by Zeon Corporation), ARTON (made by JSR Corporation), TOPAS (registered trademark, made by Ticona GmbH), APEL (registered trademark, made by Mitsui Chemicals, Inc.), S-SINA (registered trademark, made by Sekisui Chemical Co., Ltd.) and OPTOREZ (made by Hitachi Chemical Co., Ltd.).

The plastic film may be the uniaxially oriented film or the biaxially oriented film. The plastic film may be subjected to, for example, hydrophilization treatment such as corona treatment or plasma treatment, or surface treatment such as hydrophobization treatment. A method for hydrophilization treatment is not particularly restricted, but corona treatment or plasma treatment is preferred, and a particularly preferred method is plasma treatment. For the plasma treatment, a method described in JP 2002-226616 A, JP 2002-121648 A or the like may be applied.

Moreover, an anchor coat layer may be formed for improving adhesion between a liquid crystal film and a plastic film. Such an anchor coat layer may be formed of any of an inorganic material or an organic material without any problem, as long as the material improves adhesion between the liquid crystal film and the plastic film. Moreover, the plastic film may be a laminated film. In place of the plastic film, a material can also be used, such as a metallic substrate of aluminum, iron or copper on a surface of which slit-shaped grooves are formed, and a glass substrate of alkaline glass, borosilicate glass or flint glass to a surface of which etching processing is applied in a slit shape.

Prior to forming the paint film of the polymerizable liquid crystal composition, physical or mechanical surface treatment by rubbing may be applied on the support substrate such as the glass and the plastic film. Alternatively, photo alignment treatment by polarized ultraviolet light may be applied. When the tilt alignment is formed, the surface treatment by rubbing may be directly applied to the support substrate, or the alignment film may be arranged beforehand on the support substrate, and then rubbing treatment may be applied to the alignment film.

Specific examples of the alignment film include a polyimide film, a polyamide film and a polyvinyl alcohol film. A particularly preferred alignment film includes a polyimide film. In order to increase a mean tilt angle, an alignment film may be utilized in which a side chain component is introduced into the polyimide. An arbitrary method can be employed for the rubbing treatment, but a method is ordinarily applied by winding a rubbing fabric formed of a raw material such as rayon, cotton and polyamide around a metallic roll or the like to move the roll while rotating the roll in a state in contact with a support substrate or an alignment layer, or moving a support substrate side while fixing the roll. Depending on a kind of the support substrate, silicon oxide is obliquely vapor-deposited to allow provision of alignment ability on a surface thereof. In case of using a photo alignment film, the substrate only needs to be tilted upon irradiating the substrate with polarized ultraviolet light.

Upon coating the polymerizable liquid crystal composition or the solution thereof, specific examples of an application method for obtaining uniform thickness include a spin coating method, a micro gravure coating method, a gravure coating method, a wire bar coating method, a dip coating method, a spray coating method, a meniscus coating method and a die coating method. In particular, the wire bar coating method or the like in which shear stress is applied to the liquid crystal compound during application may be applied in controlling alignment of the polymerizable liquid crystal material without applying surface treatment of the substrate by rubbing or the like.

Upon preparing the solution of the polymerizable liquid crystal composition, selection is made from a solvent having capability of dissolving the polymerizable liquid crystal composition, and also maintaining uniform alignment properties of a tilt alignment layer obtained from the polymerizable liquid crystal composition of the invention and minimizing solvent damage to the support substrate. Specific examples of such a solvent include the solvent described above used upon preparing the solution of the polymerizable liquid crystal composition. Then, an amount used is also set up within the range in which the uniform alignment the polymerizable liquid crystal composition is maintained and damage to the support substrate is minimized.

Upon coating the polymerizable liquid crystal composition of the invention or the solution thereof, when the solvent is contained, the solvent is removed to allow formation of a polymerizable liquid crystal layer, namely, a polymerizable liquid crystal composition layer having a uniform thickness on the support substrate. Conditions on solvent removal are not particularly limited. Drying only needs to be performed until the solvent is substantially removed and flowability of the paint film of the polymerizable liquid crystal composition is lost. The solvent can be removed applying air drying at room temperature, drying on a hot plate, drying in a drying furnace, blowing of warm air or hot air or the like.

Depending on a kind and a composition ratio of the compounds used for the polymerizable liquid crystal composition, the nematic alignment of the polymerizable liquid crystal composition in the paint film is completed in a process of drying of the coating film in some cases. Therefore, the paint film through a drying step can be provided for a polymerization step without passing through a heat treatment step to be described later.

A preferred range of temperature and time upon applying heat treatment to the paint film, a wavelength of light used for irradiation with light, an amount of light to be irradiated from a light source or the like is different depending on a kind and a composition ratio of the compounds used for the polymerizable liquid crystal composition, presence or absence of addition of the photopolymerization initiator, an amount of addition thereof or the like. Therefore, conditions of the temperature and the time of heat treatment of the paint film, the wavelength of light used for irradiation with light, and the amount of light to be irradiated from the light source explained below represent only an approximate range.

The heat treatment of the paint film is preferably applied on conditions under which the solvent is removed and uniform alignment properties of the polymerizable liquid crystal compound are obtained. One example of the heat treatment method includes a method for warming the paint film to temperature at which the nematic alignment is formed in the polymerizable liquid crystal compound in the paint film. The nematic alignment may be formed by changing the temperature of the paint film in a temperature range in which the polymerizable liquid crystal compound shows a nematic liquid crystal phase. The above method includes a method for warming the paint film to a high temperature region in the temperature range described above, thereby almost competing the nematic alignment in the paint film, and then decreasing temperature to form further-ordered alignment. Depending on the conditions under which the uniform alignment properties of the polymerizable liquid crystal composition is obtained, the heat treatment may be applied at temperature equal to or higher than a transition point temperature (clearing point temperature) from a liquid crystal phase to an isotropic phase of the polymerizable liquid crystal composition. According to the method, the paint film is heated to temperature at which the paint film forms the isotropic phase, and then cooling the film to temperature at which the paint film forms the nematic alignment to form further-ordered alignment.

Even when any one of the heat treatment methods described above is applied, the heat treatment temperature is ordinarily approximately room temperature (25° C.) to approximately 150° C. A preferred temperature range is approximately room temperature (25° C.) to approximately 140° C., a further preferred range is approximately room temperature (25° C.) to approximately 130° C., and a still further preferred range is approximately room temperature (25° C.) to approximately 120° C.

Heat treatment time is ordinarily approximately 5 seconds to approximately 2 hours. A preferred range of the time is approximately 10 seconds to approximately 40 minutes, and a further preferred range is approximately 20 seconds to approximately 20 minutes. In order to increase the temperature of the layer formed of the polymerizable liquid crystal composition to a predetermined temperature, the heat treatment time is preferably adjusted to approximately 5 seconds or more. In order to avoid a decrease in productivity, the heat treatment time is preferably adjusted within approximately 2 hours. Thus, the polymerizable liquid crystal layer in which the tilt alignment is formed according to the invention is obtained.

The nematic alignment state of the polymerizable liquid crystal compound as formed in the polymerizable liquid crystal composition layer is immobilized by polymerization of the polymerizable liquid crystal compound by irradiation with light. A wavelength of light used for irradiation with light is not particularly limited. Electron beams, ultraviolet light, visible light, infrared light (heat rays) or the like can be used. Ultraviolet light or visible light is ordinarily sufficiently used. A range of wavelength is ordinarily approximately 150 to approximately 500 nanometers. A preferred range is approximately 250 to approximately 450 nanometers, and a further preferred range is approximately 300 to approximately 400 nanometers. Specific examples of the light source include a low-pressure mercury lamp (a germicidal lamp, a fluorescence chemical lamp, a black light), a high-pressure discharge lamp (a high-pressure mercury lamp, a metal halide lamp) and a short arc discharge lamp (an ultrahigh pressure mercury lamp, a xenon lamp and a mercury xenon lamp). Preferred examples of the light source include a metal halide lamp, a xenon lamp, an ultrahigh pressure mercury lamp and a high-pressure mercury lamp. A wavelength region of the light source for irradiation may be selected by installing a filter or the like between the light source and the polymerizable liquid crystal composition layer, thereby selecting the wavelength region to of the light source for irradiation.

An amount of light to be irradiated from the light source is ordinarily approximately 2 to approximately 5,000 $mJ/cm^2$. A preferred range of the amount of light is approximately 10 to approximately 3,000 $mJ/cm^2$, and a further preferred range is approximately 100 to approximately 2,000 $mJ/cm^2$. Temperature conditions during irradiation with light are preferably set up in a manner similar to the conditions of the heat treatment temperature described above. Moreover, an atmosphere of a polymerization environment may include any of a nitrogen atmosphere, an inert gas atmosphere and an air atmosphere, but a nitrogen atmosphere or an inert gas atmosphere is preferred from a viewpoint of improving curability.

When the polymerizable liquid crystal layer and the optical anisotropic film obtained by polymerizing the polymerizable liquid crystal layer using light, heat or the like according to the invention are utilized for various optical devices, or applied to an optical compensation device used for a liquid crystal display apparatus, control of tilt angle distribution in a thickness direction becomes significantly important.

One of the methods for controlling the tilt angle includes a method for adjusting a kind, a composition ratio or the like of the liquid crystal compounds used for the polymerizable liquid crystal composition. The tilt angle can also be controlled by adding any other component to the polymerizable liquid crystal compound. The tilt angle of the optical anisotropic film can also be controlled by a kind of solvent and a solute concentration in the polymerizable liquid crystal composition, a kind and an amount of addition of a surfactant to be added as one of the other components, or the like.

The tilt angle of the optical anisotropic film can also be controlled by a kind and rubbing conditions of the support substrate or the polymer coating film, or by drying conditions or heat treatment conditions of the paint film of the polymerizable liquid crystal composition. When glass is used as the support substrate and a polyimide rubbing alignment film is used as the alignment film, drying temperature is adjusted to a vicinity of temperature (clearing point) at which the polymerizable liquid crystal changes to the isotropic phase, heating the liquid crystal composition to a clearing point temperature or higher, thereby allowing a decrease in the alignment defect in some cases. Moreover, an irradiation atmosphere in a photopolymerization step after alignment, temperature during irradiation, or the like also affects the tilt angle of the optical anisotropic film. More specifically, almost all the conditions in the process for manufacturing the optical anisotropic film are considered to affect the tilt angle to some extent.

Therefore, the polymerizable liquid crystal composition is optimized, and simultaneously the conditions of the process for manufacturing the optical anisotropic film are appropriately selected, thereby allowing achievement of an arbitrary tilt angle.

The tilt alignment means the state in which the alignment state further rises from parallel to perpendicular as the alignment state is further separated from the substrate. Examples of the tilt angle in the tilt alignment include approximately 5 degrees to approximately 85 degrees. The alignment state is obtained by forming on the support substrate surface the paint film of the polymerizable liquid crystal composition according to the invention to which component (A) and component (B) are added on the alignment film subjected to surface treatment such as rubbing treatment and photo alignment treatment.

In order to control the high tilt angle, when a compound represented by formula (1-1) and/or a compound represented by formula (1-3) is used as component (A), 9-methylfluorene (more specifically, either $W^2$ or $W^3$ is methyl and the other is hydrogen) is preferably used fluorene structure. When a compound represented by formula (1-2) is used, a compound in which $W^4$ is methyl, alkyl having 1 to 7 carbons or alkoxy carbonyl ($—COOR^b$: $R^b$ is straight-chain alkyl having 1 to 7 carbons) is preferably used.

On the other hand, when both of $W^2$ and $W^3$ are methyl in a compound represented by formula (1-1) or a compound represented by formula (1-3), a melting point tends to increase. Thus, both compounds are preferred for an application needing heat resistance.

As component (B), a plurality of kinds of compounds represented by formula (2-1) may be simultaneously used. $R^c$ in $R^1$ as a terminal group is preferably straight-chain alkyl having 1 to 10 carbons. $R^c$ is further preferably straight-chain alkyl having 1 to 6 carbons and $R^d$ is a single bond. Moreover, from a viewpoint of liquid crystallinity and solubility in the solvent, q1 is preferably 1.

In order to reduce the alignment defect in the tilt alignment, a surfactant may be added. Moreover, in order increase the tilt angle, a compound represented by formula (3) and a compound represented by formula (4) may be simultaneously used.

A suitable thickness of the optical anisotropic film is different depending on retardation according to an objective device or birefringence of the optical anisotropic film. Therefore, the range thereof is quite difficult to be strictly determined, but a preferred thickness of the optical anisotropic film is approximately 0.05 to approximately 50 micrometers. A further preferred range is approximately 0.1 to approximately 20 micrometers, and still further preferred range is approximately 0.5 to approximately 10 micrometers. A preferred haze value of the optical anisotropic film is approximately 1.5% or less, and a preferred transmittance is approximately 80% or more. A further preferred haze value is approximately 1.0% or less, and a further preferred transmittance is approximately 95% or more. The transmittance preferably meets the conditions in a visible light region.

The optical anisotropic film is effective as the optical compensation device applied to the liquid crystal display device (in particular, a liquid crystal display device of an active matrix mode and a passive matrix mode). Specific examples of modes of the liquid crystal display device suitable for using the optical anisotropic film in the form of an optical compensation film include an in-plane switching (IPS) mode, an optically compensated birefringence (OCB) mode, a twisted nematic (TN) mode, a supertwisted nematic (STN) mode, an electrically controlled birefringence (ECB) mode, a hybrid aligned pneumatic (HAN) mode, a deformation of aligned phase (DAP) mode, a color super homeotropic (CSH) mode, a vertical aligned nematic/vertical aligned cholesteric (VAN/VAC) mode, an optical mode interference (OMI) mode and a super-birefringence effect (SBE) mode. The optical anisotropic film can also be used as a phase retarder for a display device of a guest-host mode, a ferroelectric mode and an antiferroelectric mode. In addition, an optimum value of parameters such as a tilt angle distribution in a thickness direction and thickness required for the optical anisotropic film strongly depends on a kind and an optical parameter of the liquid crystal display device to be compensated, and an optical parameter thereof, and is different depending on a type of the device.

The optical anisotropic film can be used also as an optical device integrated with a polarizing plate or the like, and is arranged on an outer surface of a liquid crystal cell in the above case. The optical anisotropic film as the optical compensation device, however, shows no or little impurity elution to the liquid crystal filled in the cell, and therefore can be arranged on an inner surface of the liquid crystal cell. For example, when a method disclosed in JP 4899828 B (JP 2008-134530 A) is applied, a liquid crystal display composition can be obtained in which an optical compensation layer is formed in a liquid crystal cell. An optical anisotropic film to which a dichroic dye is added has polarization characteristics, and therefore when a method disclosed in, for example, JP 4778192 B (JP 2004-535483 A), JP H11-337898 A, JP H11-101964 A or WO 2005/45485 A, the optical anisotropic film can be formed into a viewing angle control member.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

In the following, the invention will be explained in detail by way of Examples, but the invention is not limited to the Examples. Evaluation methods in Examples are presented below.

Polymerization Conditions

Under a nitrogen atmosphere, a sample was irradiated with light having an intensity of 20 mW/cm$^2$ (365 nm) at room temperature (25° C.) for 30 seconds using a 250 W ultrahigh pressure mercury lamp (made by Ushio, Inc.).

Confirmation of Liquid Crystal Alignment State

Figure 2:
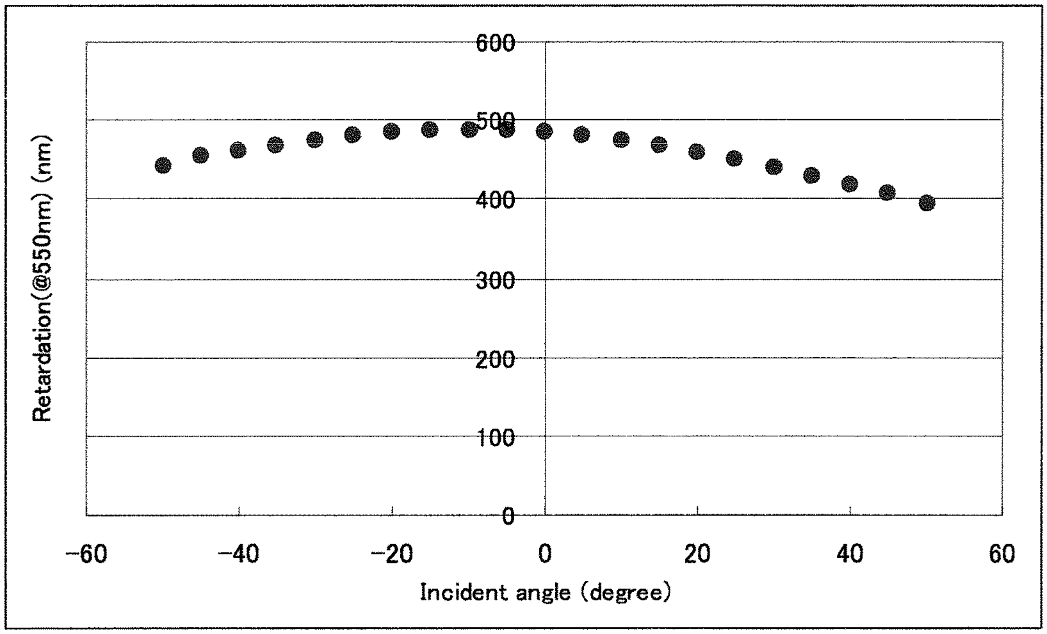
FIG. 2 is a diagram showing results of measurement of retardation of an optical anisotropic film showing homogeneous alignment.

An optical anisotropic film obtained was interposed between two polarizing plates arranged in a crossed Nicol state, and observation light was irradiated from a direction perpendicular to an optical anisotropic film surface (Incident angle: 0 degrees). A change of transmitted light was observed by increasing the incident angle from 0 degrees to 50 degrees, for example. A direction of observation light was coincided with a direction of rubbing alignment treatment (long axis direction of liquid crystals). When transmission of light from a perpendicular direction was confirmed to be maximum, and intensity of transmitted light was confirmed to be symmetrical in right-left in the rubbing direction centering on the perpendicular direction, the orientation state was judged to be in homogeneous alignment (see FIG. 2) because a liquid crystal alignment vector is parallel to a support substrate in the homogeneous alignment. On the other hand, when a transmission of light from a perpendicular direction was confirmed to be an asymmetric change in right-left in the rubbing direction centering on the perpendicular direction, the orientation state was judged to be in tilt alignment (see FIG. 1) because the alignment vector of the liquid crystal molecules was shown to be tilted relative to the support substrate (glass substrate).

Measurement with Ellipsometer

The substrate having the liquid crystal film was irradiated with light having a wavelength of 550 nm with Optipro Ellipsometer, available from Shintech Co., Ltd. The retardation was measured by decreasing the incident angle of the light with respect to the optical anisotopic film surface from a perpendicular direction (Incident angle 0 degree). The retardation is expressed by Δn×d, wherein Δn represents the optical anisotropy, and d represents the thickness of the optical anisotropic film.

Compounds used are shown below.

Formula 89

(1-1-3)

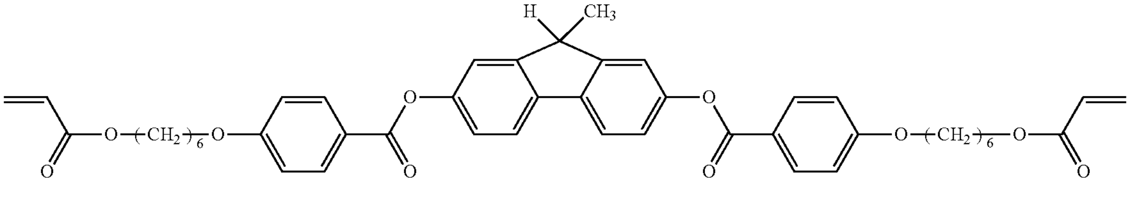

(1-3-A2)

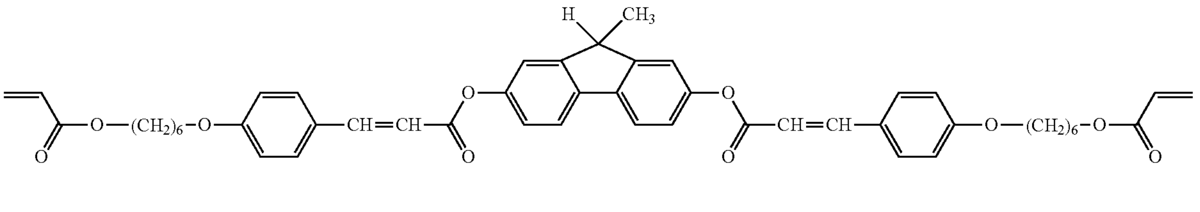

-continued (2-1-3)

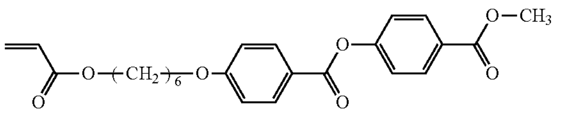

(5-1-3)

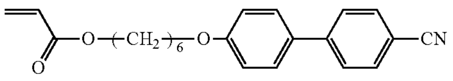

(5-1-7)

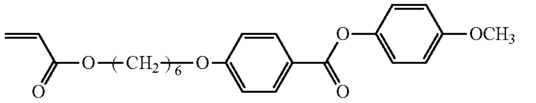

(6-1-12-1)

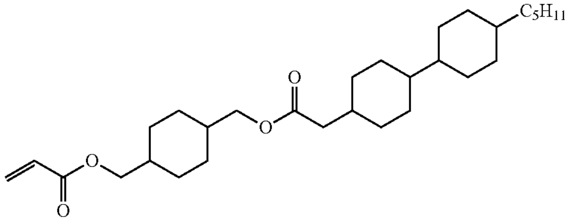

Compounds represented by formula (1-1-3) was prepared by a method described in JP 2003-238491 A (JP 4036076 B).

A trans-form compound represented by formula (1-3-A2) was prepared by a method described in JP 2012-177087 A.

A compound represented by formula (2-1-3) was prepared in a manner similar to a method described in U.S. Pat. No. 4,248,754 B.

A compound represented by formula (5-1-3) was prepared in a manner similar to a method described in Macromolecules, 26, 6132-6134 (1993).

A compound represented by formula (5-1-7) was prepared in a manner similar to a method described in Makromol. Chem., 183, 2311-2321 (1982).

A compound represented by formula (6-1-12-1) was prepared by a method described in JP 2011-246365 A.

Example 1

Preparation of Solution of Polymerizable Liquid Crystal Composition (1)

Compound (1-1-3) and compound (2-1-3) were mixed in terms of a weight ratio: compound (1-1-3): compound (2-1-3)=50:50. In terms of a weight ratio based on the total weight of the mixture, 0.05 of polymerization initiator Irgacure (registered trademark) 907, 0.001 of Irganox (registered trademark) 1076 and 0.002 of TEGOFLOW (registered trademark) 370 (vinyl type surfactant) were added thereto. Then, cyclopentanone was added thereto, and thus a solution of polymerizable liquid crystal composition (1) was obtained in which a concentration of the mixture of the polymerizable liquid crystal compound was 35%.

Polyamic acid (Lixon Aligner: PIA-5580 for a high pretilt angle (OCB alignment mode), made by JNC Corporation) was coated on a glass substrate (Matsunami Slide Glass: S-1112), and after dring at 80° C. for 3 minutes, the coated film was baked at 230° C. for 30 minutes. Rubbing treatment was applied using a rubbing fabric made from rayon (rubbing-treated alignment film). Next, the solution of polymerizable liquid crystal composition (1) was applied to the glass substrate with the rubbing-treated alignment film by spin coating. The substrate was heated at 120° C. for 2 minutes and cooled at room temperature for 2 minutes. The paint film from which the solvent was removed, was polymerized with an ultraviolet light under a nitrogen flow to give a liquid crystal film (optical anisotropic film). When the optical anisotropic film obtained was interposed between two polarizing plates arranged in a crossed Nicol state and the substrate was placed into a dark state, no light leakage was observed, and thus alignment was judged to be uniform. The measurement of retardation of the optical anisotropic film provided the results shown in FIG. 1. The retardation profile was asymmetric, and thus the optical anisotropic film revealed a tilt alignment and an average of tilt angle was found to be 33 degrees.

Example 2

An optical anisotropic film was formed after obtaining a solution of polymerizable liquid crystal composition (2) in a manner similar to the method described in Example 1 except that adjustment was made to a weight ratio: compound (1-1-3): compound (2-1-3)=30:70 in the polymerizable liquid crystal composition (1) described in Example 1. The measurement of retardation of the optical anisotropic film revealed a tilt alignment having the same tendency as in FIG. 1, and an average of tilt angle was found to be 40 degrees. When the optical anisotropic film obtained was interposed between two polarizing plates arranged in a crossed Nicol state and the substrate was placed in a dark state, no light leakage was observed, and thus alignment was judged to be uniform.

Example 3

An optical anisotropic film was formed after obtaining a solution of polymerizable liquid crystal composition (3) in a manner similar to the method described in Example 1 except that adjustment was made to a weight ratio: compound (1-1-3): compound (1-3-A2): compound (2-1-3)=25:25:50 in the polymerizable liquid crystal composition (1) described in Example 1. The measurement of retardation of the optical anisotropic film revealed a tilt alignment having the same tendency as in FIG. 1, and an average of tilt angle was found to be 35 degrees. When the optical anisotropic film obtained was interposed between two polarizing plates arranged in a crossed Nicol state and the substrate was placed in a dark state, no light leakage was observed, and thus alignment was judged to be uniform.

Example 4

An optical anisotropic film was formed after obtaining a solution of polymerizable liquid crystal composition (4) in a manner similar to the method described in Example 1 except that mixing was made at a weight ratio: compound (1-1-3):

compound (2-1-3)=57:43, and then in terms of a weight ratio based on the total amount of the mixture, 0.43 of compound (5-1-3), 0.0067 of TEGOFLOW (registered trademark) 370 (vinyl type surfactant), 0.05 of polymerization initiator Irgacure (registered trademark) 907 and 0.001 of Irganox (registered trademark) 1076 were added thereto. The measurement of retardation of the optical anisotropic film revealed a tilt alignment having the same tendency as in FIG. 1, and an average of tilt angle was found to be 33 degrees. When the optical anisotropic film obtained was interposed between two polarizing plates arranged in a crossed Nicol state and the substrate was placed in a dark state, no light leakage was observed, and thus alignment was judged to be uniform.

Comparative Example 1

An optical anisotropic film was formed after obtaining a solution of polymerizable liquid crystal composition (4) in a manner similar to the method described in Example 1 except that, in terms of a weight ratio based on the total amount of the mixture, 1.00 of compound (5-1-7), 0.0040 of TEGOFLOW (registered trademark) 370 (vinyl type surfactant), 0.05 of polymerization initiator Irgacure (registered trademark) 907 and 0.001 of Irganox (registered trademark) 1076 were added thereto. The measurement of retardation of the optical anisotropic film provided the results shown in FIG. 2. The retardation profile was almost symmetrical, and therefore the optical anisotropic film revealed almost a homogeneous alignment and an average of tilt angle was found to be 5 degrees.

From the results described above, an optical anisotropic film having a tilt alignment can be easily formed by using a polymerizable liquid crystal compound having an ester moiety as a terminal group, such as compound (2-1-3).

Example 5

An optical anisotropic film was formed after obtaining a solution of polymerizable liquid crystal composition (5) in a manner similar to the method described in Example 1 except that mixing was made at a weight ratio: compound (1-1-3): compound (2-1-3)=37:63, and then in terms of a weight ratio based on the total amount of the mixture, 0.25 of compound (6-1-12-1), 0.0063 of TEGOFLOW (registered trademark) 370 (vinyl type surfactant), 0.05 of polymerization initiator Irgacure (registered trademark) 907 and 0.001 of Irganox (registered trademark) 1076 were added thereto. The measurement of retardation of the optical anisotropic film revealed a tilt alignment having the same tendency as in FIG. 1, and an average of tilt angle was found to be 32 degrees. When the optical anisotropic film obtained was interposed between two polarizing plates arranged in a crossed Nicol state and the substrate was placed in a dark state, no light leakage was observed, and thus alignment was judged to be uniform.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A polymerizable liquid crystal composition of the invention facilitates development of tilt alignment and allows yielding of an optical anisotropic film having excellent tilt alignment properties at low cost.

What is claimed is:

1. A polymerizable liquid crystal composition, comprising component (A) being at least one compound selected from the group of compounds represented by formula (1-1), formula (1-2) and formula (1-3), and component (B) being at least one compound selected from the group of compounds represented by formula (2-1):

(1-1)

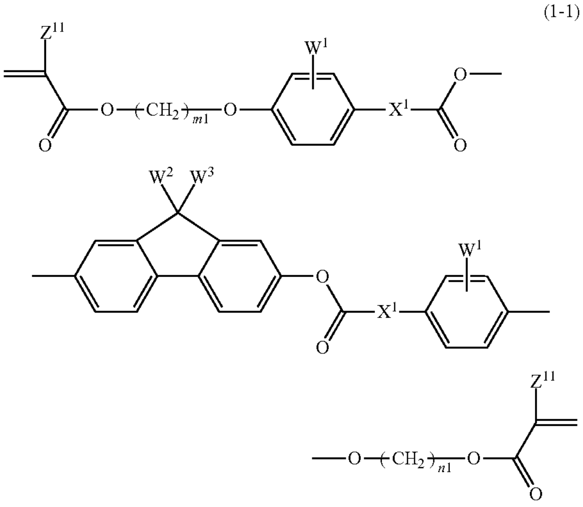

(1-2)

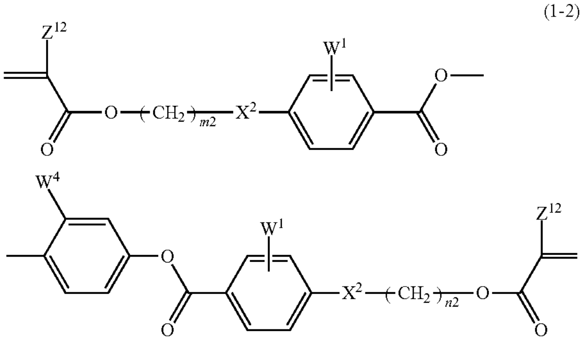

(a)

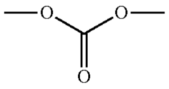

(1-3)

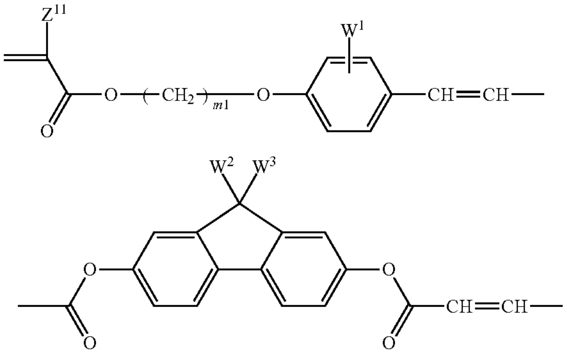

-continued

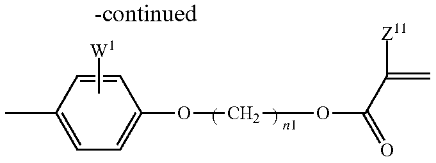

wherein, $Z^{11}$ is independently hydrogen, fluorine, methyl or trifluoromethyl;

$W^1$ is independently hydrogen, fluorine or a methoxy;

$W^2$ and $W^3$ are independently hydrogen or methyl;

$X^1$ is independently a single bond or $—CH_2CH_2—$;

$Z^{12}$ is independently hydrogen, fluorine, methyl or trifluoromethyl;

$W^4$ is hydrogen, methyl, straight-chain alkyl having 1 to 7 carbons, branched alkyl having 1 to 7 carbons, —COORa where Ra is straight-chain alkyl having 1 to 7 carbons, or —CORb where Rb is straight-chain alkyl having 1 to 15 carbons;

$X^2$ is —O—; and m1, m2, n1 and n2 are independently an integer from 2 to 15:

(2-1)

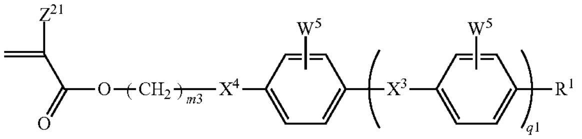

wherein, $Z^{21}$ is hydrogen or methyl;

$R^1$ is a substituent containing an alkyl ester selected from $—R^d—COOR^c$, $—R^d—OCOR^c$ or $—R^d—CH{=}CH—COOR^c$;

wherein $R^c$ is straight-chain alkyl having 1 to 20 carbons, and $R^d$ is a single bond or straight-chain alkylene having 1 to 10 carbons;

$W^5$ is independently hydrogen, fluorine or a methoxy;

$X^3$ is independently a single bond, —COO—, —OCO—,—OCO—CH═CH—, —CH═CH—COO—, $—OCO—CH_2CH_2—$or $—CH_2CH_2—COO—$;

$X^4$ is a single bond, —O—, —COO—, —OCO——OCO—CH═CH—, —CH═CH—COO—or $—OCO—CH_2CH_2—$;

m3 is an integer from 2 to 15; and q1 is 0 to 2.

2. The polymerizable liquid crystal composition according to claim 1, wherein, in formula (1-1) to formula (1-3), $Z^{11}$ is independently hydrogen or methyl;

$W^1$ is independently hydrogen or fluorine;

$Z^{12}$ is independently hydrogen or methyl;

and in formula (2-1), $R^c$ in $R^1$ is straight-chain alkyl having 1 to 10 carbons;

$W^5$ is independently hydrogen or fluorine; and $X^4$ is a single bond, —O—, —COO—, —OCO—CH═CH— or —CH═CH—COO—.

3. The polymerizable liquid crystal composition according to claim 1, wherein, in formula (1-1) to formula (1-3), $Z^{11}$ is independently hydrogen or methyl;

$W^1$ is independently hydrogen or fluorine;

$W^2$ is hydrogen and $W^3$ is methyl;

$Z^{12}$ is independently hydrogen or methyl;

and in formula (2-1), $R^c$ in $R^1$ is straight-chain alkyl having 1 to 10 carbons;

$W^5$ is independently hydrogen or fluorine; and $X^4$ is a single bond, —O—, —COO—, —OCO—CH═CH— or —CH═CH—COO—.

4. The polymerizable liquid crystal composition according to claim 1, wherein, in formula (1-1) to formula (1-3), $Z^{11}$ is independently hydrogen or methyl;

$W^1$ is independently hydrogen or fluorine;

$W^2$ and $W^3$ are methyl;

$Z^{12}$ is independently hydrogen or methyl;

and in formula (2-1), $R^c$ in $R^1$ is straight-chain alkyl having 1 to 10 carbons;

$W^5$ is independently hydrogen or fluorine; and $X^4$ is a single bond, —O—, —COO—, —OCO—,—OCO—CH═CH— or —CH═CH—COO—.

5. The polymerizable liquid crystal composition according to claim 1, wherein a ratio of component (A) is 10 to 97% by weight and a ratio of component (B) is 3 to 90% by weight, based on the total weight of component (A) and component (B).

6. The polymerizable liquid crystal composition according to claim 1, wherein a ratio of component (A) is 15 to 85% by weight and a ratio of component (B) is 15 to 85% by weight, based on the total weight of component (A) and component (B).

7. The polymerizable liquid crystal composition according to claim 1, further comprising a surfactant.

8. The polymerizable liquid crystal composition according to claim 7, wherein the surfactant is any one of vinyl-based polyalkyl acrylates, polyalkyl methacrylates, polyalkyl vinyl ethers, polybutadienes, polyolefins and polyvinyl ethers.

9. The polymerizable liquid crystal composition according to claim 8, further comprising component (F) being a compound selected from the group of compounds represented by each of formula (6-1) and formula (6-2):

(6-1)

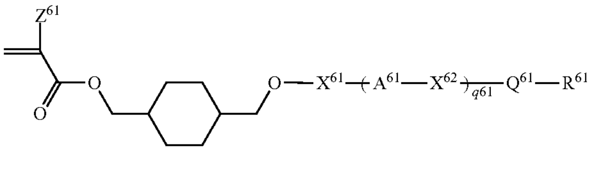

($R^{61}$-A)

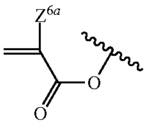

-continued (R^61-B)

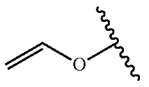

(R^61-C)

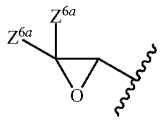

(R^61-D)

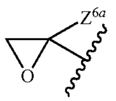

(R^61-E)

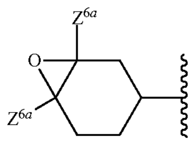

(R^61-F)

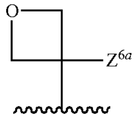

(6-2)

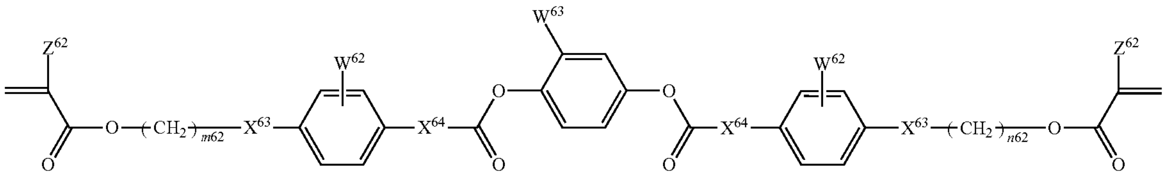

wherein, in formula (6-1), $R^{61}$is a polymerizable group represented by any one of formulas ($R^{61}$-A) to ($R^{61}$—F), hydrogen, chlorine, fluorine, —CN, alkyl having 1 to 10 carbons, alkoxy having 1 to 10 carbons, —$CF_3$ or —$OCF_3$;

$A^{61}$ is independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo [2.2.2]octane-1,4-diyl, one or non-adjacent two of —$CH_2$— in 1,4-cyclohexylene may be replaced by —O—, one or two of —CH═ in 1,4-phenylene may be replaced by —N═, and arbitrary hydrogen in 1,4-phenylene may be replaced by halogen, cyano, alkyl having 1 to 5 carbons, alkoxy having 1 to 5 carbons or alkyl halide having 1 to 5 carbons;

$X^{61}$ is —CO—, —$COCH_2$—, —$CO(CH_2)_2$— or —COCH═CH—;

$x^{62}$ is independently a single bond or alkylene having 1 to 20 carbons, arbitrary —$CH_2$— in the alkylene may be replaced by —O—, —CO—, —COO—, —OCO—, 13 CH═CH—, —CF═CF— or —C≡C—,and in the groups, arbitrary hydrogen may be replaced by halogen;

$Q^{61}$is a single bond or alkylene having 1 to 20 carbons, arbitrary —$CH_2$— in the alkylene may be replaced by —O—, —CO—, —COO—, —OCOO— or —CH═CH—, and arbitrary hydrogen may be replaced by halogen;

q61 is an integer from 1 to 5;

$Z^{61}$hydrogen, halogen, alkyl having 1 to 5 carbons or alkyl halide having 1 to 5 carbons;

in formulas ($R^{61}$-A) to ($R^{61}$—F), $Z^{62}$ is independently hydrogen, halogen, alkyl having 1 to 5 carbons or alkyl halide having 1 to 5 carbons;

and in formula (6-2), $Z^{62}$ is independently hydrogen, fluorine, methyl or trifluoromethyl;

$W^{62}$ is independently hydrogen, fluorine or a methoxy;

$X^{63}$ —O—;

$X^{64}$ is independently —CH═CH— or —$CH_2CH_2$—;

$W^{63}$ is hydrogen, methyl, straight-chain alkyl having 1 to 7 carbons, branched alkyl having 1 to 7 carbons, —COORa where Ra is straight-chain alkyl having 1 to 7 carbons, or —CORb where Rb is straight-chain alkyl having 1 to 15 carbons; and m62 and n62 are independently an integer from 2 to 15.

10. An optical anisotropic film having tilt alignment in an alignment state of a liquid crystal composition, obtained by curing the polymerizable liquid crystal composition according to claim 1, that is coated on a surface treated alignment film.

11. An optical anisotropic film having tilt alignment in an alignment state of a liquid crystal composition, obtained by curing the polymerizable liquid crystal composition according to claim 9, that is coated on a surface treated alignment film.

12. An optical compensation device, comprising the optical anisotropic film according to claim 10.

13. An optical compensation device, comprising the optical anisotropic film according to claim 11.

14. An optical device, comprising the optical anisotropic film according to claim 10 and a polarizing plate.

15. An optical device, comprising the optical anisotropic film according to claim 11 and a polarizing plate.

16. A liquid crystal display apparatus, comprising the optical compensation device according to claim 12 on an inner surface or an outer surface of a liquid crystal cell.

17. A liquid crystal display apparatus, comprising the optical compensation device according to claim 13 on an inner surface or an outer surface of a liquid crystal cell.

18. A liquid crystal display apparatus, comprising the optical device according to claim 14 on an outer surface of a liquid crystal cell.

19. A liquid crystal display apparatus, comprising the optical device according to claim 15 on an outer surface of a liquid crystal cell.

* * * * *

UNITED STATES PATENT AND TRADEMARK OFFICE

CERTIFICATE OF CORRECTION

PATENT NO. : 10,059,880 B2
APPLICATION NO. : 14/330247
DATED : August 28, 2018
INVENTOR(S) : Y. Hirai It is certified that error appears in the above-identified patent and that said Letters Patent is hereby corrected as shown below:

In the Claims

Claim 3 (Column 122, Line 19) please add "--OCO--," before "--OCO--".

Claim 9 (Column 124, Line 29) please add "is" before "--O--".

Signed and Sealed this
Twenty-sixth Day of March, 2019

Andrei Iancu
*Director of the United States Patent and Trademark Office*